US012610047B2

(12) United States Patent
Xie

(10) Patent No.: US 12,610,047 B2
(45) Date of Patent: Apr. 21, 2026

(54) CODING METHOD AND DECODER

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/988,319

(22) Filed: Dec. 19, 2024

(65) Prior Publication Data

US 2025/0119543 A1      Apr. 10, 2025

Related U.S. Application Data

(63) Continuation of application No. PCT/CN2022/100728, filed on Jun. 23, 2022.

(51) Int. Cl.
H04N 19/117 (2014.01)
H04N 19/124 (2014.01)
(Continued)

(52) U.S. Cl.
CPC ......... H04N 19/117 (2014.11); H04N 19/124 (2014.11); H04N 19/159 (2014.11);
(Continued)

(58) Field of Classification Search
CPC ................................................... H04N 19/117
(Continued)

(56) References Cited

U.S. PATENT DOCUMENTS 10,728,553 B2 *   7/2020   Xu ........................ H04N 19/124
11,218,695 B2 *   1/2022   Park .................... H04N 19/124
(Continued)

FOREIGN PATENT DOCUMENTS

CN      111901592 A      11/2020
CN      112425163 A      2/2021
(Continued)

OTHER PUBLICATIONS

Tencent, "AHG11: neural network based in-loop filter with constrained storage and low complexity", Joint Video Experts Team (JVET) of ITU-T SG 16 WP 3 and ISO/IEC JTC 1/SC 29, JVET-X0055, dated Oct. 6-15, 2021. 6 pages.
(Continued)

*Primary Examiner* — Leron Beck
(74) *Attorney, Agent, or Firm* — Sheppard, Mullin, Richter & Hampton LLP

(57)      ABSTRACT

A coding method and decoder are disclosed. The method includes the following. A bitstream is parsed to determine first syntax element flag information of a to-be-filtered component of a current picture. When the first syntax element flag information indicates that there is a to-be-filtered component of a partition block in the current picture that is allowed to be filtered by using a preset network model, the bitstream is parsed to determine second syntax element flag information of a to-be-filtered component of a current block. When the second syntax element flag information indicates that the to-be-filtered component of the current block is to be filtered by using the preset network model, block quantization parameter information of the current block is determined, where the block quantization parameter information at least includes a block quantization parameter value of a first colour component and a block quantization parameter value of a second colour component.

20 Claims, 13 Drawing Sheets

(51) Int. Cl.

| | |
|---|---|
| *H04N 19/159* | (2014.01) |
| *H04N 19/176* | (2014.01) |
| *H04N 19/42* | (2014.01) |
| *H04N 19/70* | (2014.01) |

(52) U.S. Cl.
CPC ........... *H04N 19/176* (2014.11); *H04N 19/42* (2014.11); *H04N 19/70* (2014.11)

(58) Field of Classification Search
USPC ........................................ 375/240.01–240.29
See application file for complete search history.

(56)                    References Cited

U.S. PATENT DOCUMENTS

| | | | | |
|---|---|---|---|---|
| 12,238,343 | B2 * | 2/2025 | Ma ......................... | H04N 19/82 |
| 2019/0132591 | A1 * | 5/2019 | Zhang ................... | H04N 19/124 |
| 2019/0273948 | A1 * | 9/2019 | Yin ......................... | H04N 19/82 |
| 2021/0051326 | A1 * | 2/2021 | Leleannec ............ | H04N 19/124 |
| 2021/0067785 | A1 * | 3/2021 | Zhang ................... | G06N 3/0499 |
| 2021/0400295 | A1 * | 12/2021 | Li ......................... | H04N 19/159 |
| 2021/0400306 | A1 * | 12/2021 | Xu ....................... | H04N 19/1883 |
| 2022/0038721 | A1 * | 2/2022 | Li ......................... | H04N 19/186 |
| 2022/0101095 | A1 * | 3/2022 | Li ......................... | H04N 19/184 |
| 2022/0103864 | A1 * | 3/2022 | Wang ................... | H04N 19/176 |
| 2022/0224900 | A1 * | 7/2022 | Li ............................ | G06N 3/04 |
| 2022/0321919 | A1 * | 10/2022 | Deshpande .......... | H04N 19/117 |
| 2022/0394308 | A1 * | 12/2022 | Li ......................... | H04N 19/82 |
| 2023/0209074 | A1 * | 6/2023 | Takada ................. | H04N 19/184 |
| | | | | 375/240.26 |

FOREIGN PATENT DOCUMENTS

| | | |
|---|---|---|
| CN | 112544081 A | 3/2021 |
| WO | 2022067805 A1 | 4/2022 |

OTHER PUBLICATIONS

Tencent, "EE1-1.1: neural network based in-loop filter with constrained storage and low complexity", Joint Video Experts Team (JVET) of ITU-T SG 16 WP 3 and ISO/IEC JTC 1/SC 29, JVET-Y0078-v2, dated Jan. 12-21, 2022. 5 pages.

Tencent, "EE1-1.1-related: alternative filter designs", Joint Video Experts Team (JVET) of ITU-T SG 16 WP 3 and ISO/ IEC JTC 1/SC 29, JVET-Y0080-v3, dated January 12-21, 2022. 7 pages.

Bytedance Inc et al., "EE1-1.7: Combined Test of EE1-1.6 and EE1-1.3", Joint Video Experts Team (JVET) of ITU-T SG 16 WP 3 and ISO/IEC JTC 1/SC 29, JVET-Z0113-v1, dated Apr. 20-29, 2022. 7 pages.

Ericsson, "EE1-related: Reduced complexity NN loop filter and ablation study", Joint Video Experts Team (JVET) of ITU-T SG 16 WP 3 and ISO/IEC JTC 1/SC 29, JVET-Z0106-v5, dated Apr. 20-29, 2022. 11 pages.

OPPO, "EE1-related: on BaseQP parameter in EE1-1.1", Joint Video Experts Team (JVET) of ITU-T SG 16 WP 3 and ISO/IEC JTC 1/SC 29, JVET-Z0128-v2, dated Apr. 20-29, 2022. 4 pages.

WIPO, International Search Report and Written Opinion for International Application No. PCT/CN2022/100728, Nov. 30, 2022. 17 pages (with English translation).

* cited by examiner

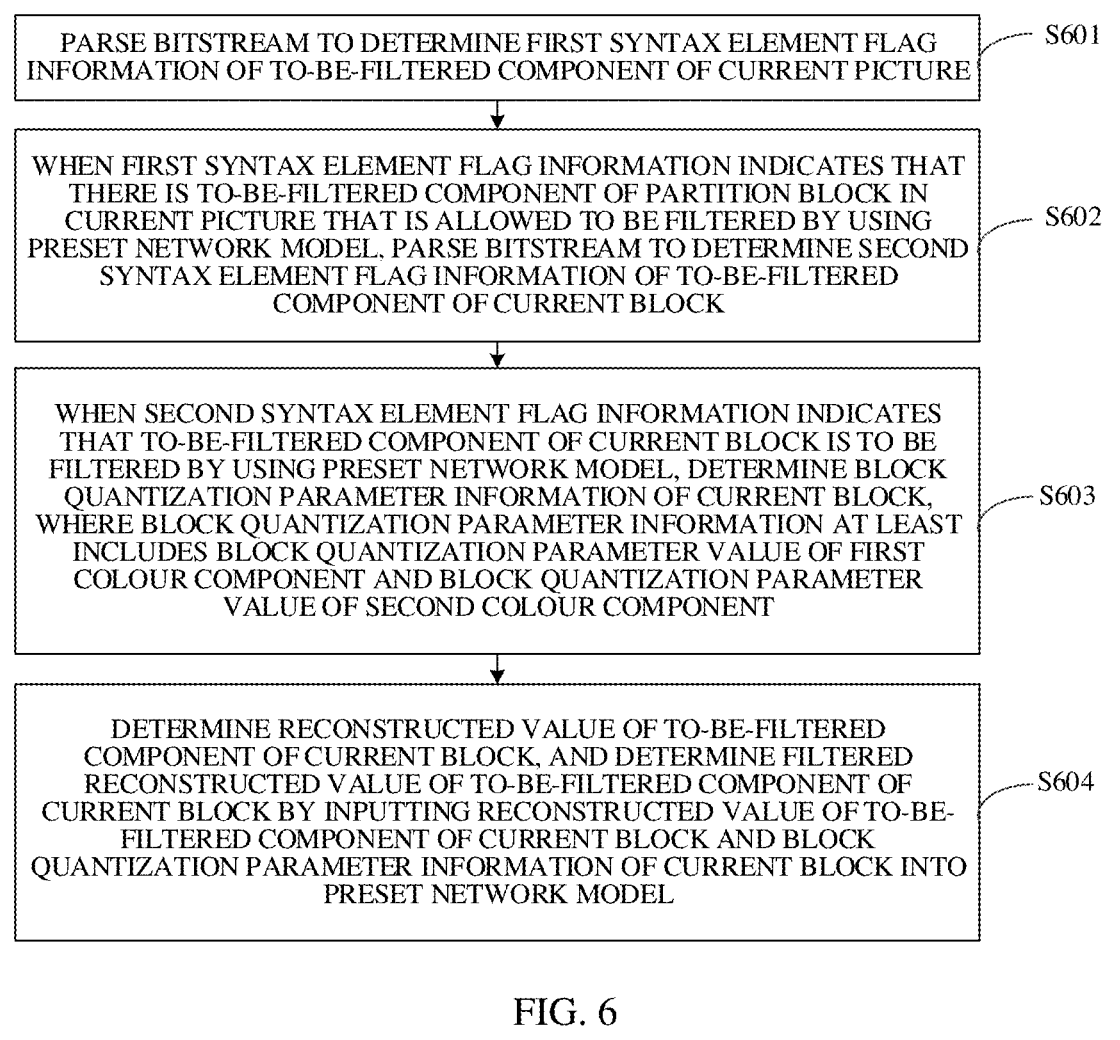

PARSE BITSTREAM TO DETERMINE FIRST SYNTAX ELEMENT FLAG INFORMATION OF TO-BE-FILTERED COMPONENT OF CURRENT PICTURE — S601

WHEN FIRST SYNTAX ELEMENT FLAG INFORMATION INDICATES THAT THERE IS TO-BE-FILTERED COMPONENT OF PARTITION BLOCK IN CURRENT PICTURE THAT IS ALLOWED TO BE FILTERED BY USING PRESET NETWORK MODEL, PARSE BITSTREAM TO DETERMINE SECOND SYNTAX ELEMENT FLAG INFORMATION OF TO-BE-FILTERED COMPONENT OF CURRENT BLOCK — S602

WHEN SECOND SYNTAX ELEMENT FLAG INFORMATION INDICATES THAT TO-BE-FILTERED COMPONENT OF CURRENT BLOCK IS TO BE FILTERED BY USING PRESET NETWORK MODEL, DETERMINE BLOCK QUANTIZATION PARAMETER INFORMATION OF CURRENT BLOCK, WHERE BLOCK QUANTIZATION PARAMETER INFORMATION AT LEAST INCLUDES BLOCK QUANTIZATION PARAMETER VALUE OF FIRST COLOUR COMPONENT AND BLOCK QUANTIZATION PARAMETER VALUE OF SECOND COLOUR COMPONENT — S603

DETERMINE RECONSTRUCTED VALUE OF TO-BE-FILTERED COMPONENT OF CURRENT BLOCK, AND DETERMINE FILTERED RECONSTRUCTED VALUE OF TO-BE-FILTERED COMPONENT OF CURRENT BLOCK BY INPUTTING RECONSTRUCTED VALUE OF TO-BE-FILTERED COMPONENT OF CURRENT BLOCK AND BLOCK QUANTIZATION PARAMETER INFORMATION OF CURRENT BLOCK INTO PRESET NETWORK MODEL — S604

FIG. 6

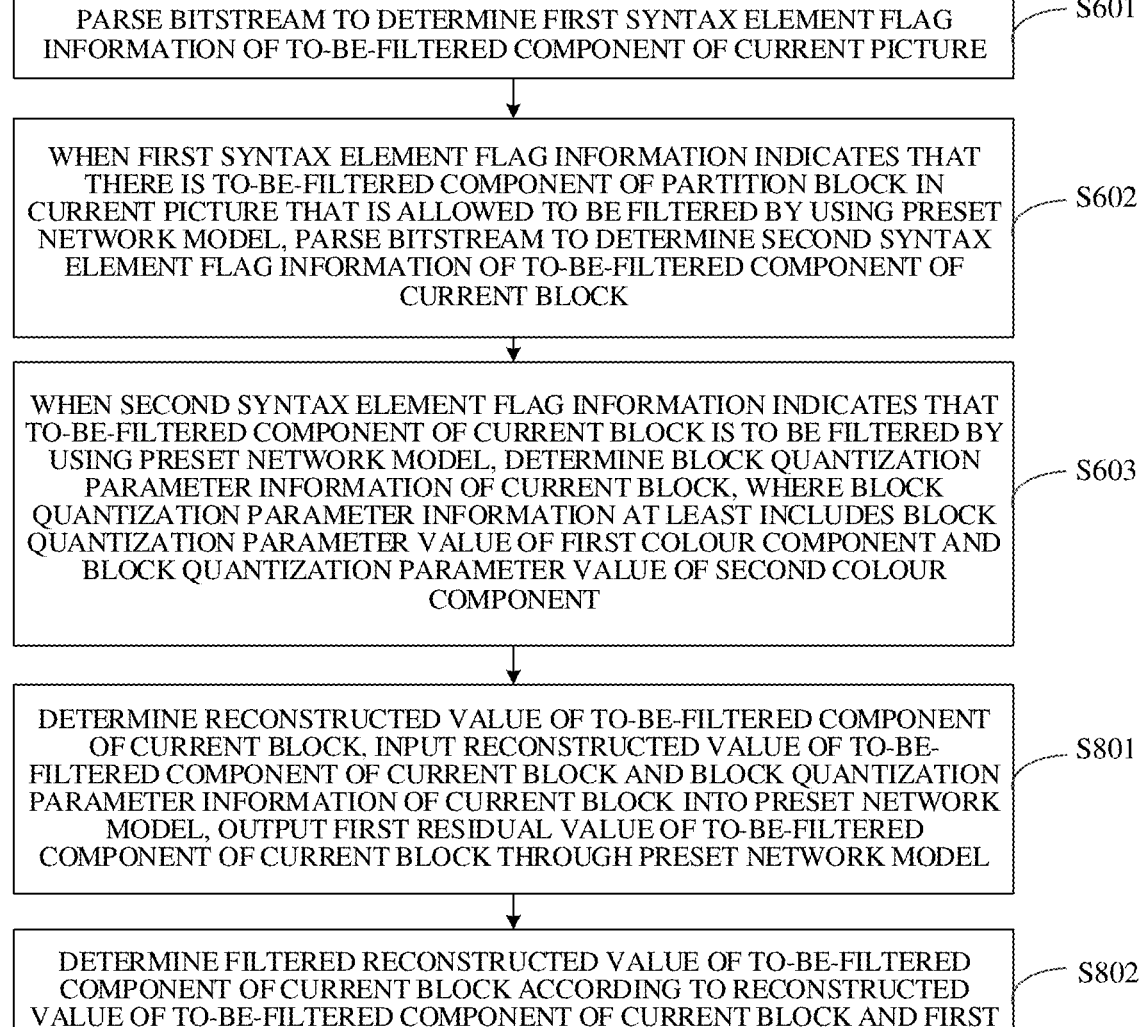

PARSE BITSTREAM TO DETERMINE FIRST SYNTAX ELEMENT FLAG INFORMATION OF TO-BE-FILTERED COMPONENT OF CURRENT PICTURE — S601

WHEN FIRST SYNTAX ELEMENT FLAG INFORMATION INDICATES THAT THERE IS TO-BE-FILTERED COMPONENT OF PARTITION BLOCK IN CURRENT PICTURE THAT IS ALLOWED TO BE FILTERED BY USING PRESET NETWORK MODEL, PARSE BITSTREAM TO DETERMINE SECOND SYNTAX ELEMENT FLAG INFORMATION OF TO-BE-FILTERED COMPONENT OF CURRENT BLOCK — S602

WHEN SECOND SYNTAX ELEMENT FLAG INFORMATION INDICATES THAT TO-BE-FILTERED COMPONENT OF CURRENT BLOCK IS TO BE FILTERED BY USING PRESET NETWORK MODEL, DETERMINE BLOCK QUANTIZATION PARAMETER INFORMATION OF CURRENT BLOCK, WHERE BLOCK QUANTIZATION PARAMETER INFORMATION AT LEAST INCLUDES BLOCK QUANTIZATION PARAMETER VALUE OF FIRST COLOUR COMPONENT AND BLOCK QUANTIZATION PARAMETER VALUE OF SECOND COLOUR COMPONENT — S603

DETERMINE RECONSTRUCTED VALUE OF TO-BE-FILTERED COMPONENT OF CURRENT BLOCK, INPUT RECONSTRUCTED VALUE OF TO-BE-FILTERED COMPONENT OF CURRENT BLOCK AND BLOCK QUANTIZATION PARAMETER INFORMATION OF CURRENT BLOCK INTO PRESET NETWORK MODEL, OUTPUT FIRST RESIDUAL VALUE OF TO-BE-FILTERED COMPONENT OF CURRENT BLOCK THROUGH PRESET NETWORK MODEL — S801

DETERMINE FILTERED RECONSTRUCTED VALUE OF TO-BE-FILTERED COMPONENT OF CURRENT BLOCK ACCORDING TO RECONSTRUCTED VALUE OF TO-BE-FILTERED COMPONENT OF CURRENT BLOCK AND FIRST RESIDUAL VALUE OF TO-BE-FILTERED COMPONENT OF CURRENT BLOCK — S802

FIG. 8

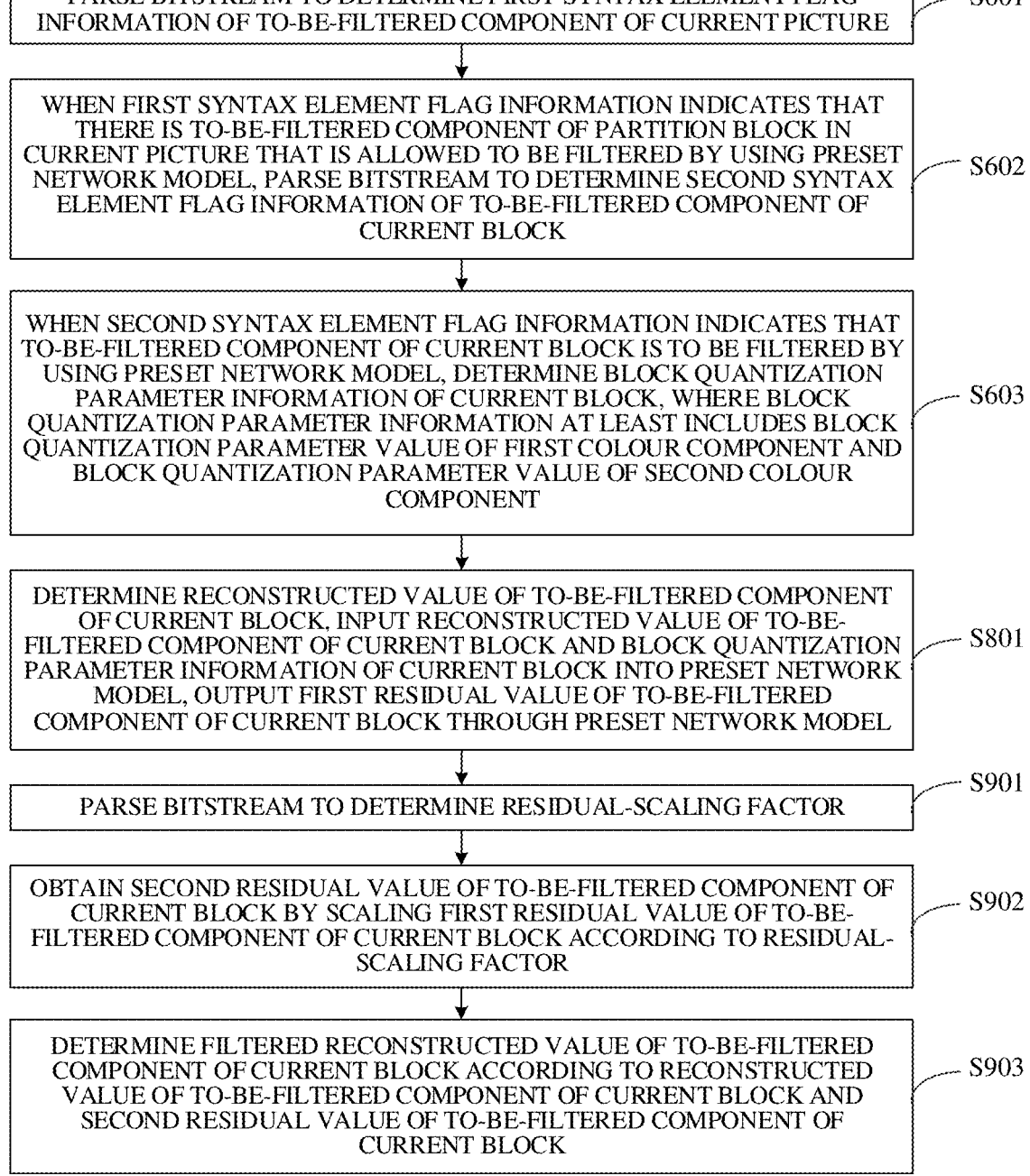

PARSE BITSTREAM TO DETERMINE FIRST SYNTAX ELEMENT FLAG INFORMATION OF TO-BE-FILTERED COMPONENT OF CURRENT PICTURE — S601

WHEN FIRST SYNTAX ELEMENT FLAG INFORMATION INDICATES THAT THERE IS TO-BE-FILTERED COMPONENT OF PARTITION BLOCK IN CURRENT PICTURE THAT IS ALLOWED TO BE FILTERED BY USING PRESET NETWORK MODEL, PARSE BITSTREAM TO DETERMINE SECOND SYNTAX ELEMENT FLAG INFORMATION OF TO-BE-FILTERED COMPONENT OF CURRENT BLOCK — S602

WHEN SECOND SYNTAX ELEMENT FLAG INFORMATION INDICATES THAT TO-BE-FILTERED COMPONENT OF CURRENT BLOCK IS TO BE FILTERED BY USING PRESET NETWORK MODEL, DETERMINE BLOCK QUANTIZATION PARAMETER INFORMATION OF CURRENT BLOCK, WHERE BLOCK QUANTIZATION PARAMETER INFORMATION AT LEAST INCLUDES BLOCK QUANTIZATION PARAMETER VALUE OF FIRST COLOUR COMPONENT AND BLOCK QUANTIZATION PARAMETER VALUE OF SECOND COLOUR COMPONENT — S603

DETERMINE RECONSTRUCTED VALUE OF TO-BE-FILTERED COMPONENT OF CURRENT BLOCK, INPUT RECONSTRUCTED VALUE OF TO-BE-FILTERED COMPONENT OF CURRENT BLOCK AND BLOCK QUANTIZATION PARAMETER INFORMATION OF CURRENT BLOCK INTO PRESET NETWORK MODEL, OUTPUT FIRST RESIDUAL VALUE OF TO-BE-FILTERED COMPONENT OF CURRENT BLOCK THROUGH PRESET NETWORK MODEL — S801

PARSE BITSTREAM TO DETERMINE RESIDUAL-SCALING FACTOR — S901

OBTAIN SECOND RESIDUAL VALUE OF TO-BE-FILTERED COMPONENT OF CURRENT BLOCK BY SCALING FIRST RESIDUAL VALUE OF TO-BE-FILTERED COMPONENT OF CURRENT BLOCK ACCORDING TO RESIDUAL-SCALING FACTOR — S902

DETERMINE FILTERED RECONSTRUCTED VALUE OF TO-BE-FILTERED COMPONENT OF CURRENT BLOCK ACCORDING TO RECONSTRUCTED VALUE OF TO-BE-FILTERED COMPONENT OF CURRENT BLOCK AND SECOND RESIDUAL VALUE OF TO-BE-FILTERED COMPONENT OF CURRENT BLOCK — S903

FIG. 9

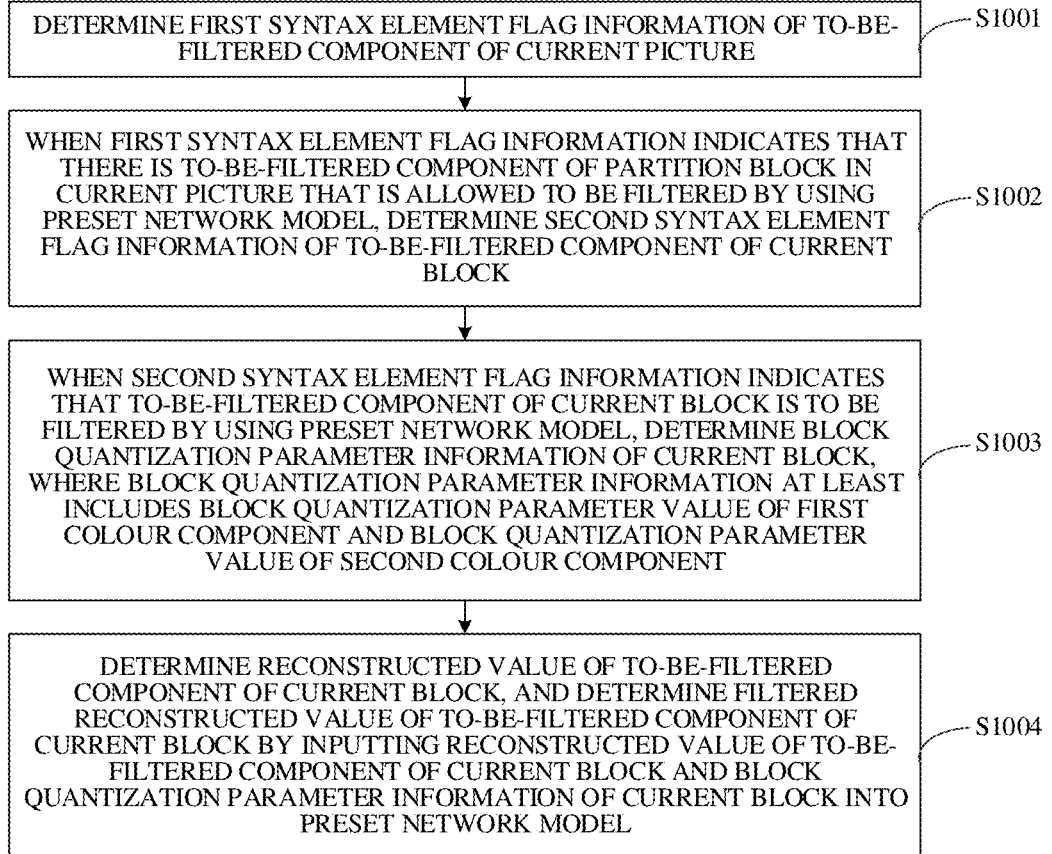

| DETERMINE FIRST SYNTAX ELEMENT FLAG INFORMATION OF TO-BE-FILTERED COMPONENT OF CURRENT PICTURE |
|---|

S1001

| WHEN FIRST SYNTAX ELEMENT FLAG INFORMATION INDICATES THAT THERE IS TO-BE-FILTERED COMPONENT OF PARTITION BLOCK IN CURRENT PICTURE THAT IS ALLOWED TO BE FILTERED BY USING PRESET NETWORK MODEL, DETERMINE SECOND SYNTAX ELEMENT FLAG INFORMATION OF TO-BE-FILTERED COMPONENT OF CURRENT BLOCK |

S1002

| WHEN SECOND SYNTAX ELEMENT FLAG INFORMATION INDICATES THAT TO-BE-FILTERED COMPONENT OF CURRENT BLOCK IS TO BE FILTERED BY USING PRESET NETWORK MODEL, DETERMINE BLOCK QUANTIZATION PARAMETER INFORMATION OF CURRENT BLOCK, WHERE BLOCK QUANTIZATION PARAMETER INFORMATION AT LEAST INCLUDES BLOCK QUANTIZATION PARAMETER VALUE OF FIRST COLOUR COMPONENT AND BLOCK QUANTIZATION PARAMETER VALUE OF SECOND COLOUR COMPONENT |

S1003

| DETERMINE RECONSTRUCTED VALUE OF TO-BE-FILTERED COMPONENT OF CURRENT BLOCK, AND DETERMINE FILTERED RECONSTRUCTED VALUE OF TO-BE-FILTERED COMPONENT OF CURRENT BLOCK BY INPUTTING RECONSTRUCTED VALUE OF TO-BE-FILTERED COMPONENT OF CURRENT BLOCK AND BLOCK QUANTIZATION PARAMETER INFORMATION OF CURRENT BLOCK INTO PRESET NETWORK MODEL |

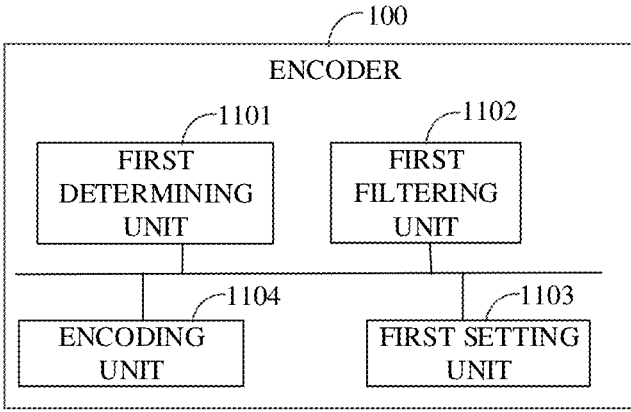

100

ENCODER

1101
FIRST DETERMINING UNIT

1102
FIRST FILTERING UNIT

1104
ENCODING UNIT

1103
FIRST SETTING UNIT

FIG. 11

CODING METHOD AND DECODER

CROSS-REFERENCE TO RELATED APPLICATION (S)

This application is a continuation of International Application No. PCT/CN2022/100728, filed Jun. 23, 2022, the disclosure of which is hereby incorporated by reference in its entirety.

TECHNICAL FIELD

Embodiments of the disclosure relate to the field of video coding technology, and in particular to a coding method and a decoder.

BACKGROUND

In a video coding system, an in-loop filter is used to improve subjective and objective quality of a reconstructed picture. In the in-loop filtering part, there are currently some neural network solutions, such as a multi-model intra switchable solution and an intra non-switchable solution. For the former, the multi-model intra switchable solution has multiple neural network models, and the models can be adjusted according to local details. For the latter, although the intra non-switchable solution has only two neural network models, model switching is not performed in a picture (or frame). If a current picture is I frame, only a neural network model corresponding to I frame is used. If the current picture is B frame, only a neural network model corresponding to B frame is used.

However, when the multi-model intra switchable solution is used for in-loop filtering, since different quantization parameters and colour components may correspond to different neural network models, the complexity is high and the overhead is large in terms of hardware implementation. Although the intra non-switchable solution can reduce complexity and improve the model generalization capability, the selection during loop filtering is not flexible due to quantization parameters. Especially for processing of colour components, the problem that a luma colour component has good performance but a chroma colour component has poor performance may also occur during loop filtering, so that good coding effects cannot be achieved.

SUMMARY

In a first aspect, a decoding method is provided in embodiments of the disclosure. The method is applied to a decoder and includes the following. A bitstream is parsed to determine first syntax element flag information of a to-be-filtered component of a current picture. When the first syntax element flag information indicates that there is a to-be-filtered component of a partition block in the current picture that is allowed to be filtered by using a preset network model, the bitstream is parsed to determine second syntax element flag information of a to-be-filtered component of a current block, where the current picture includes at least one partition block, and the current block is any one of the at least one partition block. When the second syntax element flag information indicates that the to-be-filtered component of the current block is to be filtered by using the preset network model, block quantization parameter information of the current block is determined, where the block quantization parameter information at least includes a block quantization parameter value of a first colour component and a block quantization parameter value of a second colour component. A reconstructed value of the to-be-filtered component of the current block is determined, and a filtered reconstructed value of the to-be-filtered component of the current block is determined by inputting the reconstructed value of the to-be-filtered component of the current block and the block quantization parameter information of the current block into the preset network model.

In a second aspect, an encoding method is provided in embodiments of the disclosure. The method is applied to an encoder and includes the following. First syntax element flag information of a to-be-filtered component of a current picture is determined. When the first syntax element flag information indicates that there is a to-be-filtered component of a partition block in the current picture that is allowed to be filtered by using a preset network model, second syntax element flag information of a to-be-filtered component of a current block is determined, where the current picture includes at least one partition block, and the current block is any one of the at least one partition block. When the second syntax element flag information indicates that the to-be-filtered component of the current block is to be filtered by using the preset network model, block quantization parameter information of the current block is determined, where the block quantization parameter information at least includes a block quantization parameter value of a first colour component and a block quantization parameter value of a second colour component. A reconstructed value of the to-be-filtered component of the current block is determined, and a filtered reconstructed value of the to-be-filtered component of the current block is determined by inputting the reconstructed value of the to-be-filtered component of the current block and the block quantization parameter information of the current block into the preset network model.

In a third aspect, a decoder is provided in embodiments of the disclosure. The decoder includes at least one processor and a memory. The memory is coupled to the at least one processor and stores at least one computer executable instruction. When executed by the at least one processor, the at least one computer executable instruction causes the at least one processor to perform the method of the first aspect.

BRIEF DESCRIPTION OF THE DRAWINGS

FIG. 6 is a schematic flowchart of a decoding method provided in embodiments of the disclosure.

FIG. 8 is another schematic flowchart of a decoding method provided in embodiments of the disclosure.

FIG. 9 is yet another schematic flowchart of a decoding method provided in embodiments of the disclosure.

FIG. 10 is a schematic flowchart of an encoding method provided in embodiments of the disclosure.

FIG. 11 is a schematic structural diagram of an encoder provided in embodiments of the disclosure.

DETAILED DESCRIPTION

To enable a more detailed understanding of features and technical content in embodiments of the disclosure, the embodiments of the disclosure are described in detail below in conjunction with the accompanying drawings which are provided for illustrative purposes only and are not intended to limit the disclosure.

Unless otherwise defined, all technical and scientific terms used herein have the same meaning as commonly understood by those skilled in the art. The terms used herein are for the purpose of describing embodiments of the disclosure only and are not intended to limit the disclosure.

In the following description, reference to "some embodiments" describes a subset of all possible embodiments, but it may be understood that "some embodiments" may refer to the same or different subsets of all possible embodiments and may be combined with each other without conflict. It may be further noted that the terms "first/second/third" in embodiments of the disclosure are merely for distinguishing similar objects and do not imply a particular ordering with respect to the objects. It may be understood that "first/second/third" may, where appropriate, be interchanged in a particular order or sequence so that embodiments of the disclosure described herein may be implemented in an order other than that illustrated or described herein.

It may be understood that, in a video picture, a coding block (CB) is generally represented by a first colour component, a second colour component, and a third colour component. The three colour components may be one luma colour component and two chroma colour component (a blue chroma colour component and a red chroma colour component), respectively. Specifically, the luma colour component is generally represented by Y, the blue chroma colour component is generally represented by Cb or U, and the red chroma colour component is generally represented by Cr or V. Therefore, the video picture may be represented in a YCbCr format, a YUV format, or even an RGB format, which is not limited herein.

It may be further understood that, the video compression technology is mainly to compress a huge amount of digital image video data, so as to facilitate transmission and storage, etc. With a sharp increase in Internet videos and an increasingly high requirement on video clarity, although a lot of video data can be saved with existing digital video compression standards, it is still necessary to pursue better digital video compression technologies to reduce pressure on a bandwidth and a traffic of digital video transmission. In video coding, for original video sequences of different colour formats, an encoder may read unequal samples including the luma colour components and the chroma colour component. That is, the encoder may read a black and white picture or a colour picture. Then, the picture may be partitioned into blocks, and block data may be encoded by the encoder.

Figure 1:
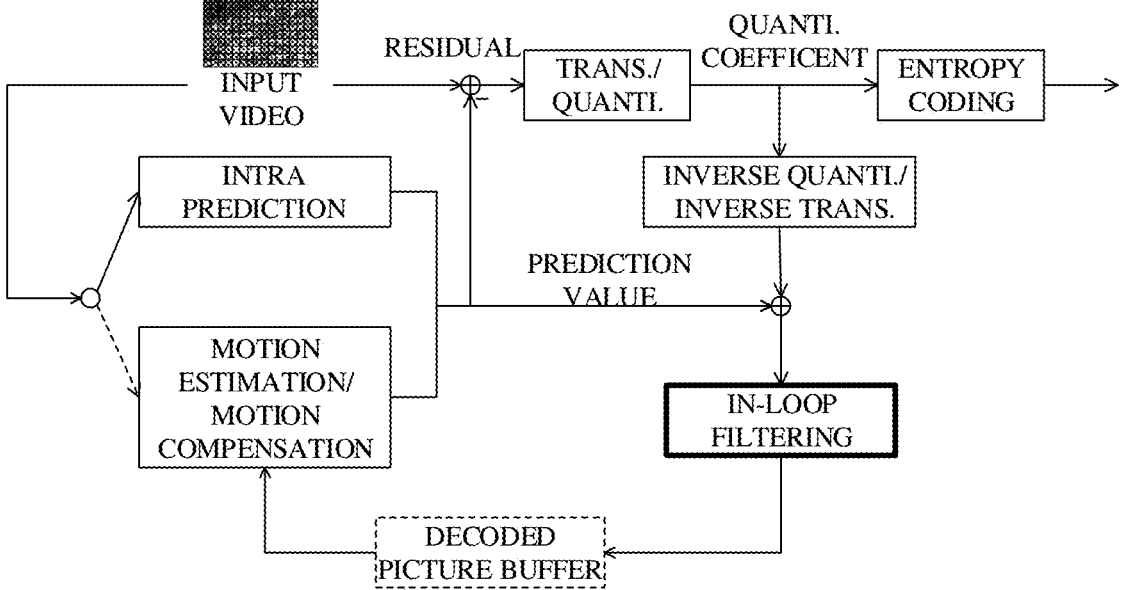
FIG. 1 is a schematic diagram of application of a hybrid coding framework.

Currently, block-based hybrid coding frameworks are generally used in universal video coding standards, for example, H.266/versatile video coding (VVC). Each picture of a video is partitioned into largest coding units (LCUs), which are squares of equal size (e.g., 128×128, 64×64, etc.). Each LCU may be partitioned into rectangular coding units (CUs) according to certain rules. The CU may be further partitioned into prediction units (PUs) and transform units (TUs), etc. As illustrated in FIG. 1, the hybrid coding framework may include modules for such as prediction, transformation, quantization, entropy coding, and in-loop filtering. The prediction module may include intra prediction and inter prediction, and the inter prediction may include motion estimation and motion compensation. Since there is strong correlation among neighbouring samples in a video picture, using intra prediction in video coding can eliminate spatial redundancy between neighbouring samples. Moreover, since there is also strong similarity between neighbouring pictures in the video, using inter prediction in video coding can eliminate temporal redundancy between neighbouring pictures. Thus, coding efficiency can be improved.

The basic process performed by a video codec is as follows. At the encoding end, a picture is partitioned into blocks, and a prediction block of a current block is generated using intra prediction or inter prediction. An original block of the current block is subtracted from the prediction block to obtain a residual block, which is then subjected to transformation and quantization to generate a quantization coefficient matrix that is entropy-encoded and signalled into a bitstream. At the decoding end, the prediction block of the current block is generated using intra prediction or inter prediction, and at the same time, the quantization coefficient matrix is parsed out from the bitstream. The quantization coefficient matrix is inverse-quantized and inverse-transformed to obtain the residual block, which is added to the prediction block to obtain a reconstructed block. Reconstructed blocks form a reconstructed picture, which is loop-filtered based on the picture or blocks to obtain a decoded picture. The encoding end also requires similar operations to obtain the decoded picture. The decoded picture may be used as a reference picture in inter prediction for subsequent pictures. The block partition information and mode information or parameter information (such as for prediction, transformation, quantization, entropy coding, and in-loop filtering) determined at the encoding end, may need to be output to the bitstream if necessary. The decoding end determines the same block partition information and mode information or parameter information such as for prediction, transformation, quantization, entropy coding, and in-loop filtering as the encoding end through parsing and analysis based on available information, ensuring that the decoded picture obtained by the encoding end is the same as that obtained by the decoding end. The decoded picture obtained by the encoding end is typically called the reconstructed picture. During prediction, the current block may be partitioned into PUs, and during transformation, the current block may be partitioned into TUs. The partition for PUs and TUs may be different. The above is the basic process performed by the video codec under the block-based hybrid coding framework. With the development of technologies, some modules or steps in this framework or process may be optimized. In other words, the embodiments of the disclosure are applicable to the basic process performed by the video codec under the block-based hybrid coding framework, but is not limited to this framework or process. The current block may be the current CU, the current PU, or the current TU, etc.

In the related art, joint video experts team (JVET), the international video coding standard development organization, has set up two exploration experiment groups, namely an exploration experiment group based on neural network coding and an exploration experiment group beyond the VVC, and accordingly has set up several expert panels. Based on the latest coding standard H.266/VVC, the exploration experiment group beyond the VVC aims to explore for the higher coding efficiency with strict performance and complexity requirements. A coding method studied by this group is closer to the VVC and may be referred to as a traditional coding method. At present, in terms of coding performance, an algorithm reference model for this exploration experiment has surpassed the latest VVC test model (VTM) by about 15%.

A method studied by the first exploration experiment group is a neural network (NN)-based intelligent coding method. At present, deep learning and the NN are hot-spots in various industries, and especially in the field of computer vision, a deep learning-based method often has overwhelming advantages. Experts of the JVET standard organization introduce the NN to the field of video coding, and by virtue of the powerful learning capability of the NN, NN-based coding tools often have efficient coding efficiency. At the early development stage of the VVC standard, many vendors have focused on deep learning-based coding tools and proposed an NN-based intra prediction method, an NN-based inter prediction method, and an NN-based in-loop filtering method. The coding performance of the NN-based in-loop filtering method is most prominent, and the coding performance can reach more than 8% after multiple conferences and explorations. Currently, the coding performance of the NN-based in-loop filtering solution studied by the first exploration experiment group of the JVET meeting is as high as 12%, which almost can contribute to nearly half a generation of coding performance.

Embodiments of the disclosure provide improvements based on the exploration experiments of the JVET meeting, and propose an NN-based in-loop filtering enhancement solution. The NN-based in-loop filtering solution in the related art will be first introduced below.

In the related art, the exploration on the NN-based in-loop filtering solution mainly focuses on two forms. The first solution is a multi-model intra switchable solution, and the second solution is an intra non-switchable model solution. However, regardless of which solution is used, an architecture form of the NN does not change much, and the tool is in the in-loop filtering under a traditional hybrid coding framework. Therefore, basic processing units for the two solutions are both coding tree units (CTUs), i.e., largest coding units.

The maximum difference between the multi-model intra switchable solution (first solution) and the intra non-switchable model solution (second solution) is that during coding of a current picture, neural network models can be randomly switched in the first solution while the neural network models cannot be switched in the second solution. In other words, taking the first solution as an example, during coding of a picture, each CTU has multiple optional candidate neural network models, where the encoding end selects for a current CTU a certain neural network model that can achieve an optimal filtering effect, and then signals an index number of the neural network model into a bitstream. That is, in the first solution, if filtering is needed for the CTU, a CTU-level usage flag needs to be first transmitted, and then the index number of the neural network model may be transmitted. If filtering is not needed, only the CTU-level usage flag needs to be transmitted. After the index number is parsed out, the decoding end loads a neural network model corresponding to the index number into the current CTU to filter the current CTU.

Taking the second solution as an example, during coding of a picture, a neural network model available for each CTU in the current picture is fixed, and the same neural network model is used for each CTU, that is, the encoding end does not perform model selection in the second solution. The decoding end parses out a usage flag of whether NN-based in-loop filtering is to be used for the current CTU. If the usage flag is true, the CTU is to be filtered by using a preset model (the same as the encoding end). If the usage flag is false, no additional operation is performed.

For the multi-model intra switchable solution (first solution), high flexibility is achieved at the CTU level, and the models can be adjusted according to local details, i.e., local optimization for achieving global optimization. Generally, this solution has multiple neural network models, in which different neural network models are trained for different quantization parameters under JVET common test conditions, and different neural network models may also be needed for different types of coding pictures to achieve better effects. Taking a filter in the related art as an example, the filter uses up to 22 neural network models to cover different types of coding pictures and different quantization parameters, and model switching is performed at the CTU level. Based on the VVC, the filter can provide more than 10% coding performance.

For the intra non-switchable model solution (second solution), although this solution generally has two neural network models, model switching is not performed in a picture. In this solution, if the encoding end determines that a type of a current coding picture is I frame, a neural network model corresponding to I frame is imported, and only the neural network model corresponding to I frame is used in the current picture. If the encoding end determines that the type of the current coding picture is B frame, a neural network model corresponding to B frame is imported, and similarly, only the neural network model corresponding to B frame is used in the picture. Based on the VVC, this solution can provide 8.65% coding performance, which is slightly lower than that of the first solution, but the overall performance achieves near-impossible coding efficiency compared with traditional coding tools.

That is to say, the first solution can provide higher flexibility and higher coding performance, but has a fatal weakness in hardware implementation, that is, hardware experts are worried about codes for intra model switching. Model switching at the CTU level means that at worst the decoding end needs to reload a neural network model once for processing each CTU, which constitutes an additional burden on an existing high-performance graphics processing unit (GPU), not to mention the complexity of hardware implementation. In addition, the existence of multiple models means that a large number of parameters need to be stored, which also constitutes a great overhead burden on the current hardware implementation. However, for the second solution, this NN in-loop filtering further explores the powerful generalization capability of deep learning. Various information is used as an input rather than a single reconstructed sample as an input to the model, and more information provides more assistance for learning of the neural network, so that the model generalization capability can be better demonstrated, and many unnecessary redundant parameters can be removed. In the continuously updated solution, only a simplified low-complexity neural network model can be fit for different test conditions and quantization parameters. Compared with the first solution, this can reduce the consumption of continuous model reloading and the large storage space required for a large number of parameters.

Regarding neural network architectures for the two solutions, the related art will be introduced below.

Figure 2:
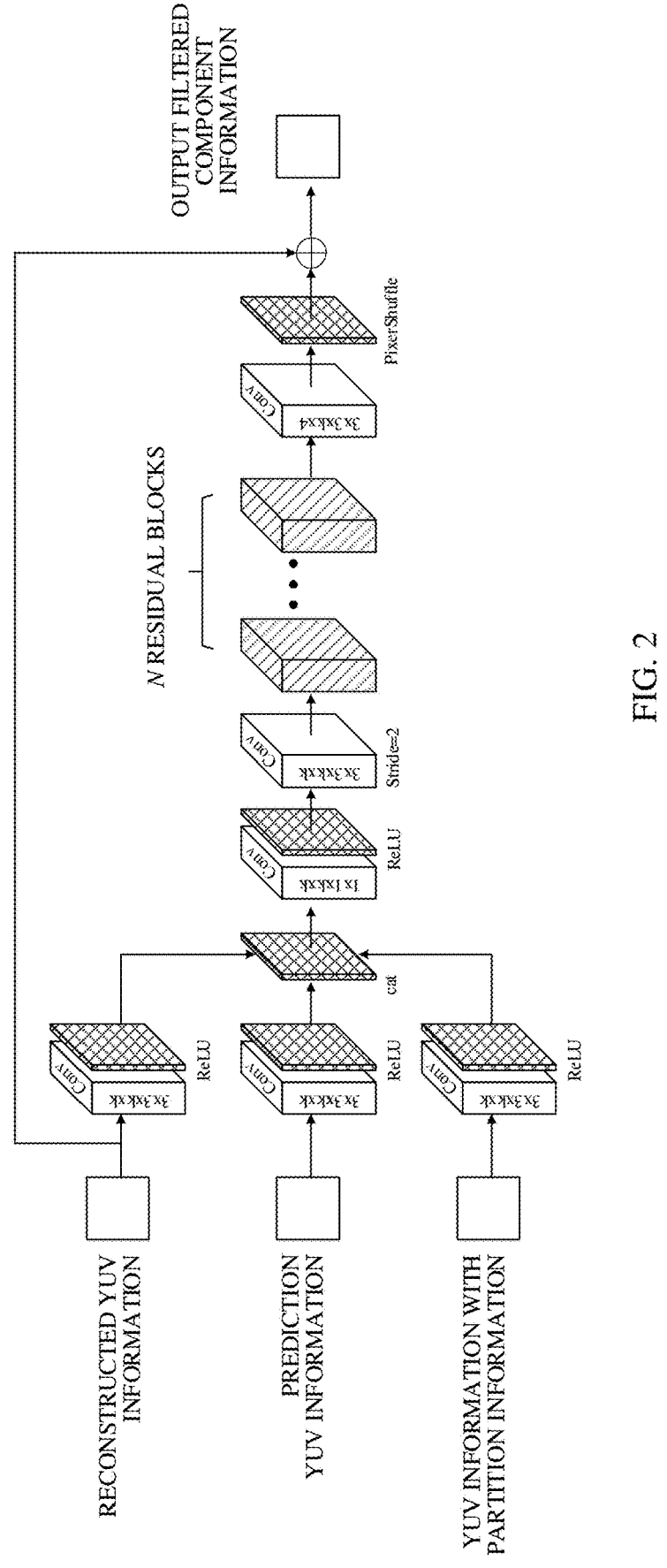
FIG. 2 is a schematic diagram of a network architecture of a neural network model.
Figure 3:
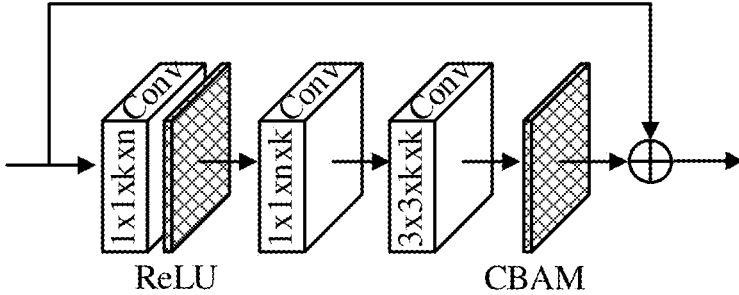
FIG. 3 is a schematic structural diagram of a residual block.

FIG. 2 is a schematic diagram of a network architecture of a neural network model. As illustrated in FIG. 2, a main structure of the network architecture may include multiple residual blocks (ResBlocks). A structure of the residual block is illustrated in detail in FIG. 3. In FIG. 3, a single residual block includes multiple convolutional layers (Conv) connected with a convolutional block attention module (CBAM) layer. As an attention mechanism module, the CBAM is mainly responsible for further extracting detailed features. In addition, the residual block has a direct skip-connection structure between an input and an output. Herein, the multiple convolutional layers in FIG. 3 include a first convolutional layer, a second convolutional layer, and a third convolutional layer, and an activation layer is further connected after the first convolutional layer. Exemplarily, the size of the first convolutional layer is $1{\times}1{\times}k{\times}n$, the size of the second convolutional layer is $1{\times}1{\times}n{\times}k$, and the size of the third convolutional layer is $3{\times}3{\times}k{\times}k$, where k and n are positive integers. The activation layer may include a rectified linear unit (ReLU) function, which may also be referred to as a linear rectification function and is a commonly-used activation function in the current neural network model. The ReLU is actually a ramp function, which is simple and has a fast convergence speed.

In FIG. 2, the network architecture also has a skip-connection structure, which connects input reconstructed YUV information to an output from a pixel shuffle module. A main function of the pixel shuffle is to obtain a high-resolution feature map through convolution and multi-channel shuffle of a low-resolution feature map. As an upsampling method, the pixel shuffle can effectively amplify a scaled-down feature map. In addition, an input to the network architecture mainly include reconstructed YUV information (rec_yuv), prediction YUV information (pred_yuv), and YUV information with partition information (par_yuv). All the inputs are subjected to simple operations including convolution and activation, and then are concatenated (Cat) and inputted into the main structure, and finally an output of the network architecture is output filtered component information (output_y). It may be noted that, the processing of the YUV information with the partition information in I frame and B frame may be different. The YUV information with the partition information needs to be input in I frame, and the YUV information with the partition information does not need to be input in B frame.

To sum up, for each of quantization parameter points required for the JVET common test in any one of I frame and B frame, in the first solution, one neural network model corresponds to that quantization parameter point. In addition, since three colour components YUV mainly have two channels, i.e., a luma channel and a chroma channel, neural network models are also different for the colour components.

Figure 4:
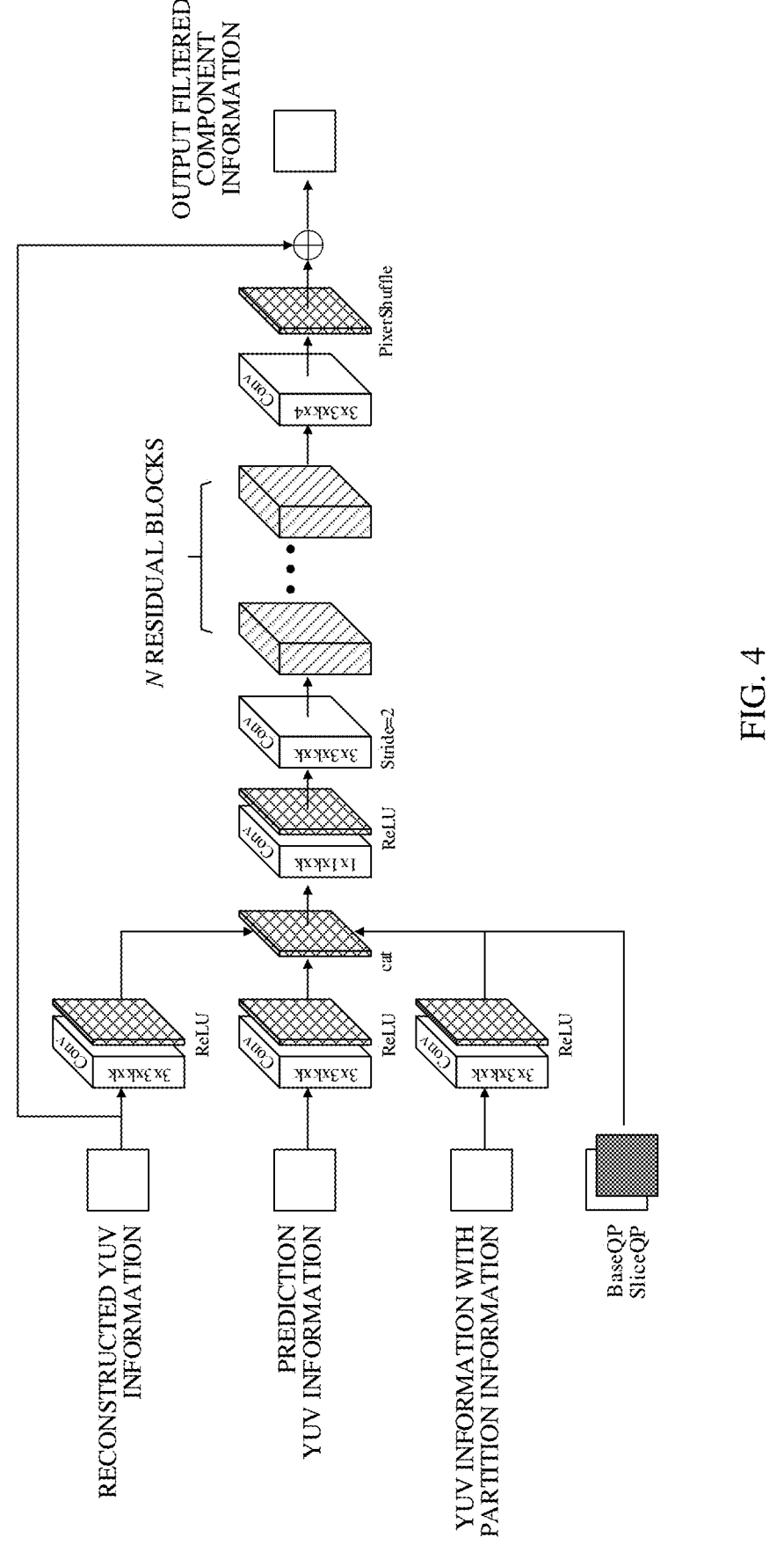
FIG. 4 is another schematic diagram of a network architecture of a neural network model.

FIG. 4 is another schematic diagram of a network architecture of a neural network model. As illustrated in FIG. 4, in the first solution and the second solution, the main structures of the network architecture are basically the same, and the difference is that compared with an input in the first solution, an input in the second solution adds quantization parameter information as an additional input. In the above first solution, different neural network models are loaded according to different quantization parameter information, so that more flexible processing and more efficient coding effects can be achieved. In the second solution, the quantization parameter information is used as an input to a network to improve the generalization capability of the neural network, so that models can be adapted to different quantization parameter conditions and provide good filtering performance.

As can be seen from FIG. 4, two quantization parameters are used as inputs to the neural network model, that is, one is BaseQP, and the other one is SliceQP. Herein, BaseQP indicates a sequence-level quantization parameter set by an encoder during encoding of a video sequence, i.e., a quantization parameter point required for the JVET common test, which is also a parameter used to determine a neural network model in the first solution. SliceQP is a quantization parameter of a current picture, where the quantization parameter of the current picture may be different from the sequence-level quantization parameter. Since in video coding, the quantization condition for B frame are different from the quantization condition for I frame, and quantization parameters are also different at different time-domain levels, SliceQP is generally different from BaseQP in B frame. Therefore, in the related art, only SliceQP needs to be used as the input to the neural network model for I frame, while both BaseQP and SliceQP need to be used as the input to the neural network model for B frame. In FIG. 4, an input to the network architecture mainly includes reconstructed YUV information (rec_yuv), prediction YUV information (pred_yuv), YUV information with partition information (par_yuv), BaseQP, and SliceQP, and finally an output of the network architecture is output filtered component information (output_yuv).

In addition, there is another difference between the second solution and the first solution. In the first solution, additional processing is often not needed for an output of a model. That is, if the output of the model is residual information, the residual information is added to a reconstructed sample of a current CTU and then is used as an output of an NN-based in-loop filtering tool. If the output of the model is a whole reconstructed sample, the output of the model is the output of the NN-based in-loop filtering tool. In the second solution, scaling is often needed for the output. For example, when the output of the model is the residual information, the model makes an inference to output the residual information of the current CTU, the residual information is scaled and then added to reconstructed sample information of the current CTU. This scaling factor is obtained by the encoding end, and needs to be signalled into a bitstream and transmitted to the decoding end.

In the related art, the input of quantization parameters as additional information facilitates reduction of the number (quantity) of models and becomes a popular solution at current JVET meetings. In addition, the general NN-based in-loop filtering solution may not be exactly the same as the above two solutions, and specific solutions may differ in details but the main ideas thereof are basically the same. For example, different details of the second solution may be reflected in the design of the neural network architecture, such as the convolution size of the residual block, the number of convolutional layers, and whether an attention mechanism module is included. Different details of the second solution may also be reflected in the input to the neural network model, where the input may even include more additional information, such as a boundary strength value of a deblocking filtering.

Both the above two solutions have greatly reduced the implementation complexity of the NN in-loop filtering technology while maintaining considerable performance levels. However, regardless of a single-model NN in-loop filtering or a double-model NN in-loop filtering, both the luma colour component and the chroma colour component are processed by one model. Through parameter adjustment training, the luma colour component may maintain good performance, but the chroma colour component still has much room for improvement. In an implementation, a total of four neural network models can be used to improve in-loop filtering, which adds two more neural network models compared with the related art, and the difference lies in processing of the chroma colour component. Since a separate neural network model is provided for the chroma colour component, in terms of the performance of the chroma colour component, the technical solution can achieve an average of 2% to 5% improvement in compression performance compared with the above two solutions. If the performance is not shifted to the luma colour component, the technical solution can achieve an additional 10% improvement in compression performance in terms of the chroma colour component. As can be seen, the above two solutions still have room for improvement in terms of the performance of the chroma colour component. In addition, in another implementation, through multiple ablation experiments on the NN in-loop filtering technologies, it is found that additional input information becomes worthless on the premise of extension of training duration. Therefore, in embodiments of the disclosure, the NN-based in-loop filtering technology may consider removing the input information such as prediction YUV information, YUV information with partition information, and boundary strength (Bs), to make the input be trimmed to include only reconstructed YUV information and BaseQP.

To sum up, because of the importance of BaseQP, in a single model solution, the luma colour component and the chroma colour component cannot be freely switched at the same time under the limitation of time complexity. If a single BaseQP is input to the single network model solution, the decoding end may need to obtain a reconstructed sample through multiple inferences, and the sharp increase in time complexity at the decoding end remains unacceptable in the current software and hardware designs, which is not conducive to improving the coding performance.

Based on this, a coding method is provided in embodiments of the disclosure. At both the encoding end and the decoding end, first syntax element flag information of a to-be-filtered component of a current picture is first determined. Then, when the first syntax element flag information indicates that there is a to-be-filtered component of a partition block in the current picture that is allowed to be filtered by using a preset network model, second syntax element flag information of a to-be-filtered component of a current block is determined, where the current picture includes at least one partition block, and the current block is any one of the at least one partition block. When the second syntax element flag information indicates that the to-be-filtered component of the current block is to be filtered by using the preset network model, block quantization parameter information of the current block is determined, where the block quantization parameter information at least includes a block quantization parameter value of a first colour component and a block quantization parameter value of a second colour component. Next, a reconstructed value of the to-be-filtered component of the current block is determined. Finally, a filtered reconstructed value of the to-be-filtered component of the current block is determined by inputting the reconstructed value of the to-be-filtered component of the current block and the block quantization parameter information of the current block into the preset network model.

As such, since an input to the preset network model includes only the reconstructed value of the to-be-filtered component and the block quantization parameter information and omits insignificant input elements such as partition information and prediction information of a colour component, the calculation amount of inference of the network model can be reduced, which is conducive to the implementation of the decoding end and reducing decoding time. In addition, since the input block quantization parameter information at least includes block quantization parameter values of two colour components, that is, multi-channel quantization parameters are used as inputs, more choices and adaptations can be provided for a luma colour component and a chroma colour component. Furthermore, by means of introducing new syntax elements, the decoding end can achieve more flexible configuration without storing multiple neural network models, which can improve the coding performance and thus improve the coding efficiency.

Embodiments of the disclosure will be elaborated below with reference to the accompanying drawings.

Figure 5A:
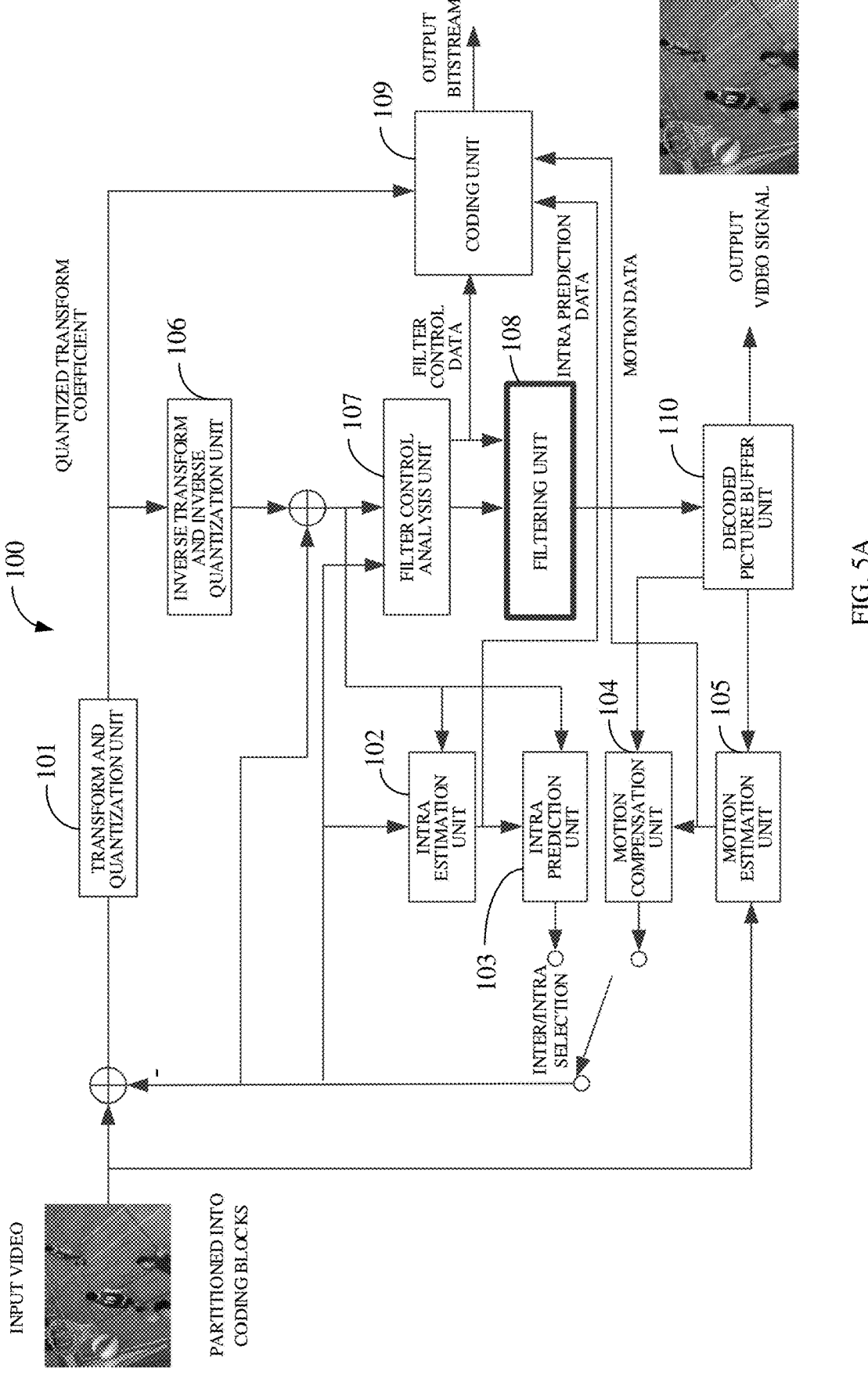
FIG. 5A is a schematic block diagram of an encoder provided in embodiments of the disclosure.

FIG. 5A is a schematic block diagram of an encoder provided in embodiments of the disclosure. As illustrated in FIG. 5A, the encoder (specifically, "video encoder") 100 includes units such as a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, an encoding unit 109, and a decoded picture buffer unit 110. The filtering unit 108 may implement deblocking filtering and sample adaptive offset (SAO) filtering, and the encoding unit 109 may implement header information coding and context-based adaptive binary arithmetic coding (CABAC). An input raw video signal may be partitioned by a CTU to obtain a video encoding block. The video encoding block is transformed by the transform and quantization unit 101 processing residual sample information obtained after intra or inter prediction, which includes transforming the residual information from the pixel domain to the transform domain and quantizing the resulting transform coefficients to further reduce the bit rate. The intra estimation unit 102 and intra prediction unit 103 are configured to perform intra prediction on the video encoding block. Specifically, the intra estimation unit 102 and intra prediction unit 103 are configured to determine an intra prediction mode to be used for encoding the video encoding block. The motion compensation unit 104 and motion estimation unit 105 are configured to perform inter prediction coding of the received video encoding block relative to one or more reference blocks within one or more reference pictures, to provide temporal prediction information. The motion estimation performed by the motion estimation unit 105 involves generating a motion vector(s), which can estimate the motion of the video encoding block. Then the motion compensation unit 104 performs motion compensation based on the motion vector determined by the motion estimation unit 105. After determining the intra prediction mode, the intra prediction unit 103 is further configured to provide the selected intra prediction data to the encoding unit 109, and the motion estimation unit 105 also transmits the calculated motion vector data to the encoding unit 109. In addition, the inverse transform and inverse quantization unit 106 is configured to reconstruct the video encoding block by reconstructing a residual block in the pixel domain. The reconstructed residual block is then filtered by the filter control analysis unit 107 and filtering unit 108 to remove blocking effect artifacts, and then the reconstructed residual block is added to a prediction block within a picture in the decoded picture buffer unit 110 to produce the reconstructed video encoding block. The encoding unit 109 is configured to encode various encoding parameters and quantized transform coefficients. In the CABAC-based encoding algorithm, context content may be based on adjacent coding blocks and may be used to encode information indicating the determined intra prediction mode, outputting the bitstream of the video signal. The decoded picture buffer unit 110 is configured to store the reconstructed video encoding blocks for prediction reference. As the video picture encoding progresses, new reconstructed video encoding blocks are continuously generated and stored in the decoded picture buffer unit 110.

Figure 5B:
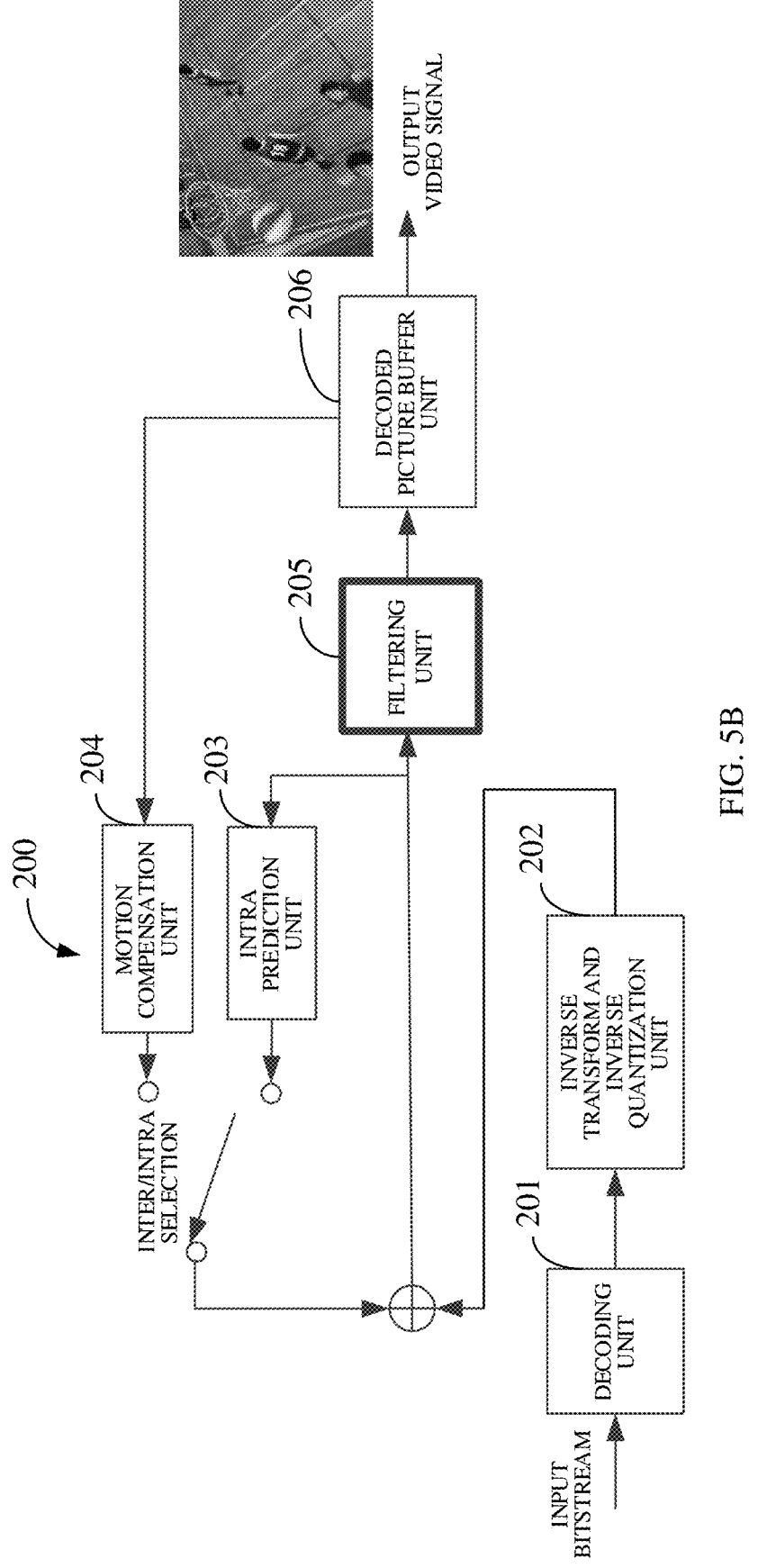
FIG. 5B is a schematic block diagram of a decoder provided in embodiments of the disclosure.

FIG. 5B is a schematic block diagram of a decoder provided in embodiments of the disclosure. As illustrated in FIG. 5B, the decoder (specifically, "video decoder") 200 includes a decoding unit 201, an inverse transform and inverse quantization unit 202, an intra prediction unit 203, a motion compensation unit 204, a filtering unit 205, a decoded picture buffer unit 206, etc. The decoding unit 201 may implement header information decoding and CABAC decoding, and the filtering unit 205 may implement deblocking filtering and SAO filtering. The input video signal is encoded as illustrated in FIG. 5A and output as a bitstream. The bitstream is then input to the decoder 200 and first passes through the decoding unit 201 to obtain the decoded transform coefficients. The inverse transform and inverse quantization unit 202 processes these transform coefficients to generate residual blocks in the pixel domain. The intra prediction unit 203 may produce prediction data for the current video decoding block based on the determined intra prediction mode and data of previously decoded blocks from the current picture. The motion compensation unit 204 determines the prediction information for the video decoding block by parsing motion vectors and other related syntax elements, and uses this information to generate the prediction block for the video decoding block. The decoded video block is formed by summing the residual block from the inverse transform and inverse quantization unit 202 and the corresponding prediction block generated by the intra prediction unit 203 or motion compensation unit 204. The decoded video signal is then passed through the filtering unit 205 to remove blocking artifacts and thus improve video quality. The decoded video block is then stored in the decoded picture buffer unit 206, which stores reference pictures for subsequent intra prediction or motion compensation and is further configured to output the video signal, that is, the recovered original video signal is obtained.

It may be noted that, the method disclosed in embodiments of disclosure is mainly applied in the filtering unit 108 as illustrated in FIG. 5A and the filtering unit 205 as illustrated in FIG. 5B. Both the filtering unit 108 and the filtering unit 205 refer to the NN-based in-loop filter. In other words, embodiments of disclosure mainly affect an in-loop filter in a video coding hybrid framework, and may be applied to the encoder, to the decoder, or even to both the encoder and decoder, which is not limited in the disclosure.

In embodiments of the disclosure, FIG. 6 is a schematic flowchart of a decoding method provided in embodiments of the disclosure. As illustrated in FIG. 6, the method may include the following.

At S601, a bitstream is parsed to determine first syntax element flag information of a to-be-filtered component of a current picture.

It may be noted that in embodiments of the disclosure, the method is applied to a decoder, and specifically to a neural network model-based in-loop filtering method. More specifically, the method may be an in-loop filtering method based on a neural network model with multiple quantization parameters as inputs.

It may be further noted that in embodiments of the disclosure, the decoder can determine the first syntax element flag information by parsing the bitstream. Herein, the first syntax element flag information is a picture-level syntax element, which may indicate whether there is a to-be-filtered component of a partition block in the current picture that is allowed to be filtered by using a preset network model. In addition, the current picture may include at least one partition block, and a current block is any one of the at least one partition block. That is to say, the first syntax element flag information can be used to determine whether any to-be-filtered component of the at least one partition block in the current picture is not allowed to be filtered by using the preset network model.

Exemplarily, in embodiments of the disclosure, the to-be-filtered component may refer to a colour component. The colour component may include at least one of a first colour component, a second colour component, or a third colour component. The first colour component may be a luma colour component, and the second colour component and the third colour component may be chroma colour components (for example, the second colour component is a blue chroma colour component and the third colour component is a red chroma colour component; alternatively, the second colour component is the red chroma colour component and the third colour component is the blue chroma colour component).

Exemplarily, if the to-be-filtered component is the luma colour component, the first syntax element flag information may be ph_nnlf_luma_enable_flag. If the to-be-filtered component is the chroma colour component, the first syntax element flag information may be ph_nnlf_chroma_enable_flag. That is to say, different first syntax element flag information is correspondingly set for different colour components of the current picture. Specifically, after the bitstream is parsed, the decoder may determine the first syntax element flag information of the to-be-filtered component, and thus determine for the to-be-filtered component whether a partition block that is allowed to be filtered by using the preset network model exists in the current picture.

It may be noted that, specifically, the first syntax element flag information may be determined by decoding a value of the flag information. In some embodiments, the bitstream is parsed to determine the first syntax element flag information of the to-be-filtered component of the current picture as follows. The bitstream is parsed to obtain a value of the first syntax element flag information. Accordingly, the method may further include the following. If the value of the first syntax element flag information is a first value, it is determined that the first syntax element flag information indicates that there is a to-be-filtered component of a partition block in the current picture that is allowed to be filtered by using the preset network model. If the value of the first syntax element flag information is a second value, it is determined that the first syntax element flag information indicates that any to-be-filtered component of the at least one partition block in the current picture is not allowed to be filtered by using the preset network model.

In embodiments of the disclosure, the first value is different from the second value, and the first value and the second value may be in parameter form or in numerical form. Specifically, the first syntax element flag information may be parameters written in a profile, or may be a value of a flag, which is not limited herein.

Exemplarily, taking the flag as an example, the flag may be set as an enable flag (enable_flag) and a disable flag (disable_flag). Assuming that a value of the enable flag is a first value and a value of the disable flag is a second value, then for the first value and the second value, the first value may be set to 1, and the second value may be set to 0. Alternatively, the first value may be set to true, and the second value may be set to false, which is not limited in embodiments of the disclosure.

It may be further noted that, for the first syntax element flag information, the decoder first needs to decode to determine third syntax element flag information of the to-be-filtered component of the current picture, and then determines whether to decode the first syntax element flag information. Therefore, in some embodiments, the bitstream is parsed to determine the first syntax element flag information of the to-be-filtered component of the current picture as follows. The bitstream is parsed to determine third syntax element flag information of the to-be-filtered component of the current picture. When the third syntax element flag information indicates that not all to-be-filtered components of the at least one partition block in the current picture are to be filtered by using the preset network model, the bitstream is parsed to determine the first syntax element flag information of the to-be-filtered component of the current picture.

In embodiments of the disclosure, the third syntax element flag information is also a picture-level syntax element, which may indicate whether all to-be-filtered components of the at least one partition block in the current picture are to be filtered by using the preset network model. That is to say, the third syntax element flag information can be used to determine whether all to-be-filtered components of the at least one partition block in the current picture are to be filtered by using the preset network model, or whether not all to-be-filtered components of the at least one partition block in the current picture are to be filtered by using the preset network model.

Exemplarily, if the to-be-filtered component is the luma colour component, the third syntax element flag information may be ph_nnlf_luma_ctrl_flag. If the to-be-filtered component is the chroma colour component, the third syntax element flag information may be ph_nnlf_chroma_ctrl_flag. That is to say, different third syntax element flag information is correspondingly set for different colour components of the current picture. Specifically, after the bitstream is parsed, the decoder may first determine the third syntax element flag information of the to-be-filtered component. Only when the third syntax element flag information indicates that not all to-be-filtered components of the at least one partition block in the current picture are to be filtered by using the preset network model, the decoder needs to further decode to obtain the value of the first syntax element flag information.

In a specific embodiment, the bitstream is parsed to determine the third syntax element flag information of the to-be-filtered component of the current picture as follows. The bitstream is parsed to obtain a value of the third syntax element flag information. Accordingly, the method may further include the following. If the value of the third syntax element flag information is a first value, it is determined that the third syntax element flag information indicates that all to-be-filtered components of the at least one partition block in the current picture are to be filtered by using the preset network model. If the value of the third syntax element flag information is a second value, it is determined that the third syntax element flag information indicates that not all to-be-filtered components of the at least one partition block in the current picture are to be filtered by using the preset network model.

In embodiments of the disclosure, when the third syntax element flag information is a flag, for the first value and the second value, the first value may be set to 1, and the second value may be set to 0. Alternatively, the first value may be set to true, and the second value may be set to false, which is not limited in embodiments of the disclosure.

In embodiments of the disclosure, both the first syntax element flag information and the third syntax element flag information are picture-level syntax elements. Exemplarily, the third syntax element flag information may also be referred to as a picture-level switch flag, and the first syntax element flag information may also be referred to as a picture-level enable flag. When the picture-level switch flag is true, all to-be-filtered components of the at least one partition block in the current picture are to be filtered by using the preset network model, and then the picture-level enable flag can be directly set to true without further parsing the bitstream. Only when the picture-level switch flag is false, not all to-be-filtered components of the at least one partition block in the current picture are to be filtered by using the preset network model, and then the bitstream needs to be further parsed to determine the picture-level enable flag, i.e., the first syntax element flag information.

At S602, when the first syntax element flag information indicates that there is a to-be-filtered component of a partition block in the current picture that is allowed to be filtered by using a preset network model, the bitstream is parsed to determine second syntax element flag information of a to-be-filtered component of a current block.

It may be noted that in embodiments of the disclosure, if the first syntax element flag information is true, the first syntax element flag information indicates that there is a to-be-filtered component of a partition block in the current picture that is allowed to be filtered by using the preset network model, and then the bitstream needs to be further parsed to determine the second syntax element flag information of the to-be-filtered component of the current block. In addition, the current block herein refers to a current partition block for which in-loop filtering is to be performed, which may be any one of the at least one partition block in the current picture. Herein, the current block may be a current coding unit, a current prediction unit, a current transform unit, or even a current CTU, etc. An example in which the current block is the current CTU will be taken below for illustration.

It may be further noted that in embodiments of the disclosure, the second syntax element flag information is a CTU-level syntax element, which may indicate whether the to-be-filtered component of the current block is to be filtered by using the preset network model. The second syntax element flag information may also be referred to as a CTU usage flag. That is to say, the second syntax element flag information can be used to determine whether a to-be-filtered component of the current CTU is to be filtered by using the preset network model or not.

Exemplarily, if the to-be-filtered component is the luma colour component, the second syntax element flag information may be ctb_nnlf_luma_flag. If the to-be-filtered component is the chroma colour component, the second syntax element flag information may be ctb_nnlf_chroma_flag. That is to say, different second syntax element flag information is correspondingly set for different colour components of the current CTU. Specifically, after the bitstream is parsed, the decoder may first determine third syntax element flag information of the to-be-filtered component. When the third syntax element flag information indicates that not all to-be-filtered components of the at least one partition block in the current picture are to be filtered by using the preset network model, the decoder needs to further decode to obtain a value of the first syntax element flag information. Only when the first syntax element flag information indicates that there is a to-be-filtered component of a partition block in the current picture that is allowed to be filtered by using the preset network model, the decoder may further decode to obtain a value of the second syntax element flag information.

In a specific embodiment, the bitstream is parsed to determine the second syntax element flag information of the to-be-filtered component of the current block as follows. The bitstream is parsed to obtain a value of the second syntax element flag information.

Accordingly, the method may further include the following. If the value of the second syntax element flag information is a first value, it is determined that the second syntax element flag information indicates that the to-be-filtered component of the current block is to be filtered by using the preset network model. If the value of the second syntax element flag information is a second value, it is determined that the second syntax element flag information indicates that the to-be-filtered component of the current block is not to be filtered by using the preset network model.

In embodiments of the disclosure, the first value is different from the second value, and the first value and the second value may be in parameter form or in numerical form. Specifically, the first syntax element flag information, the second syntax element flag information, and the third syntax element flag information each may be parameters written in a profile, or may be a value of a flag, which is not limited herein.

Exemplarily, in embodiments of the disclosure, when the second syntax element flag information is a flag, for the first value and the second value, the first value may be set to 1, and the second value may be set to 0. Alternatively, the first value may be set to true, and the second value may be set to false, which is not limited in embodiments of the disclosure.

It may be further noted that in embodiments of the disclosure, the third syntax element flag information may be referred to as the picture-level switch flag, the first syntax element flag information may be referred to as the picture-level enable flag, and the second syntax element flag information may be referred to as a CTU usage flag. As such, when the picture-level switch flag is true, all to-be-filtered components of the at least one partition block in the current picture are to be filtered by using the preset network model, and then the picture-level enable flag and each CTU usage flag in the current picture can be directly set to true without further parsing the bitstream. Only when the picture-level switch flag is false, not all to-be-filtered components of the at least one partition block in the current picture are to be filtered by using the preset network model, and then the bitstream needs to be further parsed to determine the picture-level enable flag. Then, when the picture-level enable flag is true, the bitstream is further parsed to determine a CTU usage flag of each partition block in the current picture.

At S603, when the second syntax element flag information indicates that the to-be-filtered component of the current block is to be filtered by using the preset network model, block quantization parameter information of the current block is determined. The block quantization parameter information at least includes a block quantization parameter value of a first colour component and a block quantization parameter value of a second colour component.

At S604, a reconstructed value of the to-be-filtered component of the current block is determined, and a filtered reconstructed value of the to-be-filtered component of the current block is determined by inputting the reconstructed value of the to-be-filtered component of the current block and the block quantization parameter information of the current block into the preset network model.

In embodiments of the disclosure, for the current block, if it is determined through decoding that the second syntax element flag information indicates that the to-be-filtered component of the current block is to be filtered by using the preset network model, then the block quantization parameter information of the current block and the reconstructed value of the to-be-filtered component of the current block need to be further determined. Then, the filtered reconstructed value of the to-be-filtered component of the current block can be determined by inputting the reconstructed value of the to-be-filtered component of the current block and the block quantization parameter information of the current block into the preset network model.

In order to provide more information for the luma colour component and the chroma colour component to improve the coding performance, in embodiments of the disclosure, a quantization parameter channel needs to be input for each of the luma colour component and the chroma colour component. Therefore, the block quantization parameter information herein may at least include a block quantization parameter value of the luma colour component and a block quantization parameter value of the chroma colour component. Exemplarily, the block quantization parameter value of the first colour component may be the block quantization parameter value (represented by ctb_nnlf_luma_baseqp) of the luma colour component, and the block quantization parameter value of the second colour component may be the block quantization parameter value (represented by ctb_nnlf_chroma_baseqp) of the chroma colour component.

In a possible embodiment, the block quantization parameter information of the current block is determined as follows. The bitstream is parsed to determine a first quantization parameter index and a second quantization parameter index of the current block. The quantization parameter value of the first colour component of the current block is determined from a first quantization parameter candidate set according to the first quantization parameter index. The block quantization parameter value of the second colour component of the current block is determined from a second quantization parameter candidate set according to the second quantization parameter index.

Herein, the first quantization parameter candidate set may include at least two candidate quantization parameter values of the first colour component, and the second quantization parameter candidate set may include at least two candidate quantization parameter values of the second colour component.

It may be noted that in embodiments of the disclosure, the first quantization parameter index and the second quantization parameter index are signalled into the bitstream. In this case, the decoder can obtain the first quantization parameter index by parsing the bitstream, and then determine, according to the first quantization parameter index, the block quantization parameter value of the first colour component from the first quantization parameter candidate set. The decoder can further obtain the second quantization parameter index by parsing the bitstream, and then determine, according to the second quantization parameter index, the block quantization parameter value of the second colour component from the second quantization parameter candidate set.

In another possible embodiment, the block quantization parameter information of the current block is determined as follows. The bitstream is parsed to determine the block quantization parameter value of the first colour component and the block quantization parameter value of the second colour component of the current block.

It may be noted that in embodiments of the disclosure, the block quantization parameter value of the first colour component and the block quantization parameter value of the second colour component are signalled into the bitstream. As such, the decoder can directly determine the block quantization parameter value of the first colour component and the block quantization parameter value of the second colour component by parsing the bitstream.

It may be further noted that in embodiments of the disclosure, for the luma colour component, if a value of second syntax element flag information of a luma colour component of the current block is true, the luma colour component of the current block is to be filtered by using the preset network model, and then decoding is further needed to obtain the block quantization parameter value of the luma colour component. For the chroma colour component, if a value of second syntax element flag information of a chroma colour component of the current block is true, the chroma colour component of the current block is to be filtered by using the preset network model, and then decoding is further needed to obtain the block quantization parameter value of the chroma colour component. It may be noted that, if the value of the second syntax element flag information of the luma colour component of the current block is false and the value of the second syntax element flag information of the chroma colour component of the current block is true, then the chroma colour component of the current block needs to be filtered by using the preset network model. In this case, the input block quantization parameter value still includes the block quantization parameter value of the luma colour component and the block quantization parameter value of the chroma colour component, and the block quantization parameter value of the luma colour component obtained from the bitstream is a default value. On the contrary, if the value of the second syntax element flag information of the chroma colour component of the current block is false and the value of the second syntax element flag information of the luma colour component of the current block is true, then the luma colour component of the current block needs to be filtered by using the preset network model. In this case, the input block quantization parameter value still includes the block quantization parameter value of the luma colour component and the block quantization parameter value of the chroma colour component, and the block quantization parameter value of the chroma colour component obtained from the bitstream is a default value.

It may be understood that in the decoding and reconstruction process, the decoder needs to further determine the reconstructed value of the to-be-filtered component of the current block. In some embodiments, the reconstructed value of the to-be-filtered component of the current block is determined as follows. The bitstream is parsed to determine a reconstructed residual value of the to-be-filtered component of the current block. A prediction value of the to-befiltered component of the current block is determined by performing intra or inter prediction on the to-be-filtered component of the current block. The reconstructed value of the to-be-filtered component of the current block is determined according to the reconstructed residual value of the to-be-filtered component of the current block and the prediction value of the to-be-filtered component of the current block.

In a specific embodiment, the bitstream is parsed to determine the reconstructed residual value of the to-be-filtered component of the current block as follows. The bitstream is parsed to obtain a target residual value of the to-be-filtered component of the current block. The reconstructed residual value of the to-be-filtered component of the current block is obtained by inversely quantizing and inversely transforming the target residual value of the to-be-filtered component of the current block.

In a specific embodiment, the reconstructed value of the to-be-filtered component of the current block is determined according to the reconstructed residual value of the to-be-filtered component of the current block and the prediction value of the to-be-filtered component of the current block as follows. The reconstructed value of the to-be-filtered component of the current block is obtained by adding the reconstructed residual value of the to-be-filtered component of the current block to the prediction value of the to-be-filtered component of the current block.

Herein, for the current block, the reconstructed residual value of the to-be-filtered component of the current block can be obtained through decoding. Then, the prediction value of the to-be-filtered component of the current block is determined through intra or inter prediction of the to-be-filtered component of the current block. Next, the reconstructed residual value of the to-be-filtered component is added to the prediction value of the to-be-filtered component, to obtain the reconstructed value of the to-be-filtered component of the current block, i.e., the reconstructed YUV information described above. Finally, the reconstructed value is used as an input to the preset network model to determine the filtered reconstructed value of the to-be-filtered component of the current block.

It may be further noted that in some embodiments, after the bitstream is parsed to determine the second syntax element flag information of the to-be-filtered component of the current block, the method may further include the following. When the second syntax element flag information indicates that the to-be-filtered component of the current block is not to be filtered by using the preset network model, the reconstructed value of the to-be-filtered component of the current block is determined as the filtered reconstructed value of the to-be-filtered component of the current block.

That is to say, after the second syntax element flag information of the current block is determined through decoding, if the second syntax element flag information indicates that the to-be-filtered component of the current block is to be filtered by using the preset network model, then the block quantization parameter information and the reconstructed value of the to-be-filtered component of the current block may be input into the preset network model, so as to obtain the filtered reconstructed value of the to-be-filtered component of the current block. If the second syntax element flag information indicates that the to-be-filtered component of the current block is not to be filtered by using the preset network model, then the reconstructed value of the to-be-filtered component of the current block may be determined as the filtered reconstructed value of the to-be-filtered component of the current block.

It may be further noted that in some embodiments, after the bitstream is parsed to determine the first syntax element flag information of the to-be-filtered component of the current picture, the method may further include the following. When the first syntax element flag information indicates that any to-be-filtered component of the at least one partition block in the current picture is not allowed to be filtered by using the preset network model, a value of second syntax element flag information of a to-be-filtered component of each of the at least one partition block is set to a second value. After a reconstructed value of the to-be-filtered component of each of the at least one partition block is determined, the reconstructed value of the to-be-filtered component of each of the at least one partition block is determined as a filtered reconstructed value of the to-be-filtered component of each of the at least one partition block.

That is to say, after the first syntax element flag information of the to-be-filtered component of the current picture is determined through decoding, if the first syntax element flag information indicates that there is a to-be-filtered component of a partition block in the current picture that is allowed to be filtered by using the preset network model, then decoding is further needed to determine the second syntax element flag information. Then, the filtered reconstructed value of the to-be-filtered component of the current block is determined according to the second syntax element flag information. On the contrary, if the first syntax element flag information indicates that any to-be-filtered component of the at least one partition block in the current picture is not allowed to be filtered by using the preset network model, then the value of the second syntax element flag information of the to-be-filtered component of each of the at least one partition block is set to the second value. Then, after the reconstructed value of the to-be-filtered component of each partition block is determined, the reconstructed value of the to-be-filtered component of each partition block is determined as the filtered reconstructed value of the to-be-filtered component of that partition block. Subsequently, other in-loop filtering methods need to be further performed, and a whole reconstructed picture is output after all the in-loop filtering methods are performed.

It may be further noted that in some embodiments, after the bitstream is parsed to determine the third syntax element flag information of the to-be-filtered component of the current picture, the method may further include the following. When the third syntax element flag information indicates that all to-be-filtered components of the at least one partition block in the current picture are to be filtered by using the preset network model, the bitstream is parsed to determine picture quantization parameter information of the current picture, where the picture quantization parameter information at least includes a picture quantization parameter value of the first colour component and a picture quantization parameter value of the second colour component. A value of the first syntax element flag information of the to-be-filtered component of the current picture is set to a first value, a value of second syntax element flag information of a to-be-filtered component of each of the at least one partition block in the current picture is set to the first value, and block quantization parameter information of each of the at least one partition block is determined according to the picture quantization parameter information of the current picture. After a reconstructed value of the to-be-filtered component of each of the at least one partition block is determined, a filtered reconstructed value of the to-be-filtered component of each of the at least one partition block is determined by inputting the reconstructed value of the to-be-filtered component of each of the at least one partition block and the block quantization parameter information of each of the at least one partition block into the preset network model.

That is to say, after the third syntax element flag information of the to-be-filtered component of the current picture is determined through decoding, if the third syntax element flag information indicates that not all to-be-filtered components of the at least one partition block in the current picture are to be filtered by using the preset network model, then decoding is further needed to determine the first syntax element flag information and the second syntax element flag information. Then, the filtered reconstructed value of the to-be-filtered component of the current block is determined according to the two syntax element flag information. On the contrary, if the third syntax element flag information indicates that all to-be-filtered components of the at least one partition block in the current picture are to be filtered by using the preset network model, then decoding is needed to determine only the picture quantization parameter information of the current picture. Then, both the value of the first syntax element flag information and the value of the second syntax element flag information are set to the first value, and block quantization parameter information of each partition block in the current picture is determined according to the picture quantization parameter information of the current picture.

In embodiments of the disclosure, the picture quantization parameter information at least includes the picture quantization parameter value of the first colour component and the picture quantization parameter value of the second colour component. Exemplarily, the first colour component is the luma colour component, and the second colour component is the chroma colour component. In a possible embodiment, the bitstream is parsed to determine the picture quantization parameter information of the current picture as follows. The bitstream is parsed to determine a third quantization parameter index and a fourth quantization parameter index of the current picture. The picture quantization parameter value of the first colour component of the current picture is determined from a first quantization parameter candidate set according to the third quantization parameter index. The picture quantization parameter value of the second colour component of the current picture is determined from a second quantization parameter candidate set according to the fourth quantization parameter index.

Herein, the first quantization parameter candidate set may include at least two candidate quantization parameter values of the first colour component, and the second quantization parameter candidate set may include at least two candidate quantization parameter values of the second colour component. It may be noted that for the same picture, the first quantization parameter candidate set may be the same, and the second quantization parameter candidate set may be the same. Different pictures may correspond to different first quantization parameter candidate sets respectively, and different pictures may also correspond to different second quantization parameter candidate sets respectively.

It may be further noted that in embodiments of the disclosure, the third quantization parameter index and the fourth quantization parameter index may be signalled into the bitstream. In this case, the decoder can obtain the third quantization parameter index by parsing the bitstream, and then determine, according to the third quantization parameter index, the picture quantization parameter value of the first colour component from the first quantization parameter candidate set. The decoder can further obtain the fourth quantization parameter index by parsing the bitstream, and then determine, according to the fourth quantization parameter index, the picture quantization parameter value of the second colour component from the second quantization parameter candidate set. Exemplarily, a picture quantization parameter value of the luma colour component may be represented by ph_nnlf_luma_baseqp, and a picture quantization parameter value of the chroma colour component may be represented by ph_nnlf_chroma_baseqp.

In another possible embodiment, the bitstream is parsed to determine the picture quantization parameter information of the current picture as follows. The bitstream is parsed to determine the picture quantization parameter value of the first colour component and the picture quantization parameter value of the second colour component of the current picture.

It may be noted that in embodiments of the disclosure, the picture quantization parameter value of the first colour component and the picture quantization parameter value of the second colour component are signalled into the bitstream. As such, the decoder can directly determine the picture quantization parameter value of the first colour component and the picture quantization parameter value of the second colour component by parsing the bitstream.

It may be further noted that in embodiments of the disclosure, when it is determined through decoding that all to-be-filtered components of the at least one partition block in the current picture are to be filtered by using the preset network model, the bitstream is parsed to determine the picture quantization parameter information of the current picture. Then, a block quantization parameter value of the luma colour component of the current block is assigned with the picture quantization parameter value of the luma colour component, i.e., ctb_nnlf_luma_baseqp=ph_nnlf_luma_baseqp, and a block quantization parameter value of the chroma colour component of the current block is assigned with the picture quantization parameter value of the chroma colour component, i.e., ctb_nnlf_chroma_baseqp=ph_nnlf_chroma_baseqp.

It may be further understood that in embodiments of the disclosure, new syntax elements are introduced herein, for example, the first syntax element flag information, the second syntax element flag information, and the third syntax element flag information, etc., of the to-be-filtered component. In some embodiments, the to-be-filtered component at least includes a luma colour component and a chroma colour component, and the method may further include the following. When a colour component type of the current picture is the luma colour component, it is determined that the third syntax element flag information is picture-level luma switch flag information of the current picture, the first syntax element flag information is picture-level luma enable flag information of the current picture, and the second syntax element flag information is block-level luma usage flag information of the current block. The picture-level luma switch flag information indicates whether all luma colour components of the at least one partition block in the current picture are to be filtered by using the preset network model, the picture-level luma enable flag information indicates whether there is a luma colour component of a partition block in the current picture that is allowed to be filtered by using the preset network model, and the block-level luma usage flag information indicates whether a luma colour component of the current block is to be filtered by using the preset network model. When the colour component type of the current picture is the chroma colour component, it is determined that the third syntax element flag information is picture-level chroma switch flag information of the current picture, the first syntax element flag information is picture-level chroma enable flag information of the current picture, and the second syntax element flag information is block-level chroma usage flag information of the current block. The picture-level chroma switch flag information indicates whether all chroma colour components of the at least one partition block in the current picture are to be filtered by using the preset network model, the picture-level chroma enable flag information indicates whether there is a chroma colour component of a partition block in the current picture that is allowed to be filtered by using the preset network model, and the block-level chroma usage flag information indicates whether a chroma colour component of the current block is to be filtered by using the preset network model.

Herein, for the luma colour component, the picture-level luma switch flag information may be represented by ph_nnlf_luma_ctrl_flag, the picture-level luma enable flag information may be represented by ph_nnlf_luma_enable_flag, and the block-level luma usage flag information may be represented by ctb_nnlf_luma_flag. For the chroma colour component, the picture-level chroma switch flag information may be represented by ph_nnlf_chroma_ctrl_flag, the picture-level chroma enable flag information may be represented by ph_nnlf_chroma_enable_flag, and the block-level chroma usage flag information may be represented by ctb_nnlf_chroma_flag.

Further, in embodiments of the disclosure, a sequence-level syntax element may also be set to determine whether the NN-based in-loop filtering technology is allowed for a current sequence. The method may further include the following. The bitstream is parsed to determine fourth syntax element flag information. When the fourth syntax element flag information indicates that a to-be-filtered component of a current sequence is allowed to be filtered by using the preset network model, proceed to parsing the bitstream to determine the third syntax element flag information of the to-be-filtered component of the current picture.

It may be noted that in embodiments of the disclosure, the fourth syntax element flag information is the sequence-level syntax element, which may indicate whether the to-be-filtered component of the current sequence is allowed to be filtered by using the preset network model. That is to say, whether the to-be-filtered component of the current sequence is allowed to be filtered by using the preset network model or not can be determined according to different values of the fourth syntax element flag information.

It may be further noted that in embodiments of the disclosure, the fourth syntax element flag information may be represented by sps_nnlf_enable_flag. If at least one of the luma colour component and the chroma colour component of the current sequence is allowed to be filtered by using the preset network model, then it means that a value of sps_nnlf_enable_flag is true, that is, the to-be-filtered component of the current sequence is allowed to be filtered by using the preset network model. If any one of the luma colour component and the chroma colour component of the current sequence is not allowed to be filtered by using the preset network model, then it means that the value of sps_nnlf_enable_flag is false, that is, the to-be-filtered component of the current sequence is not allowed to be filtered by using the preset network model.

In a specific embodiment, the bitstream is parsed to determine the fourth syntax element flag information as follows. The bitstream is parsed to obtain a value of the fourth syntax element flag information.

Accordingly, the method may further include the following. If the value of the fourth syntax element flag information is a first value, it is determined that the fourth syntax element flag information indicates that the to-be-filtered component of the current sequence is allowed to be filtered by using the preset network model. If the value of the fourth syntax element flag information is a second value, it is determined that the fourth syntax element flag information indicates that the to-be-filtered component of the current sequence is not allowed to be filtered by using the preset network model.

In embodiments of the disclosure, the first value is different from the second value, and the first value and the second value may be in parameter form or in numerical form. Specifically, the fourth syntax element flag information may be parameters written in a profile, or may be a value of a flag, which is not limited herein.

Exemplarily, in embodiments of the disclosure, when the fourth syntax element flag information is a flag, for the first value and the second value, the first value may be set to 1, and the second value may be set to 0. Alternatively, the first value may be set to true, and the second value may be set to false, which is not limited in embodiments of the disclosure.

It may be further noted that, the fourth syntax element flag information may be referred to as a sequence-level flag. The decoder first decodes to obtain the sequence-level flag. If the value of sps_nnlf_enable_flag is true, it indicates that the preset network model-based in-loop filtering technology is enabled for a current bitstream, and a related syntax element needs to be parsed out in a subsequent decoding process. Otherwise, it indicates that the preset network model-based in-loop filtering technology is disabled for the current bitstream, and the related syntax element does not need to be parsed out in the subsequent decoding process, where the related syntax element is set to an initial value or a false state by default.

Further, in embodiments of the disclosure, the preset network model may be a neural network model, and the neural network model at least includes a convolutional layer, an activation layer, a concatenation layer, and a skip-connection layer.

It may be noted that, an input to the preset network model may include the reconstructed value of the to-be-filtered component (represented by rec_yuv), the quantization parameter value of the luma colour component (represented by BaseQPluma), and the quantization parameter value of the chroma colour component (represented by Base-QPchroma). An output of the preset network model may be the filtered reconstructed value of the to-be-filtered component (represented by output_yuv). In embodiments of the disclosure, since insignificant input elements such as prediction YUV information and YUV information with partition information are omitted, the calculation amount of inference of the network model can be reduced, which is conducive to the implementation of the decoding end and reducing decoding time. In addition, in embodiments of the disclosure, the input to the preset network model may further include the quantization parameter of the current picture (SliceQP), but SliceQP is not different for the luma colour component and the chroma colour component.

It may be further noted that for the preset network model, a main structure of its network is similar to that illustrated in FIG. 2 or FIG. 4. The main structure also includes multiple residual blocks, and the structure of the residual block is illustrated in detail in FIG. 3.

Figure 7:
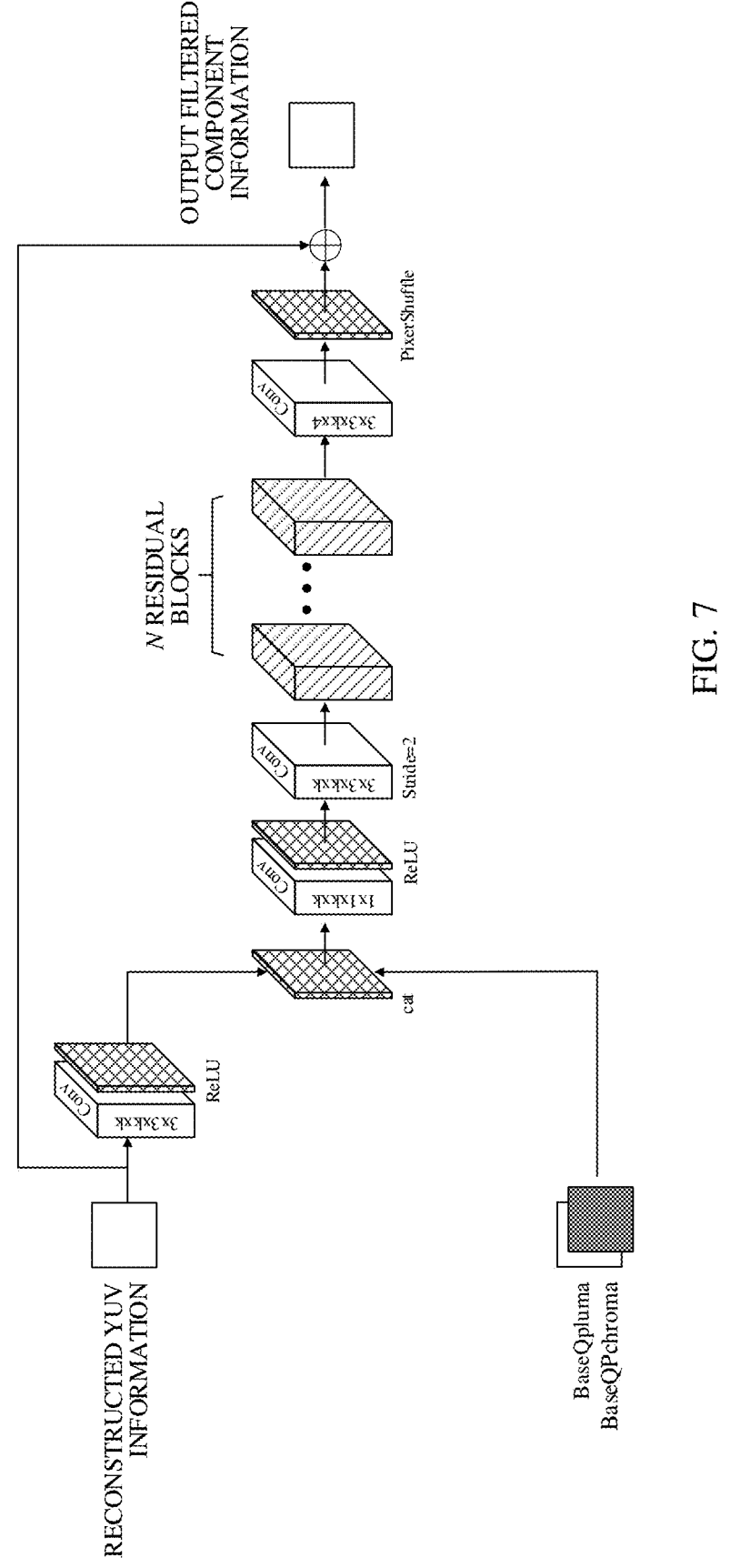
FIG. 7 is a schematic diagram of a network architecture of a neural network model provided in embodiments of the disclosure.

Exemplarily, FIG. 7 is a schematic diagram of a network architecture of a neural network model provided in embodiments of the disclosure. As illustrated in FIG. 7, at an input end, the reconstructed value of the to-be-filtered component is subjected to operations of the convolutional layer and the activation layer, and then is concatenated with the quantization parameter value of the luma colour component and the quantization parameter value of the chroma colour component, and thereafter a concatenation structure is input into the main structure. In addition, a skip-connection structure also exists herein, which connects the input reconstructed value of the to-be-filtered component to an output from a pixel shuffle module, and finally the filtered reconstructed value of the to-be-filtered component is output. Specifically, in FIG. 7, an input to the network architecture mainly includes reconstructed YUV information (rec_yuv), BaseQPluma, and BaseQPchroma, and an output of the network architecture is output filtered component information (output_yuv).

In view of this, an in-loop filtering technology based on a neural network model with multiple BaseQPs as inputs is proposed in embodiments of the disclosure. The main idea is that BaseQPluma of one channel is input for the luma colour component and BaseQPchroma of one channel is also input for the chroma colour component, while the number of models remains the same. As such, in embodiment of the disclosure, by increasing the calculation amount of inference, more information can be provided for the luma colour component and the chroma colour component without an increase in the number of models, and more choices and adaptations can also be provided for the luma colour component and the chroma colour component.

Further, in some embodiments, an input to the preset network model is the reconstructed value of the to-be-filtered component of the current block and the block quantization parameter information of the current block. The method may further include the following. It is determined that an output of the preset network model is the filtered reconstructed value of the to-be-filtered component of the current block.

Further, in some embodiments, an input to the preset network model is the reconstructed value of the to-be-filtered component of the current block and the block quantization parameter information of the current block, and an output of the preset network model may also be residual information. As illustrated in FIG. 8, the method may further include the following.

At S801, the reconstructed value of the to-be-filtered component of the current block is determined, the reconstructed value of the to-be-filtered component of the current block and the block quantization parameter information of the current block are input into the preset network model, and a first residual value of the to-be-filtered component of the current block is output through the preset network model.

At S802, the filtered reconstructed value of the to-be-filtered component of the current block is determined according to the reconstructed value of the to-be-filtered component of the current block and the first residual value of the to-be-filtered component of the current block.

It may be noted that in embodiments of the disclosure, the output of the preset network model may be the filtered reconstructed value of the to-be-filtered component of the current block, or may also be the first residual value of the to-be-filtered component of the current block. For the latter, the decoder needs to further add the reconstructed value of the to-be-filtered component of the current block to the first residual value of the to-be-filtered component of the current block, so as to determine the filtered reconstructed value of the to-be-filtered component of the current block.

It may be further noted that in embodiments of the disclosure, a scaling process may be added at an output end of the preset network model, that is, the first residual value of the to-be-filtered component is scaled according to a residual-scaling factor. Therefore, in some embodiments, as illustrated in FIG. 9, the method may further include the following.

At S901, the bitstream is parsed to determine a residual-scaling factor.

At S902, a second residual value of the to-be-filtered component of the current block is obtained by scaling the first residual value of the to-be-filtered component of the current block according to the residual-scaling factor.

At S903, the filtered reconstructed value of the to-be-filtered component of the current block is determined according to the reconstructed value of the to-be-filtered component of the current block and the second residual value of the to-be-filtered component of the current block.

It may be noted that, if the output of the preset network model is residual information, the residual information needs to be added to a reconstructed sample of the current block and then is used as an output of a preset network model-based in-loop filtering tool. If the output of the preset network model is a whole reconstructed sample, the output of the model is the output of the preset network model-based in-loop filtering tool. However, in a possible embodiment, scaling is further needed for the output of the model. For example, when the output of the model is the residual information, the preset network model makes an inference to output the residual information of the current block, and the residual information is scaled and then added to the reconstructed sample of the current block. This residual-scaling factor is obtained by the encoder, and needs to be signalled into the bitstream and transmitted to the decoder, so that the decoder can obtain the residual-scaling factor through decoding.

Further, in some embodiments, the method may further include the following. Parsing the bitstream to determine the second syntax element flag information of the to-be-filtered component of the current block is repeated by traversing the at least one partition block in the current picture and sequentially taking each of the at least one partition block as the current block, to obtain a filtered reconstructed value of each of the at least one partition block. A reconstructed picture of the current picture is determined according to the filtered reconstructed value of each of the at least one partition block.

It may be noted that for the current picture, the current picture may include the at least one partition block. Then, by traversing these partition blocks and sequentially taking each partition block as the current block, the decoding method of embodiments of the disclosure is repeated to obtain a filtered reconstructed value of each partition block. A reconstructed picture of the current picture can be determined according to these obtained filtered reconstructed values. In addition, it may be noted that, the decoder may further traverse other in-loop filtering tools and output a whole reconstructed picture after completion, and the specific process is not closely related to embodiments of the disclosure, which will not be elaborated herein.

Further, in some embodiments, quality requirements for video coding in I frame and B frame are different, and higher coding quality is often required for I frame to facilitate B frame for reference. Therefore, in I frame and B frame, the decoding method of embodiments of the disclosure only allows B frame to use different quantization parameters (BaseQPluma and BaseQPchroma) of the luma component and the chroma component as the input, while for I frame, the same quantization parameters of the luma component and the chroma component are used as the input. In this way, not only the coding time can be reduced, but also the bit overhead for transmission of the quantization parameters in I frame can be reduced, further improving compression efficiency.

Further, in some embodiments, embodiments of the disclosure add only one layer of chroma quantization parameters as additional inputs. In addition, quantization parameters can be added for the Cb colour component and the Cr colour component as additional inputs, respectively.

Further, in some embodiments, the neural network model-based in-loop filtering enhancement method proposed in embodiments of the disclosure may be further extended to other inputs, such as boundary strength, which is not limited in embodiments of the disclosure.

A decoding method is provided in embodiments of the disclosure. A bitstream is parsed to determine first syntax element flag information of a to-be-filtered component of a current picture. When the first syntax element flag information indicates that there is a to-be-filtered component of a partition block in the current picture that is allowed to be filtered by using a preset network model, the bitstream is parsed to determine second syntax element flag information of a to-be-filtered component of a current block. When the second syntax element flag information indicates that the to-be-filtered component of the current block is to be filtered by using the preset network model, block quantization parameter information of the current block is determined, where the block quantization parameter information at least includes a block quantization parameter value of a first colour component and a block quantization parameter value of a second colour component. Then, a reconstructed value of the to-be-filtered component of the current block is determined, and a filtered reconstructed value of the to-be-filtered component of the current block is determined by inputting the reconstructed value of the to-be-filtered component of the current block and the block quantization parameter information of the current block into the preset network model. As such, since an input to the preset network model includes only the reconstructed value of the to-be-filtered component and the block quantization parameter information and omits insignificant input elements such as partition information and prediction information of a colour component, the calculation amount of inference of the network model can be reduced, which is conducive to the implementation of the decoding end and reducing decoding time. In addition, since the input block quantization parameter information at least includes block quantization parameter values of two colour components, that is, multi-channel quantization parameters are used as inputs, more choices and adaptations can be provided for a luma colour component and a chroma colour component. Furthermore, by means of introducing new syntax elements, the decoding end can achieve more flexible configuration without storing multiple neural network models, which can improve the coding performance and thus improve the coding efficiency.

In another embodiment of the disclosure, based on the decoding method described in the foregoing embodiments, reference is made to FIG. 10 which is a schematic flowchart of an encoding method provided in embodiments of the disclosure. As illustrated in FIG. 10, the method may include the following.

At S1001, first syntax element flag information of a to-be-filtered component of a current picture is determined.

It may be noted that in embodiments of the disclosure, the method is applied to an encoder, and specifically to a neural network model-based in-loop filtering method. More specifically, the method may be an in-loop filtering method based on a neural network model with multiple quantization parameters as inputs.

It may be further noted that in embodiments of the disclosure, the first syntax element flag information is a picture-level syntax element, which may indicate whether there is a to-be-filtered component of a partition block in the current picture that is allowed to be filtered by using a preset network model. In addition, the current picture may include at least one partition block, and a current block is any one of the at least one partition block. That is to say, the first syntax element flag information can be used to determine whether any to-be-filtered component of the at least one partition block in the current picture is not allowed to be filtered by using the preset network model.

Exemplarily, in embodiments of the disclosure, the to-be-filtered component may refer to a colour component. The colour component may include at least one of a first colour component, a second colour component, or a third colour component. The first colour component may be a luma colour component, and the second colour component and the third colour component may be chroma colour components (for example, the second colour component is a blue chroma colour component and the third colour component is a red chroma colour component; alternatively, the second colour component is the red chroma colour component and the third colour component is the blue chroma colour component).

Further, for the current picture, picture-level syntax element flag information of the to-be-filtered component of the current picture may include the first syntax element flag information and third syntax element flag information. Before the first syntax element flag information is determined, the encoder first needs to determine the third syntax element flag information of the to-be-filtered component of the current picture. In some embodiments, the first syntax element flag information of the to-be-filtered component of the current picture is determined as follows. Third syntax element flag information of the to-be-filtered component of the current picture is determined. When the third syntax element flag information indicates that not all to-be-filtered components of the at least one partition block in the current picture are to be filtered by using the preset network model, the first syntax element flag information of the to-be-filtered component of the current picture is determined.

In embodiments of the disclosure, the third syntax element flag information indicates whether all to-be-filtered components of the at least one partition block in the current picture are to be filtered by using the preset network model, and the first syntax element flag information indicates whether there is a to-be-filtered component of a partition block in the current picture that is allowed to be filtered by using the preset network model. Exemplarily, if the to-be-filtered component is the luma colour component, the first syntax element flag information may be ph_nnlf_luma_enable_flag, and the third syntax element flag information may be ph_nnlf_luma_ctrl_flag. If the to-be-filtered component is the chroma colour component, the first syntax element flag information may be ph_nnlf_chroma_enable_flag, and the third syntax element flag information may be ph_nnlf_chroma_ctrl_flag. That is to say, different first syntax element flag information is correspondingly set for different colour components of the current picture.

In embodiments of the disclosure, whether all to-be-filtered components of the at least one partition block in the current picture are to be filtered by using the preset network model can be determined in a distortion manner, and/or whether there is a to-be-filtered component of a partition block in the current picture that is allowed to be used by using the preset network model can be determined in the distortion manner. Exemplarily, the distortion manner herein may be a rate-distortion cost manner. After rate-distortion cost values in different cases are calculated, whether all to-be-filtered components of the at least one partition block in the current picture are to be filtered by using the preset network model is determined according to the magnitude of the rate-distortion cost values, that is, a value of the third syntax element flag information is determined; and/or whether there is a to-be-filtered component of a partition block in the current picture that is allowed to be used by using the preset network model is determined according to the magnitude of the rate-distortion cost values, that is, that is, a value of the first syntax element flag information is determined.

In a specific embodiment, the method may further include the following. A first rate-distortion cost value for which any to-be-filtered component of the at least one partition block in the current picture is not to be filtered by using the preset network model is determined. A second rate-distortion cost value for which all to-be-filtered components of the at least one partition block in the current picture are to be filtered by using the preset network model is determined. A third rate-distortion cost value for which there is a to-be-filtered component of a partition block in the current picture that is allowed to be filtered by using the preset network model is determined. Picture-level syntax element flag information of the to-be-filtered component of the current picture is determined according to the first rate-distortion cost value, the second rate-distortion cost value, and the third rate-distortion cost value, where the picture-level syntax element flag information includes the first syntax element flag information and the third syntax element flag information.

It may be noted that in embodiments of the disclosure, for the at least one partition block in the current picture, there may be three cases for a to-be-filtered component(s). First, all to-be-filtered components of the at least one partition block are to be filtered by using the preset network model. Second, any to-be-filtered component of the at least one partition block is not to be filtered by using the preset network model. Third, there is a to-be-filtered component of a part of the at least one partition block that is to be filtered by using the preset network model.

As such, for the above three cases, the rate-distortion cost manner can be used to calculate the first rate-distortion cost value for which any to-be-filtered component of the at least one partition block is not to be filtered by using the preset network model, the second rate-distortion cost value for which all to-be-filtered components of the at least one partition block are to be filtered by using the preset network model, and the third rate-distortion cost value for which there is a to-be-filtered component of a part of the at least one partition block that is allowed to be filtered by using the preset network model. Then, the value of the first syntax element flag information and the value of the third syntax element flag information are determined according to the magnitude of the three rate-distortion cost values.

In some embodiments, for the third syntax element flag information, the picture-level syntax element flag information of the to-be-filtered component of the current picture is determined according to the first rate-distortion cost value, the second rate-distortion cost value, and the third rate-distortion cost value as follows. If the second rate-distortion cost value is the minimum among the first rate-distortion cost value, the second rate-distortion cost value, and the third rate-distortion cost value, a value of the third syntax element flag information is set to a first value. If the first rate-distortion cost value or the third rate-distortion cost value is the minimum among the first rate-distortion cost value, the second rate-distortion cost value, and the third rate-distortion cost value, the value of the third syntax element flag information is set to a second value.

Accordingly, in some embodiments, the method may further include the following. The value of the third syntax element flag information is encoded, and obtained encoded bits are signalled into a bitstream.

It may be noted that in embodiments of the disclosure, if the second rate-distortion cost value is the minimum, it means that all to-be-filtered components of the at least one partition block in the current picture are to be filtered by using the preset network model, and then the value of the third syntax element flag information may be set to the first value. Otherwise, if the first rate-distortion cost value is the minimum or the third rate-distortion cost value is the minimum, it means that not all to-be-filtered components of the at least one partition block in the current picture are to be filtered by using the preset network model, and then the value of the third syntax element flag information may be set to the second value.

It may be further noted that in embodiments of the disclosure, the value of the third syntax element flag information may also be signalled into the bitstream by the encoder, so that subsequently the decoder can determine the third syntax element flag information by parsing the bitstream, and thus determine whether all to-be-filtered components of the at least one partition block in the current picture are to be filtered by using the preset network model.

In some embodiments, for the first syntax element flag information, the picture-level syntax element flag information of the to-be-filtered component of the current picture is determined according to the first rate-distortion cost value, the second rate-distortion cost value, and the third rate-distortion cost value as follows. If the third rate-distortion cost value is the minimum among the first rate-distortion cost value, the second rate-distortion cost value, and the third rate-distortion cost value, a value of the first syntax element flag information is set to a first value. If the first rate-distortion cost value is the minimum among the first rate-distortion cost value, the second rate-distortion cost value, and the third rate-distortion cost value, the value of the first syntax element flag information is set to a second value. Accordingly, in some embodiments, the method may further include the following. The value of the first syntax element flag information is encoded, and obtained encoded bits are signalled into a bitstream.

It may be noted that in embodiment of the disclosure, if the third rate-distortion cost value is the minimum, it means that there is a to-be-filtered component of a partition block in the current picture that is allowed to be filtered by using the preset network model, and then the value of the first syntax element flag information may be set to the first value. Otherwise, if the first rate-distortion cost value is the minimum, it means that any to-be-filtered component of the at least one partition block in the current picture is not to be filtered by using the preset network model, and then the value of the first syntax element flag information may be set to the second value.

It may be further noted that in embodiments of the disclosure, the value of the first syntax element flag information may be signalled into the bitstream by the encoder, so that subsequently the decoder can determine the first syntax element flag information by parsing the bitstream, and thus determine whether there is a to-be-filtered component of a partition block in the current picture that is allowed to be filtered by using the preset network model.

In embodiments of the disclosure, the first value is different from the second value, and the first value and the second value may be in parameter form or in numerical form. Specifically, the first syntax element flag information and the third syntax element flag information each may be parameters written in a profile, or may be a value of a flag, which is not limited herein.

Exemplarily, in embodiments of the disclosure, when the second syntax element flag information is a flag, for the first value and the second value, the first value may be set to 1, and the second value may be set to 0. Alternatively, the first value may be set to true, and the second value may be set to false, which is not limited in embodiments of the disclosure.

It may be understood that in embodiments of the disclosure, for calculation of the first rate-distortion cost value, the first rate-distortion cost value for which any to-be-filtered component of the at least one partition block in the current picture is not to be filtered by using the preset network model is determined as follows. An original value of a to-be-filtered component of the at least one partition block in the current picture is determined, and a reconstructed value of the to-be-filtered component of the at least one partition block in the current picture is determined. The first rate-distortion cost value is obtained by performing rate-distortion cost calculation according to the original value of the to-be-filtered component of the at least one partition block in the current picture and the reconstructed value of the to-be-filtered component of the at least one partition block in the current picture.

It may be noted that, the encoder may first calculate cost information for which the preset network model is not used for the current picture. That is, the encoder may calculate a first rate-distortion cost value according to an original picture sample of the current block and a reconstructed sample of the current block prepared as an input to the preset network model, which may be represented by costOrg.

It may be further noted that for a reconstructed value of a to-be-filtered component of each partition block, in some embodiments, the reconstructed value of the to-be-filtered component of the at least one partition block in the current picture is determined as follows. An original picture of the to-be-filtered component of the current picture is determined. The original value of the to-be-filtered component of the at least one partition block is obtained by partitioning the original picture. A prediction value of the to-be-filtered component of the at least one partition block is determined by performing intra or inter prediction on the at least one partition block. An initial residual value of the to-be-filtered component of the at least one partition block is obtained according to the original value of the to-be-filtered component of the at least one partition block and the prediction value of the to-be-filtered component of the at least one partition block. A target residual value of the to-be-filtered component of the at least one partition block is obtained by transforming and quantizing the initial residual value of the to-be-filtered component of the at least one partition block. A reconstructed residual value of the to-be-filtered component of the at least one partition block is obtained by inversely quantizing and inversely transforming the target residual value of the to-be-filtered component of the at least one partition block. The reconstructed value of the to-be-filtered component of the at least one partition block is determined according to the prediction value of the to-be-filtered component of the at least one partition block and the reconstructed residual value of the to-be-filtered component of the at least one partition block.

In embodiments of the disclosure, for determining the reconstructed value of the to-be-filtered component of the at least one partition block according to the prediction value of the to-be-filtered component of the at least one partition block and the reconstructed residual value of the to-be-filtered component of the at least one partition block, the reconstructed value of the to-be-filtered component of the at least one partition block may be specifically determined by adding the prediction value of the to-be-filtered component of the at least one partition block to the reconstructed residual value of the to-be-filtered component of the at least one partition block.

In embodiments of the disclosure, the target residual value may also be signalled into the bitstream, so that subsequently the decoder can obtain the target residual value through decoding. Then, the target residual value is subjected to inverse quantization and inverse transform to obtain the reconstructed residual value, and thus the reconstructed value of the to-be-filtered component of the partition block can be determined. In some embodiments, the method may further include the following. The target residual value of the to-be-filtered component of the at least one partition block is encoded, and obtained encoded bits into are signalled into a bitstream.

It may be further noted that in embodiments of the disclosure, for the at least one partition block, taking the current block as an example, a prediction value of the to-be-filtered component of the current block is first determined. Then, an initial residual value of the to-be-filtered component of the current block is obtained according to an original value of the to-be-filtered component of the current block and the prediction value of the to-be-filtered component of the current block. Next, a target residual value of the to-be-filtered component of the current block is obtained by transforming and quantizing the initial residual value of the to-be-filtered component of the current block. Further, a reconstructed residual value of the to-be-filtered component of the current block is obtained by inversely quantizing and inversely transforming the target residual value of the to-be-filtered component of the current block. Finally, the reconstructed value of the to-be-filtered component of the current block can be determined according to the prediction value of the to-be-filtered component of the current block and the reconstructed residual value of the to-be-filtered component of the current block, specifically by adding the prediction value of the to-be-filtered component of the current block to the reconstructed residual value of the to-be-filtered component of the current block.

It may be further understood that in embodiments of the disclosure, for calculation of the second rate-distortion cost value, the second rate-distortion cost value for which all to-be-filtered components of the at least one partition block in the current picture are to be filtered by using the preset network model is determined as follows. At least two quantization parameter combinations are determined, where each of the at least two quantization parameter combinations at least includes one candidate quantization parameter value of the first colour component and one candidate quantization parameter value of the second colour component. For each of the at least two quantization parameter combinations, a filtered reconstructed value of a to-be-filtered component of the at least one partition block in the current picture is obtained by filtering a reconstructed value of the to-be-filtered component of the at least one partition block in the current picture based on the preset network model. For each of the at least two quantization parameter combinations, a fourth rate-distortion cost value is obtained by performing rate-distortion cost calculation according to an original value of the to-be-filtered component of the at least one partition block in the current picture and the filtered reconstructed value of the to-be-filtered component of the at least one partition block in the current picture. A minimum rate-distortion cost value is selected from the obtained fourth rate-distortion cost values, and the second rate-distortion cost value is determined according to the minimum rate-distortion cost value.

It may be noted that in embodiments of the disclosure, taking four quantization parameter combinations as an example, the encoder may traverse the four quantization parameter combinations respectively by using the preset network model-based in-loop filtering technology. The encoder inputs quantization parameters and the reconstructed sample YUV of the current block into a loaded preset network model for inference, and a reconstructed sample block of the current block is output from the preset network model. Accordingly, for the four quantization parameter combinations, fourth rate-distortion cost values are calculated according to the original picture sample of the current block and the reconstructed sample of the current block that is in-loop filtered by using the preset network model, which are represented by costFrame1, costFrame2, costFrame3, and costFrame4, respectively. The minimum rate-distortion cost value is selected from costFrame1, costFrame2, costFrame3, and costFrame4, and the selected fourth rate-distortion cost value is determined as the final second rate-distortion cost value, which is represented by costFrameBest.

Further, in some embodiments, the method may further include the following. A quantization parameter combination corresponding to the minimum rate-distortion cost value is determined as picture quantization parameter information of the current picture. Accordingly, when the second rate-distortion cost value is the minimum among the first rate-distortion cost value, the second rate-distortion cost value, and the third rate-distortion cost value, the method may further include the following. After the value of the third syntax element flag information is encoded, the picture quantization parameter information of the current picture is further encoded, and obtained encoded bits are signalled into a bitstream.

It may be further noted that in embodiments of the disclosure, the minimum rate-distortion cost value is selected from costFrame1, costFrame2, costFrame3, and costFrame4, and a quantization parameter combination corresponding to the selected minimum rate-distortion cost value is determined as picture quantization parameter information of the current picture. In this way, after the value of the third syntax element flag information is encoded, the picture quantization parameter information of the current picture may be further encoded and then signalled into the bitstream.

Further, in some embodiments, for the quantization parameter combinations, the at least two quantization parameter combinations are determined as follows. A first quantization parameter candidate set and a second quantization parameter candidate set are determined. The at least two quantization parameter combinations are determined by traversing the first quantization parameter candidate set and the second quantization parameter candidate set. The first quantization parameter candidate set includes at least two candidate quantization parameter values of the first colour component, and the second quantization parameter candidate set includes at least two candidate quantization parameter values of the second colour component.

It may be noted that in embodiments of the disclosure, if there are four quantization parameter combinations, then the first quantization parameter candidate set may include two candidate quantization parameters of the luma colour component, and the second quantization parameter candidate set may include two candidate quantization parameters of the chroma colour component. The two candidate quantization parameters of the luma colour component and the two candidate quantization parameters of the chroma colour component may be combined to obtain the four quantization parameter combinations.

Further, in some embodiments, the picture quantization parameter information of the current picture is encoded and the obtained encoded bits are signalled into the bitstream as follows. A picture quantization parameter value of the first colour component and a picture quantization parameter value of the second colour component are determined according to the picture quantization parameter information of the current picture. A third quantization parameter index is determined according to the first quantization parameter candidate set and the picture quantization parameter value of the first colour component. A fourth quantization parameter index is determined according to the second quantization parameter candidate set and the picture quantization parameter value of the second colour component. The third quantization parameter index and the fourth quantization parameter index are encoded, and obtained encoded bits are signalled into the bitstream.

It may be further noted that in embodiments of the disclosure, the third quantization parameter index indicates an index number of the picture quantization parameter value of the first colour component in the first quantization parameter candidate set, and the fourth quantization parameter index indicates an index number of the picture quantization parameter value of the second colour component in the second quantization parameter candidate set.

As such, after the third quantization parameter index is determined according to the first quantization parameter candidate set and the fourth quantization parameter index is determined according to the second quantization parameter candidate set, the third quantization parameter index and the fourth quantization parameter index need to be signalled into the bitstream. Subsequently, the decoder does not need to perform rate-distortion cost calculation, and can obtain the third quantization parameter index and the fourth quantization parameter index by parsing the bitstream, so as to determine the picture quantization parameter information of the current picture, i.e., the picture quantization parameter value of the first colour component and the picture quantization parameter value of the second colour component. Exemplarily, a picture quantization parameter value of the luma colour component may be represented by ph_nnlf_luma_baseqp, and a picture quantization parameter value of the chroma colour component may be represented by ph_nnlf_chroma_baseqp.

It may be further noted that in embodiments of the disclosure, for the same picture, the first quantization parameter candidate set may be the same, and the second quantization parameter candidate set may be the same. Different pictures may correspond to different first quantization parameter candidate sets respectively, and different pictures may also correspond to different second quantization parameter candidate sets respectively.

At S1002, when the first syntax element flag information indicates that there is a to-be-filtered component of a partition block in the current picture that is allowed to be filtered by using a preset network model, second syntax element flag information of a to-be-filtered component of a current block is determined.

It may be noted that in embodiments of the disclosure, if the first syntax element flag information is true, the first syntax element flag information indicates that there is a to-be-filtered component of a partition block in the current picture that is allowed to be filtered by using the preset network model, and then the encoder needs to further determine the second syntax element flag information of the to-be-filtered component of the current block. In addition, the current picture includes at least one partition block, and the current block herein refers to a current partition block for which in-loop filtering is to be performed, which may be any one of the at least one partition block in the current picture. Herein, the current block may be a current coding unit, a current prediction unit, a current transform unit, or even a current CTU, etc. The current CTU will be taken as an example below for illustration.

It may be further noted that in embodiments of the disclosure, the second syntax element flag information is a CTU-level syntax element, which may indicate whether the to-be-filtered component of the current block is to be filtered by using the preset network model. The second syntax element flag information may also be referred to as a CTU usage flag. That is to say, the second syntax element flag information can be used to determine whether a to-be-filtered component of the current CTU is to be filtered by using the preset network model or not.

Exemplarily, if the to-be-filtered component is the luma colour component, the second syntax element flag information may be ctb_nnlf_luma_flag. If the to-be-filtered component is the chroma colour component, the second syntax element flag information may be ctb_nnlf_chroma_flag. That is to say, different second syntax element flag information is correspondingly set for different colour components of the current CTU. Specifically, the encoder may first determine third syntax element flag information of the to-be-filtered component. When the third syntax element flag information indicates that not all to-be-filtered components of the at least one partition block in the current picture are to be filtered by using the preset network model, the encoder needs to further determine a value of the first syntax element flag information. Only when the first syntax element flag information indicates that there is a to-be-filtered component of a partition block in the current picture that is allowed to be filtered by using the preset network model, the encoder may further determine a value of the second syntax element flag information.

In a specific embodiment, the method may further include the following. An original value of the to-be-filtered component of the current block and the reconstructed value of the to-be-filtered component of the current block are determined based on the current block in the current picture. For the at least two quantization parameter combinations, at least two filtered reconstructed values of the to-be-filtered component of the current block are obtained by filtering the reconstructed value of the to-be-filtered component of the current block based on the preset network model. A fifth rate-distortion cost value is obtained by performing rate-distortion cost calculation according to the original value of the to-be-filtered component of the current block and the reconstructed value of the to-be-filtered component of the current block. At least two sixth rate-distortion cost values are obtained by performing rate-distortion cost calculation according to the original value of the to-be-filtered component of the current block and one of the at least two filtered reconstructed values of the to-be-filtered component of the current block and according to the original value of the to-be-filtered component of the current block and the other one of the at least two filtered reconstructed values of the to-be-filtered component of the current block. The second syntax element flag information of the to-be-filtered component of the current block is determined according to the fifth rate-distortion cost value and the at least two sixth rate-distortion cost values.

It may be noted that in embodiments of the disclosure, for the current block, the encoder may make an attempt on optimized selection at the CTU level. For the to-be-filtered component, a fifth rate-distortion cost value between a reconstructed sample that is not in-loop filtered by using the preset network model and an original sample of the current block needs to be calculated, which may be represented by costCTUorg. In addition, for multiple BaseQPluma and BaseQPchroma combinations, fifth rate-distortion cost values between a reconstructed sample that is in-loop filtered by using the preset network model and the original sample of the current block need to be calculated, which may be represented by costCTUnn1, costCTUnn2, costCTUnn3, and costCTUnn4, respectively. Then, the value of the second syntax element flag information can be determined according to the magnitude of the rate-distortion cost values costCTUorg, costCTUnn1, costCTUnn2, costCTUnn3, and costCTUnn4.

Further, in some embodiments, for the third syntax element flag information, the second syntax element flag information of the to-be-filtered component of the current block is determined according to the fifth rate-distortion cost value and the at least two sixth rate-distortion cost values as follows. A minimum rate-distortion cost value is selected from the fifth rate-distortion cost value and the at least two sixth rate-distortion cost values. If the minimum rate-distortion cost value is one of the at least two sixth rate-distortion cost values, a value of the second syntax element flag information is set to a first value. If the minimum rate-distortion cost value is the fifth rate-distortion cost value, the value of the second syntax element flag information is set to a second value.

Accordingly, in some embodiments, the method may further include the following. The value of the second syntax element flag information is encoded, and obtained encoded bits are signalled into the bitstream.

It may be noted that in embodiments of the disclosure, if the fifth rate-distortion cost value is the minimum, it means that the to-be-filtered component of the current block is not to be filtered by using the preset network model, and then the value of the second syntax element flag information may be set to the second value. Otherwise, if a certain sixth rate-distortion cost value is the minimum, it means that the to-be-filtered component of the current block is to be filtered by using the preset network model, and then the value of the second syntax element flag information may be set to the first value.

It may be further noted that in embodiments of the disclosure, the value of the second syntax element flag information may also be signalled into the bitstream by the encoder, so that subsequently the decoder can determine the second syntax element flag information by parsing the bitstream, and thus determine whether the current block in the current picture is to be filtered by using the preset network model.

In embodiments of the disclosure, the first value is different from the second value, and the first value and the second value may be in parameter form or in numerical form. Specifically, the second syntax element flag information may be parameters written in a profile, or may be a value of a flag, which is not limited herein.

Exemplarily, in embodiments of the disclosure, when the second syntax element flag information is a flag, for the first value and the second value, the first value may be set to 1, and the second value may be set to 0. Alternatively, the first value may be set to true, and the second value may be set to false, which is not limited in embodiments of the disclosure.

At S1003, when the second syntax element flag information indicates that the to-be-filtered component of the current block is to be filtered by using the preset network model, block quantization parameter information of the current block is determined. The block quantization parameter information at least includes a block quantization parameter value of a first colour component and a block quantization parameter value of a second colour component.

At S1004, a reconstructed value of the to-be-filtered component of the current block is determined, and a filtered reconstructed value of the to-be-filtered component of the current block is determined by inputting the reconstructed value of the to-be-filtered component of the current block and the block quantization parameter information of the current block into the preset network model.

It may be noted that in embodiments of the disclosure, when the second syntax element flag information indicates that the to-be-filtered component of the current block is to be filtered by using the preset network model, for the block quantization parameter information of the current block, the method may further include the following. When the minimum rate-distortion cost value is one of the at least two sixth rate-distortion cost values, a quantization parameter combination corresponding to the minimum rate-distortion cost value is determined as the block quantization parameter information of the current block. Accordingly, the method may further include the following. After the value of the second syntax element flag information is encoded, the block quantization parameter information of the current block is further encoded, and obtained encoded bits are signalled into the bitstream.

Herein, the minimum rate-distortion cost value is selected from costCTUorg, costCTUnn1, costCTUnn2, costCTUnn3, and costCTUnn4, and a BaseQPluma and BaseQPchroma combination (i.e., a combination of BaseQPluma and BaseQPchroma) corresponding to the selected minimum rate-distortion cost value is determined as the block quantization parameter information of the current block. In this way, after the value of the second syntax element flag information is encoded, the block quantization parameter information of the current block may be further encoded and then signalled into the bitstream.

In a specific embodiment, in terms of encoding the block quantization parameter information of the current block and signalling the obtained encoded bits into the bitstream, the method may further include the following. The block quantization parameter value of the first colour component and the block quantization parameter value of the second colour component are determined according to the block quantization parameter information of the current block. A first quantization parameter index is determined according to a first quantization parameter candidate set and the block quantization parameter value of the first colour component, where the first quantization parameter index indicates an index number of the block quantization parameter value of the first colour component in the first quantization parameter candidate set. A second quantization parameter index is determined according to a second quantization parameter candidate set and the block quantization parameter value of the second colour component, where the second quantization parameter index indicates an index number of the block quantization parameter value of the second colour component in the second quantization parameter candidate set. The first quantization parameter index and the second quantization parameter index are encoded, and obtained encoded bits are signalled into the bitstream.

It may be noted that in embodiments of the disclosure, the first quantization parameter candidate set may include at least two candidate quantization parameters of the luma colour component, and the second quantization parameter candidate set may include at least two candidate quantization parameters of the chroma colour component. Exemplarily, the two candidate quantization parameters of the luma colour component and the two candidate quantization parameters of the chroma colour component may be combined to obtain four quantization parameter combinations. In addition, for the same picture, the first quantization parameter candidate set may be the same, and the second quantization parameter candidate set may be the same. Different pictures may correspond to different first quantization parameter candidate sets respectively, and different pictures may also correspond to different second quantization parameter candidate sets respectively.

As such, for block quantization parameters of the current block, after the first quantization parameter index is determined according to the first quantization parameter candidate set and the second quantization parameter index is determined according to the second quantization parameter candidate set, the first quantization parameter index and the second quantization parameter index need to be signalled into the bitstream. Subsequently, the decoder does not need to perform rate-distortion cost calculation, and can obtain the first quantization parameter index and the second quantization parameter index by parsing the bitstream, so as to determine the block quantization parameter information of the current block, i.e., the block quantization parameter value of the first colour component and the block quantization parameter value of the second colour component. Exemplarily, a block quantization parameter value of the luma colour component may be represented by ctb_nnlf_luma_baseqp, and a block quantization parameter value of the chroma colour component may be represented by ctb_nnlf_chroma_baseqp.

It may be further understood that in embodiments of the disclosure, new syntax elements are introduced herein, for example, the first syntax element flag information, second syntax element flag information, and third syntax element flag information, etc., of the to-be-filtered component. In some embodiments, the to-be-filtered component at least includes a luma colour component and a chroma colour component, and the method may further include the following. When a colour component type of the current picture is the luma colour component, it is determined that the third syntax element flag information is picture-level luma switch flag information of the current picture, the first syntax element flag information is picture-level luma enable flag information of the current picture, and the second syntax element flag information is block-level luma usage flag information of the current block. The picture-level luma switch flag information indicates whether all luma colour components of the at least one partition block in the current picture are to be filtered by using the preset network model, the picture-level luma enable flag information indicates whether there is a luma colour component of a partition block in the current picture that is allowed to be filtered by using the preset network model, and the block-level luma usage flag information indicates whether a luma colour component of the current block is to be filtered by using the preset network model. When the colour component type of the current picture is the chroma colour component, it is determined that the third syntax element flag information is picture-level chroma switch flag information of the current picture, the first syntax element flag information is picture-level chroma enable flag information of the current picture, and the second syntax element flag information is block-level chroma usage flag information of the current block. The picture-level chroma switch flag information indicates whether all chroma colour components of the at least one partition block in the current picture are to be filtered by using the preset network model, the picture-level chroma enable flag information indicates whether there is a chroma colour component of a partition block in the current picture that is allowed to be filtered by using the preset network model, and the block-level chroma usage flag information indicates whether a chroma colour component of the current block is to be filtered by using the preset network model.

Herein, for the luma colour component, the picture-level luma switch flag information may be represented by ph_nnlf_luma_ctrl_flag, the picture-level luma enable flag information may be represented by ph_nnlf_luma_enable_flag, and the block-level luma usage flag information may be represented by ctb_nnlf_luma_flag. For the chroma colour component, the picture-level chroma switch flag information may be represented by ph_nnlf_chroma_ctrl_flag, the picture-level chroma enable flag information may be represented by ph_nnlf_chroma_enable_flag, and the block-level chroma usage flag information may be represented by ctb_nnlf_chroma_flag.

Further, in embodiments of the disclosure, a sequence-level syntax element may also be set to determine whether the NN-based in-loop filtering technology is allowed for a current sequence. The method may further include the following. Fourth syntax element flag information is determined. When the fourth syntax element flag information indicates that a to-be-filtered component of a current sequence is allowed to be filtered by using the preset network model, proceed to determining the third syntax element flag information of the to-be-filtered component of the current picture. The current sequence includes the current picture.

It may be noted that in embodiments of the disclosure, the fourth syntax element flag information is the sequence-level syntax element, which may indicate whether the to-be-filtered component of the current sequence is allowed to be filtered by using the preset network model. The fourth syntax element flag information may be represented by sps_nnlf_enable_flag. If at least one of the luma colour component or the chroma colour component of the current sequence is allowed to be filtered by using the preset network model, then it means that a value of sps_nnlf_enable_flag is true, that is, the to-be-filtered component of the current sequence is allowed to be filtered by using the preset network model. If any one of the luma colour component and the chroma colour component of the current sequence is not allowed to be filtered by using the preset network model, then it means that the value of sps_nnlf_enable_flag is false, that is, the to-be-filtered component of the current sequence is not allowed to be filtered by using the preset network model.

In a specific embodiment, the fourth syntax element flag information is determined as follows. Whether the to-be-filtered component of the current sequence is allowed to be filtered by using the preset network model is determined. If the to-be-filtered component of the current sequence is allowed to be filtered by using the preset network model, a value of the fourth syntax element flag information is set to a first value. If the to-be-filtered component of the current sequence is not allowed to be filtered by using the preset network model, the value of the fourth syntax element flag information is set to a second value. Accordingly, the method further includes the following. The value of the fourth syntax element flag information is encoded, and obtained encoded bits are signalled into a bitstream.

In embodiments of the disclosure, the first value is different from the second value, and the first value and the second value may be in parameter form or in numerical form. Exemplarily, when the fourth syntax element flag information is a flag, for the first value and the second value, the first value may be set to 1, and the second value may be set to 0. Alternatively, the first value may be set to true, and the second value may be set to false, which is not limited in embodiments of the disclosure.

It may be further noted that, the fourth syntax element flag information may be referred to as a sequence-level flag. In the encoder, if the sequence-level flag is true, the NN-based in-loop filtering technology is enabled. If the sequence-level flag is false, the NN-based in-loop filtering technology is disabled. The sequence-level flag needs to be signalled into the bitstream during encoding of a video sequence.

Further, in embodiments of the disclosure, the preset network model is a neural network model, and the neural network model at least includes a convolutional layer, an activation layer, a concatenation layer, and a skip-connection layer.

It may be noted that, as illustrated in FIG. 7, an input to the preset network model may include the reconstructed value of the to-be-filtered component (represented by rec_yuv), the quantization parameter value of the luma colour component (represented by BaseQPluma), and the quantization parameter value of the chroma colour component (represented by BaseQPchroma). An output of the preset network model may be the filtered reconstructed value of the to-be-filtered component (represented by output_yuv). In embodiments of the disclosure, since insignificant input elements such as prediction YUV information and YUV information with partition information are omitted, the calculation amount of inference of the network model can be reduced, which is conducive to the implementation of the decoding end and reducing decoding time. In addition, it may be further noted that in embodiments of the disclosure, the input to the preset network model may further include the quantization parameter of the current picture (SliceQP), but SliceQP is not different for the luma colour component and the chroma colour component (not illustrated in FIG. 7).

In view of this, an in-loop filtering technology based on a neural network model with multiple BaseQPs as inputs is proposed in embodiments of the disclosure. The main idea is that BaseQPluma of one channel is input for the luma colour component and BaseQPchroma of one channel is also input for the chroma colour component, while the number of models remains the same. As such, in embodiment of the disclosure, by increasing the calculation amount of inference, more information can be provided for the luma colour component and the chroma colour component without an increase in the number of models, and more choices and adaptations can also be provided for the luma colour component and the chroma colour component.

Further, in some embodiments, an input to the preset network model is the reconstructed value of the to-be-filtered component of the current block and the block quantization parameter information of the current block. The method may further include the following. It is determined that an output of the preset network model is the filtered reconstructed value of the to-be-filtered component of the current block.

Further, in some embodiments, an input to the preset network model is the reconstructed value of the to-be-filtered component of the current block and the block quantization parameter information of the current block, and an output of the preset network model may also be residual information. The method may further include the following. It is determined that an output of the preset network model is a first residual value of the to-be-filtered component of the current block.

Accordingly, for S1004, the filtered reconstructed value of the to-be-filtered component of the current block is determined as follows. After the first residual value of the to-be-filtered component of the current block is obtained through the preset network model, the filtered reconstructed value of the to-be-filtered component of the current block is determined according to the reconstructed value of the to-be-filtered component of the current block and the first residual value of the to-be-filtered component of the current block.

It may be noted that in embodiments of the disclosure, the output of the preset network model may be the filtered reconstructed value of the to-be-filtered component of the current block, or may also be the first residual value of the to-be-filtered component of the current block. For the latter, the encoder needs to further add the reconstructed value of the to-be-filtered component of the current block to the first residual value of the to-be-filtered component of the current block, so as to determine the filtered reconstructed value of the to-be-filtered component of the current block.

It may be further noted that in embodiments of the disclosure, a scaling process may be added at an output end of the preset network model, that is, the first residual value of the to-be-filtered component is scaled according to a residual-scaling factor. Therefore, in some embodiments, the method may further include the following. A residual-scaling factor is determined. Accordingly, for S1004, the filtered reconstructed value of the to-be-filtered component of the current block is determined as follows. A second residual value of the to-be-filtered component of the current block is obtained by scaling the first residual value of the to-be-filtered component of the current block according to the residual-scaling factor. The filtered reconstructed value of the to-be-filtered component of the current block is determined according to the reconstructed value of the to-be-filtered component of the current block and the second residual value of the to-be-filtered component of the current block.

Further, in some embodiments, the method may further include the following. The residual-scaling factor is encoded, and obtained encoded bits are signalled into a bitstream.

It may be noted that, if the output of the preset network model is residual information, the residual information needs to be added to a reconstructed sample of the current block and then is used as an output of a preset network model-based in-loop filtering tool. If the output of the preset network model is a whole reconstructed sample, the output of the model is the output of the preset network model-based in-loop filtering tool. However, in a possible embodiment, scaling is further needed for the output of the model. For example, when the output of the model is the residual information, the preset network model makes an inference to output the residual information of the current block, the residual information is scaled and then added to the reconstructed sample of the current block. This residual-scaling factor may be obtained by the encoder, and needs to be signalled into the bitstream and transmitted to the decoder, so that subsequently the decoder can obtain the residual-scaling factor through decoding.

Further, in some embodiments, the method may further include the following. Determining the second syntax element flag information of the to-be-filtered component of the current block is repeated by traversing the at least one partition block in the current picture and sequentially taking each of the at least one partition block as the current block, to obtain a filtered reconstructed value of each of the at least one partition block. A reconstructed picture of the current picture is determined according to the filtered reconstructed value of each of the at least one partition block.

It may be noted that for the current picture, the current picture may include the at least one partition block. Then, by traversing these partition blocks and sequentially taking each partition block as the current block, the encoding method of embodiments of the disclosure is repeated to obtain a filtered reconstructed value of each partition block. A reconstructed picture of the current picture can be determined according to these obtained filtered reconstructed values. In addition, it may be noted that, the encoder may further traverse other in-loop filtering tools and output a whole reconstructed picture after completion, and the specific process is not closely related to embodiments of the disclosure, which will not be elaborated herein.

Further, in some embodiments, quality requirements for video coding in I frame and B frame are different, and higher coding quality is often required for I frame to facilitate B frame for reference. Therefore, in I frame and B frame, the decoding method of embodiments of the disclosure only allows B frame to use different quantization parameters (BaseQPluma and BaseQPchroma) of the luma component and the chroma component as the input, while for I frame, the same quantization parameters of the luma component and the chroma component are used as the input. In this way, not only the coding time can be reduced, but also the bit overhead for transmission of the quantization parameters in I frame can be reduced, further improving compression efficiency.

Further, in some embodiments, embodiments of the disclosure add only one layer of chroma quantization parameters as additional inputs. In addition, quantization parameters can be added for the Cb colour component and the Cr colour component as additional inputs, respectively.

Further, in some embodiments, the neural network model-based in-loop filtering enhancement method proposed in embodiments of the disclosure may be further extended to other inputs, such as boundary strength, which is not limited in embodiments of the disclosure.

An encoding method is provided in embodiments of the disclosure. First syntax element flag information of a to-be-filtered component of a current picture is determined. When the first syntax element flag information indicates that there is a to-be-filtered component of a partition block in the current picture that is allowed to be filtered by using a preset network model, second syntax element flag information of a to-be-filtered component of a current block is determined, where the current picture includes at least one partition block, and the current block is any one of the at least one partition block. When the second syntax element flag information indicates that the to-be-filtered component of the current block is to be filtered by using the preset network model, block quantization parameter information of the current block is determined, where the block quantization parameter information at least includes a block quantization parameter value of a first colour component and a block quantization parameter value of a second colour component. A reconstructed value of the to-be-filtered component of the current block is determined, and a filtered reconstructed value of the to-be-filtered component of the current block is determined by inputting the reconstructed value of the to-be-filtered component of the current block and the block quantization parameter information of the current block into the preset network model. As such, since an input to the preset network model includes only the reconstructed value of the to-be-filtered component and the block quantization parameter information and omits insignificant input elements such as partition information and prediction information of a colour component, the calculation amount of inference of the network model can be reduced, which is conducive to the implementation of the decoding end and reducing decoding time. In addition, since the input block quantization parameter information at least includes block quantization parameter values of two colour components, that is, multi-channel quantization parameters are used as inputs, more choices and adaptations can be provided for a luma colour component and a chroma colour component. Furthermore, by means of introducing new syntax elements, the decoding end can achieve more flexible configuration without storing multiple neural network models, which can improve the coding performance and thus improve the coding efficiency.

In yet another embodiment of the disclosure, based on the decoding method and the encoding method described in the foregoing embodiments, an in-loop filtering technology based on a neural network model with multiple BaseQPs as inputs is proposed in embodiments of the disclosure. The main idea is that BaseQPluma of one channel is input for the luma colour component and BaseQPchroma of one channel is also input for the chroma colour component, while the number of models remains the same. In embodiment of the disclosure, by increasing the calculation amount of inference, more information can be provided for the luma colour component and the chroma colour component without an increase in the number of models, and more choices can also be provided for the encoding end.

Exemplarily, FIG. 7 is a schematic diagram of a network architecture of a neural network model with multiple BaseQPs as inputs provided in embodiments of the disclosure. Specifically, taking the neural network model illustrated in FIG. 7 as an example of the preset network model, the encoding end may provide multiple BaseQPluma and BaseQPchroma candidate combinations. For each candidate combination, for a CTU or a coding unit, the candidate combination is input into a current neural network model, inference is made to calculate a filtered reconstructed sample block, and a corresponding rate-distortion cost value is obtained. A reconstructed sample block corresponding to a candidate combination with the minimum rate-distortion cost value is selected as an output sample of a current filtering technology, and a BaseQPluma and BaseQPchroma candidate combination corresponding to the minimum rate-distortion cost value is recorded. The BaseQPluma and BaseQPchroma candidate combination is signalled into the bitstream through a quantization parameter index or direct binarization and transmitted to the decoding end. The decoding end parses the bitstream to obtain an NN-based in-loop filtering usage flag of the current CTU or coding unit, and obtains the above BaseQPluma and BaseQPchroma candidate combination through parsing and calculation. If the NN-based in-loop filtering technology is to be used, the final BaseQPluma and BaseQPchroma candidate combination is determined as a quantization parameter of the current CTU or coding unit and input into the neural network model, and a reconstructed sample output from the neural network model is obtained as the output sample of the current filtering technology.

In a specific embodiment, at the encoding end, the process proceeds as follows.

The encoder obtains a prediction block of each coding unit through intra or inter prediction, and obtains a residual of the coding unit by subtracting the prediction block from an original picture block. The residual is transformed into a frequency-domain residual coefficient in various transform modes, which is then subjected to quantization, inverse quantization, and inverse transformation to generate distorted residual information (i.e., the reconstructed residual value described in the foregoing embodiments). The distorted residual information is added to the prediction block to obtain a reconstructed block. After a picture is encoded, an in-loop filtering module filters the picture by taking the CTU level as a basic unit, and the technical solution of embodiments of the disclosure is applied herein. A neural network model-based in-loop filtering enable flag, i.e., sps_nnlf_enable_flag, is obtained. If the flag is true, the neural network model-based in-loop filtering technology is enabled. If the flag is false, the neural network model-based in-loop filtering technology is disabled. A sequence-level enable flag may need to be signalled into the bitstream during encoding of a video sequence.

Step 1, if the neural network model-based in-loop filtering enable flag is true, the encoding end uses the neural network model-based in-loop filtering technology, i.e., performs step 2. If the neural network model-based in-loop filtering enable flag is false, the encoding end does not use the neural network model-based in-loop filtering technology, i.e., skips step 2 and directly performs step 3.

Step 2, the NN-based in-loop filtering technology is initialized, and a neural network model applicable to a current picture is loaded.

First Round

The encoding end calculates cost information for which the neural network model-based in-loop filtering technology is not used. That is, the encoding end calculates a rate-distortion cost value according to an original picture sample of a CTU and a reconstructed sample of the CTU prepared as an input to the neural network model, which is represented by costOrg.

Second Round

The encoding end traverses two luma quantization parameter candidates and two chroma quantization parameter candidates respectively by using the neural network model-based in-loop filtering technology. The encoding end inputs quantization parameters and the reconstructed sample YUV of the current CTU into a loaded neural network model for inference, and a reconstructed sample block of the current CTU is output from the neural network model. For respective quantization parameter combinations, rate-distortion cost values are calculated according to an original picture sample of the CTU and a reconstructed sample of the CTU that is in-loop filtered by using the neural network model, which are represented by costFrame1, costFrame2, costFrame3, and costFrame4, respectively. A combination with the minimum cost is selected as the optimal output in the second round, where the cost is represented by costFrameBest, and corresponding luma and chroma quantization parameters are recorded.

Third Round

The encoding end makes an attempt on optimized selection at the CTU level. For the neural network model-based in-loop filtering at the encoding end in the second round, the technology is to be used for all CTUs in the current picture by default. A picture-level switch flag is used for each of the luma colour component and the chroma colour component for control, while a usage flag does not need to be transmitted at the CTU level. In this round, a flag combination at the CTU level is used, and each colour component can be controlled separately. By traversing the CTUs, the encoder calculates a rate-distortion cost value between a reconstructed sample that is not in-loop filtered by using the neural network model and an original sample of the current CTU, which is represented by costCTUorg. In addition, for multiple BaseQPluma and BaseQPchroma combinations, the encoder calculates rate-distortion cost values between a reconstructed sample that is in-loop filtered by using the neural network model and the original sample of the current CTU, which are represented by costCTUnn1, costCTUnn2, costCTUnn3, and costCTUnn4, respectively.

For the luma colour component, if costCTUorg of a current luma colour component is smaller than any costC-TUnn of the luma colour component, then a neural network model-based in-loop filtering CTU-level usage flag (ctb_nnlf_luma_flag) of the luma colour component is set to false. Otherwise, ctb_nnlf_luma_flag is set to true, and a current quantization parameter index of BaseQPluma is recorded at the same time.

For the chroma colour component, if costCTUorg of a current chroma colour component is smaller than any costC-TUnn of the chroma colour component, then a neural network model-based in-loop filtering CTU-level usage flag (ctb_nnlf_chroma_flag) of the chroma colour component is set to false. Otherwise, ctb_nnlf_chroma_flag is set to true, and a current quantization parameter index of Base-QPchroma is recorded at the same time.

If all the CTUs in the current picture have been traversed, a rate-distortion cost value between a reconstructed sample of the current picture and an original picture sample is calculated in this case, which is represented by costC-TUBest.

For each colour component, if the value of costOrg is the minimum, a neural network model-based in-loop filtering picture-level switch flag of the colour component is set to false and signalled into the bitstream. If the value of costFrameBest is the minimum, the neural network model-based in-loop filtering picture-level switch flag (ph_nnlf_luma_ctrl_flag/ph_nnlf_chroma_ctrl_flag) of the colour component is set to true, and the recorded optimal BaseQPluma and BaseQPchroma quantization parameter combination is also signalled into the bitstream. If the value of costC-TUBest is the minimum, then a neural network model-based in-loop filtering picture-level enable flag of the colour component is set to true, the neural network model-based in-loop filtering picture-level switch flag is set to false, and the optimal BaseQPluma and BaseQPchroma quantization parameter combination and the CTU-level usage flag determined in the third round are also signalled into the bitstream.

Step 3, the encoder continues to use other in-loop filtering tools and outputs a whole reconstructed picture after completion. The specific process is not related to the technical solution of embodiments of the disclosure, which will not be elaborated herein.

In another specific embodiment, at the decoding end, the process proceeds as follows.

The decoding end parses out a sequence-level flag. If sps_nnlf_enable_flag is true, it indicates that the neural network model-based in-loop filtering technology is enabled for a current bitstream, and a related syntax element needs to be parsed out in a subsequent decoding process. Otherwise, it indicates that the neural network model-based in-loop filtering technology is disabled for the current bitstream, and the related syntax element does not need to be parsed out in the subsequent decoding process, where the related syntax element is set to an initial value or a false state by default.

Step 1, the decoder parses out a syntax element of a current picture to obtain a neural network model-based picture-level switch flag and picture-level enable flag. If the picture-level flags are not both false, perform step 2. Otherwise, skip step 2 and perform step 3.

Step 2, if the picture-level switch flag is true, it indicates that for a current colour component, all CTUs are to be filtered by using the neural network model-based in-loop filtering technology, that is, a CTU-level usage flag of each CTU in the current picture is automatically set to true for the colour component. Otherwise, it indicates that for the current colour component, there is some CTUs for which the neural network model-based in-loop filtering technology is to be used, and there are also some CTUs for which the neural network model-based in-loop filtering technology is not to be used. Therefore, if the picture-level switch flag is false, then for the colour component, the CTU-level usage flag (ctb_nnlf_luma_flag/ctb_nnlf_chroma_flag) of each CTU in the current picture needs to be further parsed out.

If ph_nnlf_luma_ctrl_flag or ph_nnlf_chroma_ctrl_flag is true, the value of BaseQPluma (ph_nnlf_luma_baseqp) and the value of BaseQPchroma (ph_nnlf_chroma_baseqp) of the current picture are parsed out and are applied to all CTUs for the colour component of the current picture as the input quantization parameter information. In addition, ph_nnlf_luma_enable_flag or ph_nnlf_chroma_enable_flag and the CTU-level usage flag ctb_nnlf_luma_flag or ctb_nnlf_chroma_flag of each CTU in the current picture is set to true, and otherwise, ph_nnlf_luma_enable_flag/ph_nnlf_chroma_enable_flag are parsed out.

If ph_nnlf_luma_enable_flag/ph_nnlf_chroma_enable_flag is false, then the CTU-level usage flag of each CTU in the current picture is set to false. Otherwise, BaseQPluma (ctb_nnlf_luma_baseqp) or BaseQPchroma (ctb_nnlf_chroma_baseqp) of the current CTU and the CTU-level usage flag of each CTU for the corresponding colour component may be parsed out.

If CTU-level usage flags of all colour components of the current CTU are not all false, the current CTU is to be filtered by using the neural network model-based in-loop filtering technology. With the quantization parameter information (BaseQPluma and BaseQPchroma) and the reconstructed sample YUV of the current CTU as inputs, the reconstructed sample YUV of the current CTU that is in-loop filtered by using the neural network model can be obtained through inference of the neural network model.

According to a CTU usage flag of each colour component of the current CTU, a reconstructed sample is selected as an output of the neural network model-based in-loop filtering technology. If a CTU usage flag of a corresponding colour component is true, a reconstructed sample of the corresponding colour component that is in-loop filtered by using the neural network model is used as the output. Otherwise, a reconstructed sample that is not subjected to neural network model-based in-loop filtering is used as the output for the colour component.

After all the CTUs in the current picture are traversed, a neural network model-based in-loop filtering module ends.

Step 3, the decoding end continues to traverse other in-loop filtering tools and outputs a whole reconstructed picture after completion. The specific process is not related to the technical solution of embodiments of the disclosure, which will not be elaborated herein.

In yet another specific embodiment, a parsing process at the decoding end is illustrated in Table 1, where syntax elements to be parsed out are represented in a bold font.

TABLE 1

```
if (sps_nnlf_enable_flag)
{
    ph_nnlf_luma_ctrl_flag                              ae(v)
    ph_nnlf_chroma_ctrl_flag                            ae(v)
    if (ph_nnlf_luma_ctrl_flag)
    {
        ph_nnlf_luma_baseqp                             ae(v)
        ph_nnlf_luma_enable_flag = 1
        for (traverse all ctbs)
        {
            ctb_nnlf_luma_flag = 1
            ctb_nnlf_luma_baseqp = ph_nnlf_luma_baseqp
        }
    } else {
        ph_nnlf_luma_enable_flag                        ae(v)
    }
    if (ph_nnlf_chroma_ctrl_flag)
    {
        ph_nnlf_chroma_baseqp                           ae(v)
        ph_nnlf_chroma_enable_flag = 1
        for (traverse all ctbs)
        {
            ctb_nnlf_chroma_flag = 1
            ctb_nnlf_chroma_baseqp = ph_nnlf_chroma_baseqp
        }
    } else {
        ph_nnlf_chroma_enable_flag                      ae(v)
    }
    if (ph_nnlf_luma_enable_flag)
    {
        for (traverse all ctbs)
        {
            ctb_nnlf_luma_flag                          ae(v)
            ctb_nnlf_luma_baseqp                        ae(v)
        }
    } else {
        for (traverse all ctbs)
        {
            ctb_nnlf_luma_flag = 0
        }
    }
    if (ph_nnlf_chroma_enable_flag)
    {
        for (traverse all ctbs)
        {
            ctb_nnlf_chroma_flag                        ae(v)
            ctb_nnlf_chroma_baseqp                      ae(v)
        }
    } else {
        for (traverse all ctbs)
        {
            ctb_nnlf_chroma_flag = 0
        }
    }
} // sps
```

The residual-scaling is not described in detail in all the above embodiments, which does not mean that the residual-scaling technology cannot be used in embodiments of the disclosure. Specifically, for use of the residual-scaling technology for the output of the neural network model, a residual obtained according to a difference between an original reconstructed sample and a reconstructed sample output from a neural network may be scaled, which will not be elaborated herein.

In yet another embodiment of the disclosure, a bitstream is provided in embodiments of the disclosure. The bitstream is generated by performing bit encoding according to to-be-encoded information. The to-be-encoded information may include at least one of: first syntax element flag information of a to-be-filtered component of a current picture, second syntax element flag information of a to-be-filtered component of a current block, third syntax element flag information of the to-be-filtered component of the current picture, a residual-scaling factor, or an initial residual value of a to-be-filtered component of at least one partition block in the current picture. The current picture includes the at least one partition block, and the current block is any one of the at least one partition block.

In embodiments of the disclosure, the specific implementations are elaborated through the above embodiments. As can be seen from the technical solution of the above embodiments, a new NN in-loop filtering model is proposed in embodiments of the disclosure, in which multi-channel quantization parameters are used as inputs to improve the coding performance and new syntax elements are introduced. As such, in case of only one model or few models, by increasing channels of important input elements, more choices and adaptations can be provided for the luma colour component and the chroma colour component. Through the rate-distortion optimization calculation at the encoding end, the decoding end can achieve more flexible configuration without storing multiple neural network models, which is conducive to improving the coding performance. In addition, in the technical solution, since insignificant input elements such as prediction information YUV and partition information YUV are omitted, the calculation amount of inference of the network model can be reduced, which is conducive to the implementation of the decoding end and reducing decoding time.

In yet another embodiment of the disclosure, based on the same inventive concept of the foregoing embodiments, reference is made to FIG. 11 which is a schematic structural diagram of an encoder provided in embodiments of the disclosure. As illustrated in FIG. 11, the encoder 100 may include a first determining unit 1101 and a first filtering unit 1102. The first determining unit 1101 is configured to determine first syntax element flag information of a to-be-filtered component of a current picture. The first determining unit 1101 is further configured to determine second syntax element flag information of a to-be-filtered component of a current block, when the first syntax element flag information indicates that there is a to-be-filtered component of a partition block in the current picture that is allowed to be filtered by using a preset network model, where the current picture includes at least one partition block, and the current block is any one of the at least one partition block. The first determining unit 1101 is further configured to determine block quantization parameter information of the current block, when the second syntax element flag information indicates that the to-be-filtered component of the current block is to be filtered by using the preset network model, where the block quantization parameter information at least includes a block quantization parameter value of a first colour component and a block quantization parameter value of a second colour component. The first determining unit 1101 is further configured to determine a reconstructed value of the to-be-filtered component of the current block. The first filtering unit 1102 is configured to determine a filtered reconstructed value of the to-be-filtered component of the current block by inputting the reconstructed value of the to-be-filtered component of the current block and the block quantization parameter information of the current block into the preset network model.

In some embodiments, the first determining unit 1101 is further configured to determine third syntax element flag information of the to-be-filtered component of the current picture. The first determining unit 1101 is further configured to determine the first syntax element flag information of the to-be-filtered component of the current picture, when the third syntax element flag information indicates that not all to-be-filtered components of the at least one partition block in the current picture are to be filtered by using the preset network model.

In some embodiments, the first determining unit 1101 is further configured to determining a first rate-distortion cost value for which any to-be-filtered component of the at least one partition block in the current picture is not to be filtered by using the preset network model. The first determining unit 1101 is further configured to determine a second rate-distortion cost value for which all to-be-filtered components of the at least one partition block in the current picture are to be filtered by using the preset network model. The first determining unit 1101 is further configured to determine a third rate-distortion cost value for which there is a to-be-filtered component of a partition block in the current picture that is allowed to be filtered by using the preset network model. The first determining unit 1101 is further configured to determine picture-level syntax element flag information of the to-be-filtered component of the current picture according to the first rate-distortion cost value, the second rate-distortion cost value, and the third rate-distortion cost value, where the picture-level syntax element flag information includes the first syntax element flag information and the third syntax element flag information.

In some embodiments, as illustrated in FIG. 11, the encoder 100 may further include a first setting unit 1103 and an encoding unit 1104. The first setting unit 1103 is configured to set a value of the third syntax element flag information to a first value, when the second rate-distortion cost value is the minimum among the first rate-distortion cost value, the second rate-distortion cost value, and the third rate-distortion cost value. The first setting unit 1103 is further configured to set the value of the third syntax element flag information to a second value, when the first rate-distortion cost value or the third rate-distortion cost value is the minimum among the first rate-distortion cost value, the second rate-distortion cost value, and the third rate-distortion cost value. The encoding unit 1104 is configured to encode the value of the third syntax element flag information and signal obtained encoded bits into a bitstream.

In some embodiments, the first setting unit 1103 is further configured to set a value of the first syntax element flag information to a first value, when the third rate-distortion cost value is the minimum among the first rate-distortion cost value, the second rate-distortion cost value, and the third rate-distortion cost value. The first setting unit 1103 is further configured to set the value of the first syntax element flag information to a second value, when the first rate-distortion cost value is the minimum among the first rate-distortion cost value, the second rate-distortion cost value, and the third rate-distortion cost value. The encoding unit 1104 is further configured to encode the value of the first syntax element flag information and signal obtained encoded bits into a bitstream.

In some embodiments, the first determining unit 1101 is further configured to determine an original value of a to-be-filtered component of the at least one partition block in the current picture, and determine a reconstructed value of the to-be-filtered component of the at least one partition block in the current picture. The first determining unit 1101 is further configured to obtain the first rate-distortion cost value by performing rate-distortion cost calculation according to the original value of the to-be-filtered component of the at least one partition block in the current picture and the reconstructed value of the to-be-filtered component of the at least one partition block in the current picture.

In some embodiments, the first determining unit 1101 is further configured to determine an original picture of the to-be-filtered component of the current picture. The first determining unit 1101 is further configured to obtain the original value of the to-be-filtered component of the at least one partition block by partitioning the original picture. The first determining unit 1101 is further configured to determine a prediction value of the to-be-filtered component of the at least one partition block by performing intra or inter prediction on the at least one partition block. The first determining unit 1101 is further configured to obtain an initial residual value of the to-be-filtered component of the at least one partition block according to the original value of the to-be-filtered component of the at least one partition block and the prediction value of the to-be-filtered component of the at least one partition block. The first determining unit 1101 is further configured to obtain a target residual value of the to-be-filtered component of the at least one partition block by transforming and quantizing the initial residual value of the to-be-filtered component of the at least one partition block. The first determining unit 1101 is further configured to obtain a reconstructed residual value of the to-be-filtered component of the at least one partition block by inversely quantizing and inversely transforming the target residual value of the to-be-filtered component of the at least one partition block. The first determining unit 1101 is further configured to determine the reconstructed value of the to-be-filtered component of the at least one partition block according to the prediction value of the to-be-filtered component of the at least one partition block and the reconstructed residual value of the to-be-filtered component of the at least one partition block.

In some embodiments, the encoding unit 1104 is further configured to encode the target residual value of the to-be-filtered component of the at least one partition block, and signal obtained encoded bits into a bitstream.

In some embodiments, the first determining unit 1101 is further configured to determine at least two quantization parameter combinations, where each of the at least two quantization parameter combinations at least includes one candidate quantization parameter value of the first colour component and one candidate quantization parameter value of the second colour component. The first determining unit 1101 is further configured to: for each of the at least two quantization parameter combinations, obtain a filtered reconstructed value of a to-be-filtered component of the at least one partition block in the current picture by filtering a reconstructed value of the to-be-filtered component of the at least one partition block in the current picture based on the preset network model. The first determining unit 1101 is further configured to: for each of the at least two quantization parameter combinations, obtain a fourth rate-distortion cost value by performing rate-distortion cost calculation according to an original value of the to-be-filtered component of the at least one partition block in the current picture and the filtered reconstructed value of the to-be-filtered component of the at least one partition block in the current picture. The first determining unit 1101 is further configured to select a minimum rate-distortion cost value from the obtained fourth rate-distortion cost values, and determine the second rate-distortion cost value according to the minimum rate-distortion cost value.

In some embodiments, the first determining unit 1101 is further configured to determine a quantization parameter combination corresponding to the minimum rate-distortion cost value as picture quantization parameter information of the current picture. The encoding unit 1104 is further configured to encode the picture quantization parameter information of the current picture and signal obtained encoded bits into a bitstream, after the value of the third syntax element flag information is encoded.

In some embodiments, the first determining unit 1101 is further configured to determine a first quantization parameter candidate set and a second quantization parameter candidate set. The first determining unit 1101 is further configured to determine the at least two quantization parameter combinations by traversing the first quantization parameter candidate set and the second quantization parameter candidate set. The first quantization parameter candidate set includes at least two candidate quantization parameter values of the first colour component, and the second quantization parameter candidate set includes at least two candidate quantization parameter values of the second colour component.

In some embodiments, the first determining unit 1101 is further configured to determine a picture quantization parameter value of the first colour component and a picture quantization parameter value of the second colour component according to the picture quantization parameter information of the current picture. The first determining unit 1101 is further configured to determine a third quantization parameter index according to the first quantization parameter candidate set and the picture quantization parameter value of the first colour component, where the third quantization parameter index indicates an index number of the picture quantization parameter value of the first colour component in the first quantization parameter candidate set. The first determining unit 1101 is further configured to determine a fourth quantization parameter index according to the second quantization parameter candidate set and the picture quantization parameter value of the second colour component, where the fourth quantization parameter index indicates an index number of the picture quantization parameter value of the second colour component in the second quantization parameter candidate set. The encoding unit 1104 is further configured to encode the third quantization parameter index and the fourth quantization parameter index, and signal obtained encoded bits into the bitstream.

In some embodiments, the first determining unit 1101 is further configured to determine an original value of the to-be-filtered component of the current block and the reconstructed value of the to-be-filtered component of the current block based on the current block in the current picture. The first determining unit 1101 is further configured to: for the at least two quantization parameter combinations, obtain at least two filtered reconstructed values of the to-be-filtered component of the current block by filtering the reconstructed value of the to-be-filtered component of the current block based on the preset network model. The first determining unit 1101 is further configured to obtain a fifth rate-distortion cost value by performing rate-distortion cost calculation according to the original value of the to-be-filtered component of the current block and the reconstructed value of the to-be-filtered component of the current block. The first determining unit 1101 is further configured to obtain at least two sixth rate-distortion cost values by performing rate-distortion cost calculation according to the original value of the to-be-filtered component of the current block and the at least two filtered reconstructed values of the to-be-filtered component of the current block respectively. The first determining unit 1101 is further configured to determine the second syntax element flag information of the to-be-filtered component of the current block according to the fifth rate-distortion cost value and the at least two sixth rate-distortion cost values.

In some embodiments, the first determining unit 1101 is further configured to select a minimum rate-distortion cost value from the fifth rate-distortion cost value and the at least two sixth rate-distortion cost values. The first determining unit 1101 is further configured to set a value of the second syntax element flag information to a first value, when the minimum rate-distortion cost value is one of the at least two sixth rate-distortion cost values. The first determining unit 1101 is further configured to set the value of the second syntax element flag information to a second value, when the minimum rate-distortion cost value is the fifth rate-distortion cost value. The encoding unit 1104 is further configured to encode the value of the second syntax element flag information, and signal obtained encoded bits into the bitstream.

In some embodiments, the first determining unit 1101 is further configured to determine a quantization parameter combination corresponding to the minimum rate-distortion cost value as the block quantization parameter information of the current block, when the minimum rate-distortion cost value is one of the at least two sixth rate-distortion cost values. The encoding unit 1104 is further configured to encode the block quantization parameter information of the current block and signal obtained encoded bits into the bitstream, after the value of the second syntax element flag information is encoded.

In some embodiments, the first determining unit 1101 is further configured to determine the block quantization parameter value of the first colour component and the block quantization parameter value of the second colour component according to the block quantization parameter information of the current block. The first determining unit 1101 is further configured to determine a first quantization parameter index according to a first quantization parameter candidate set and the block quantization parameter value of the first colour component, where the first quantization parameter index indicates an index number of the block quantization parameter value of the first colour component in the first quantization parameter candidate set. The first determining unit 1101 is further configured to determine a second quantization parameter index according to a second quantization parameter candidate set and the block quantization parameter value of the second colour component, where the second quantization parameter index indicates an index number of the block quantization parameter value of the second colour component in the second quantization parameter candidate set. The encoding unit 1104 is further configured to encode the first quantization parameter index and the second quantization parameter index, and signal obtained encoded bits into the bitstream.

In some embodiments, the to-be-filtered component at least includes a luma colour component and a chroma colour component. Accordingly, the first determining unit 1101 is further configured to determine, when a colour component type of the current picture is the luma colour component, that the third syntax element flag information is picture-level luma switch flag information of the current picture, the first syntax element flag information is picture-level luma enable flag information of the current picture, and the second syntax element flag information is block-level luma usage flag information of the current block. The picture-level luma switch flag information indicates whether all luma colour components of the at least one partition block in the current picture are to be filtered by using the preset network model, the picture-level luma enable flag information indicates whether there is a luma colour component of a partition block in the current picture that is allowed to be filtered by using the preset network model, and the block-level luma usage flag information indicates whether a luma colour component of the current block is to be filtered by using the preset network model. the first determining unit 1101 is further configured to determine, when the colour component type of the current picture is the chroma colour component, that the third syntax element flag information is picture-level chroma switch flag information of the current picture, the first syntax element flag information is picture-level chroma enable flag information of the current picture, and the second syntax element flag information is block-level chroma usage flag information of the current block. The picture-level chroma switch flag information indicates whether all chroma colour components of the at least one partition block in the current picture are to be filtered by using the preset network model, the picture-level chroma enable flag information indicates whether there is a chroma colour component of a partition block in the current picture that is allowed to be filtered by using the preset network model, and the block-level chroma usage flag information indicates whether a chroma colour component of the current block is to be filtered by using the preset network model.

In some embodiments, the first determining unit 1101 is further configured to determine fourth syntax element flag information. The first determining unit 1101 is further configured to proceed to determining the third syntax element flag information of the to-be-filtered component of the current picture, when the fourth syntax element flag information indicates that a to-be-filtered component of a current sequence is allowed to be filtered by using the preset network model, where the current sequence includes the current picture.

In some embodiments, the first determining unit 1101 is further configured to determine whether the to-be-filtered component of the current sequence is allowed to be filtered by using the preset network model. The first determining unit 1101 is further configured to set a value of the fourth syntax element flag information to a first value, when the to-be-filtered component of the current sequence is allowed to be filtered by using the preset network model. The first determining unit 1101 is further configured to set the value of the fourth syntax element flag information to a second value, when the to-be-filtered component of the current sequence is not allowed to be filtered by using the preset network model. The encoding unit 1104 is further configured to encode the value of the fourth syntax element flag information, and signal obtained encoded bits into a bitstream.

In some embodiments, the preset network model is a neural network model, and the neural network model at least includes a convolutional layer, an activation layer, a concatenation layer, and a skip-connection layer.

In some embodiments, an input to the preset network model is the block quantization parameter information and the reconstructed value of the to-be-filtered component of the current block. Accordingly, the first filtering unit 1102 is further configured to determine that an output of the preset network model is the filtered reconstructed value of the to-be-filtered component of the current block.

In some embodiments, an input to the preset network model is the reconstructed value of the to-be-filtered component of the current block and the block quantization parameter information of the current block. Accordingly, the first filtering unit 1102 is further configured to determine that an output of the preset network model is a first residual value of the to-be-filtered component of the current block, and determine the filtered reconstructed value of the to-be-filtered component of the current block according to the reconstructed value of the to-be-filtered component of the current block and the first residual value of the to-be-filtered component of the current block.

In some embodiments, the first determining unit 1101 is further configured to determine a residual-scaling factor. The first determining unit 1101 is further configured to obtain a second residual value of the to-be-filtered component of the current block by scaling the first residual value of the to-be-filtered component of the current block according to the residual-scaling factor. The first determining unit 1101 is further configured to determine the filtered reconstructed value of the to-be-filtered component of the current block according to the reconstructed value of the to-be-filtered component of the current block and the second residual value of the to-be-filtered component of the current block.

In some embodiments, the encoding unit 1104 is further configured to encode the residual-scaling factor, and signal obtained encoded bits into a bitstream.

It may be understood that in embodiments of the disclosure, the "unit" may be part of the circuitry, part of the processor, part of the program or software, etc., and of course may also be a module, or may be non-modular. In addition, various components described in embodiments of the disclosure may be integrated into one processing unit or may be present as a number of physically separated units, or two or more units may be integrated into one. The integrated unit may take the form of hardware or a software functional unit.

If the integrated unit is implemented as a software function module and not sold or used as a stand-alone product, the integrated unit may be stored in a computer-readable storage medium. Based on such understanding, the technical solution of the embodiments in essential, or a part that contributes to the prior art, or all or part of the technical solution, may be embodied in the form of a software product. The computer software product is stored in a storage medium and includes a number of instructions to enable a computer device (which may be a personal computer, a server, or a network device, etc.) or processor to perform all or part of the operations of the method described in the embodiments. The aforementioned storage medium includes a USB stick, a removable hard disk, a read only memory (ROM), a random access memory (RAM), a diskette or a CD-ROM, and other media that may store program codes.

Thus, embodiments of the disclosure provide a computer-readable storage medium, which is applied to the encoder 100 and stores a computer program, the computer program implementing the method described in any of the foregoing embodiments when executed by the first processor.

Figure 12:
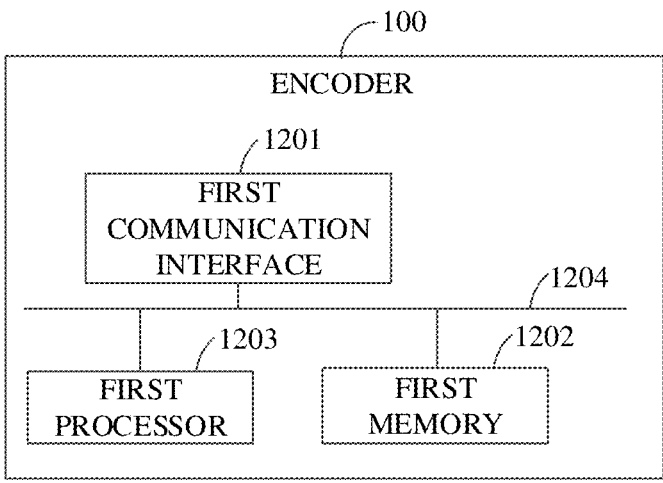
FIG. 12 is a schematic diagram of a specific hardware structure of an encoder provided in embodiments of the disclosure.

Based on the above structure of the encoder 100 and the computer-readable storage medium, reference is made to FIG. 12 which is a schematic diagram of a specific hardware structure of the encoder 100 provided in embodiments of the disclosure. As illustrated in FIG. 12, the encoder 100 may include a first communication interface 1201, a first memory 1202, and a first processor 1203. The components are coupled together via a first bus system 1204. It may be understood that the first bus system 1204 is configured to enable connection and communication between these components. The first bus system 1204 includes a power bus, a control bus, and a status signal bus in addition to a data bus. For the sake of clarity, however, the various buses are labelled as first bus system 1204 in FIG. 12.

The first communication interface 1201 is configured to receive and transmit signals during information transmission with other external network elements.

The first memory 1202 is configured to store a computer program executable by the first processor 1203.

The first processor 1203 is configured to, when executing the computer program, determine first syntax element flag information of a to-be-filtered component of a current picture; determine second syntax element flag information of a to-be-filtered component of a current block, when the first syntax element flag information indicates that there is a to-be-filtered component of a partition block in the current picture that is allowed to be filtered by using a preset network model, where the current picture includes at least one partition block, and the current block is any one of the at least one partition block; determine block quantization parameter information of the current block, when the second syntax element flag information indicates that the to-be-filtered component of the current block is to be filtered by using the preset network model, where the block quantization parameter information at least includes a block quantization parameter value of a first colour component and a block quantization parameter value of a second colour component; and determine a reconstructed value of the to-be-filtered component of the current block, and determine a filtered reconstructed value of the to-be-filtered component of the current block by inputting the reconstructed value of the to-be-filtered component of the current block and the block quantization parameter information of the current block into the preset network model.

It will be appreciated that the first memory 1202 in embodiments of the disclosure may be a transitory memory or non-transitory memory, or may include both transitory and non-transitory memory. In particular, the non-transitory memory may be an ROM, a programmable ROM (PROM), an erasable PROM (EPROM), an electrically EPROM (EE-PROM), or a flash memory. The transitory memory may be an RAM, which is used as an external cache. By way of illustration, but not limitation, many forms of RAM are available, such as a static RAM (SRAM), a dynamic RAM (DRAM), a synchronous DRAM (SDRAM), a double data rate synchronous random access memory (DDRSDRAM), an enhanced SDRAM (ESDRAM), a synchlink DRAM (SLDRAM), and a direct Rambus RAM (DRRAM). The first memory 1202 of the system and method described in this disclosure is intended to include, but is not limited to, these and any other suitable types of memory.

The first processor 1203 may be an integrated circuit chip with signal processing capabilities. During implementation, the operations in the above method may be accomplished by integrated logic circuitry in the hardware of the first processor 1203 or by instructions in the form of software. The first processor 1203 described above may be a general-purpose processor, a digital signal processor (DSP), an application specific integrated circuit (ASIC), a field programmable gate array (FPGA), or other programmable logic device, discrete gate or transistor logic device, discrete hardware component. The various methods, steps and logic block diagrams disclosed in embodiments of the disclosure may be implemented or performed. The general-purpose processor may be a microprocessor or the processor may also be any conventional processor, etc. The operations in the method disclosed in conjunction with embodiments of the disclosure may be performed directly by the hardware decoder processor or by a combination of hardware and software modules in the decoder processor. The software module may be located in a random memory, flash memory, read-only memory, programmable read-only memory or electrically erasable programmable memory, registers and other storage media mature in the art. The storage medium is located in the first memory 1202, and the first processor 1203 reads the information in the first memory 1202 and completes the operations of the above method in combination with its hardware.

It will be appreciated that these embodiments described in this disclosure may be implemented in hardware, software, firmware, middleware, microcode, or combinations thereof. For hardware implementations, the processing unit may be implemented in one or more ASIC, DSP, DSP Device (DSPD), programmable logic device (PLD), FPGA, general-purpose processor, controller, microcontroller, microprocessor, other electronic unit for performing the functions described in this disclosure, or a combination thereof. For software implementations, the technology described in this disclosure may be implemented by means of modules (e.g. procedures, functions, etc.) that perform the functions described in this disclosure. The software code may be stored in a memory and executed by a processor. The memory may be implemented in the processor or outside the processor.

Optionally, as another embodiment, the first processor 1203 is further configured to perform the method described in any of the above embodiments when running the computer program.

An encoder is provided in the embodiments. The encoder can use the in-loop filtering technology based on the preset network model with multiple quantization parameters as inputs. Since an input to the preset network model includes only the reconstructed value of the to-be-filtered component and the block quantization parameter information and omits insignificant input elements such as partition information and prediction information of a colour component, the calculation amount of inference of the network model can be reduced, which is conducive to the implementation of the decoding end and reducing decoding time. In addition, since the input block quantization parameter information at least includes block quantization parameter values of two colour components, that is, multi-channel quantization parameters are used as inputs, more choices and adaptations can be provided for a luma colour component and a chroma colour component. Furthermore, by means of introducing new syntax elements, the decoding end can achieve more flexible configuration without storing multiple neural network models, which can improve the coding performance and thus improve the coding efficiency.

Figure 13:
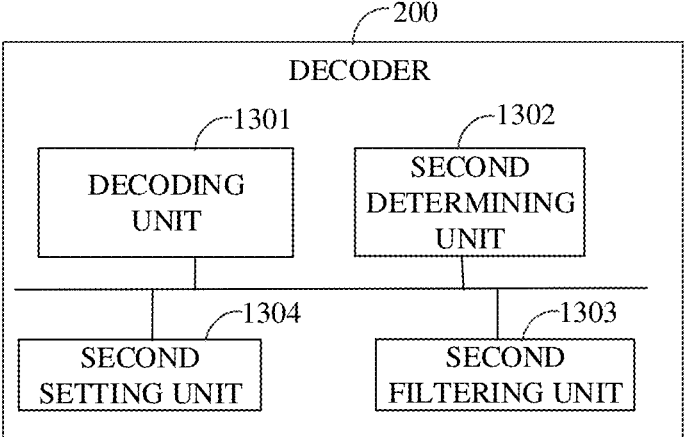
FIG. 13 is a schematic structural diagram of a decoder provided in embodiments of the disclosure.

Based on the same inventive concept of the foregoing embodiments, reference is made to FIG. 13 which is a schematic structural diagram of a decoder provided in embodiments of the disclosure. As illustrated in FIG. 13, the decoder 200 may include a decoding unit 1301, a second determining unit 1302, and a second filtering unit 1303. The decoding unit 1301 is configured to parse a bitstream to determine first syntax element flag information of a to-be-filtered component of a current picture; and parse the bitstream to determine second syntax element flag information of a to-be-filtered component of a current block, when the first syntax element flag information indicates that there is a to-be-filtered component of a partition block in the current picture that is allowed to be filtered by using a preset network model, where the current picture includes at least one partition block, and the current block is any one of the at least one partition block. The second determining unit 1302 is configured to determine block quantization parameter information of the current block, when the second syntax element flag information indicates that the to-be-filtered component of the current block is to be filtered by using the preset network model, where the block quantization parameter information at least includes a block quantization parameter value of a first colour component and a block quantization parameter value of a second colour component. The second determining unit 1302 is further configured to determine a reconstructed value of the to-be-filtered component of the current block. The second filtering unit 1303 is configured to determine a filtered reconstructed value of the to-be-filtered component of the current block by inputting the reconstructed value of the to-be-filtered component of the current block and the block quantization parameter information of the current block into the preset network model.

In some embodiments, the decoding unit 1301 is further configured to parse the bitstream to determine a first quantization parameter index and a second quantization parameter index of the current block. The second determining unit 1302 is further configured to determine, according to the first quantization parameter index, the block quantization parameter value of the first colour component of the current block from a first quantization parameter candidate set. The second determining unit 1302 is further configured to determine, according to the second quantization parameter index, the block quantization parameter value of the second colour component of the current block from a second quantization parameter candidate set. The first quantization parameter candidate set includes at least two candidate quantization parameter values of the first colour component, and the second quantization parameter candidate set includes at least two candidate quantization parameter values of the second colour component.

In some embodiments, the decoding unit 1301 is further configured to parse the bitstream to determine the block quantization parameter value of the first colour component and the block quantization parameter value of the second colour component of the current block.

In some embodiments, the decoding unit 1301 is further configured to parse the bitstream to determine a reconstructed residual value of the to-be-filtered component of the current block. The second determining unit 1302 is further configured to determine a prediction value of the to-be-filtered component of the current block by performing intra or inter prediction on the to-be-filtered component of the current block. The second determining unit 1302 is further configured to determine the reconstructed value of the to-be-filtered component of the current block according to the reconstructed residual value of the to-be-filtered component of the current block and the prediction value of the to-be-filtered component of the current block.

In some embodiments, the second determining unit 1302 is further configured to obtain the reconstructed value of the to-be-filtered component of the current block by adding the reconstructed residual value of the to-be-filtered component of the current block to the prediction value of the to-be-filtered component of the current block.

In some embodiments, the decoding unit 1301 is further configured to parse the bitstream to obtain a value of the second syntax element flag information. The second determining unit 1302 is further configured to determine that the second syntax element flag information indicates that the to-be-filtered component of the current block is to be filtered by using the preset network model, when the value of the second syntax element flag information is a first value. The second determining unit 1302 is further configured to determine that the second syntax element flag information indicates that the to-be-filtered component of the current block is not to be filtered by using the preset network model, when the value of the second syntax element flag information is a second value.

In some embodiments, the second determining unit 1302 is further configured to determine the reconstructed value of the to-be-filtered component of the current block as the filtered reconstructed value of the to-be-filtered component of the current block, when the second syntax element flag information indicates that the to-be-filtered component of the current block is not to be filtered by using the preset network model.

In some embodiments, the decoding unit 1301 is further configured to parse the bitstream to obtain a value of the first syntax element flag information. The second determining unit 1302 is further configured to determine that the first syntax element flag information indicates that there is a to-be-filtered component of a partition block in the current picture that is allowed to be filtered by using the preset network model, when the value of the first syntax element flag information is a first value. The second determining unit 1302 is further configured to determine that the first syntax element flag information indicates that any to-be-filtered component of the at least one partition block in the current picture is not allowed to be filtered by using the preset network model, when the value of the first syntax element flag information is a second value.

In some embodiments, as illustrated in FIG. 13, the decoder 200 may further include a second setting unit 1304. The second setting unit 1304 is configured to set a value of second syntax element flag information of a to-be-filtered component of each of the at least one partition block to a second value, when the first syntax element flag information indicates that any to-be-filtered component of the at least one partition block in the current picture is not allowed to be filtered by using the preset network model. The second setting unit 1304 is configured to determine a reconstructed value of the to-be-filtered component of each of the at least one partition block as a filtered reconstructed value of the to-be-filtered component of each of the at least one partition block, after the reconstructed value of the to-be-filtered component of each of the at least one partition block is determined.

In some embodiments, the decoding unit 1301 is further configured to parse the bitstream to determine third syntax element flag information of the to-be-filtered component of the current picture. The decoding unit 1301 is further configured to parse the bitstream to determine the first syntax element flag information of the to-be-filtered component of the current picture, when the third syntax element flag information indicates that not all to-be-filtered components of the at least one partition block in the current picture are to be filtered by using the preset network model.

In some embodiments, the decoding unit 1301 is further configured to parse the bitstream to obtain a value of the third syntax element flag information. The second determining unit 1302 is further configured to determine that the third syntax element flag information indicates that all to-be-filtered components of the at least one partition block in the current picture are to be filtered by using the preset network model, when the value of the third syntax element flag information is a first value. The second determining unit 1302 is further configured to determine that the third syntax element flag information indicates that not all to-be-filtered components of the at least one partition block in the current picture are to be filtered by using the preset network model, when the value of the third syntax element flag information is a second value.

In some embodiments, the decoding unit 1301 is further configured to parse the bitstream to determine picture quantization parameter information of the current picture, when the third syntax element flag information indicates that all to-be-filtered components of the at least one partition block in the current picture are to be filtered by using the preset network model, where the picture quantization parameter information at least includes a picture quantization parameter value of the first colour component and a picture quantization parameter value of the second colour component. The second setting unit 1304 is further configured to set a value of the first syntax element flag information of the to-be-filtered component of the current picture to a first value, set a value of second syntax element flag information of a to-be-filtered component of each of the at least one partition block in the current picture to the first value, and determine block quantization parameter information of each of the at least one partition block according to the picture quantization parameter information of the current picture. The second filtering unit 1303 is further configured to determine a filtered reconstructed value of the to-be-filtered component of each of the at least one partition block by inputting a reconstructed value of the to-be-filtered component of each of the at least one partition block and the block quantization parameter information of each of the at least one partition block into the preset network model, after the reconstructed value of the to-be-filtered component of each of the at least one partition block is determined.

In some embodiments, the decoding unit 1301 is further configured to parse the bitstream to determine a third quantization parameter index and a fourth quantization parameter index of the current picture. The second determining unit 1302 is further configured to determine, according to the third quantization parameter index, the picture quantization parameter value of the first colour component of the current picture from a first quantization parameter candidate set. The second determining unit 1302 is further configured to determine, according to the fourth quantization parameter index, the picture quantization parameter value of the second colour component of the current picture from a second quantization parameter candidate set. The first quantization parameter candidate set includes at least two candidate quantization parameter values of the first colour component, and the second quantization parameter candidate set includes at least two candidate quantization parameter values of the second colour component.

In some embodiments, the to-be-filtered component at least includes a luma colour component and a chroma colour component. Accordingly, the second determining unit 1302 is further configured to determine, when a colour component type of the current picture is the luma colour component, that the third syntax element flag information is picture-level luma switch flag information of the current picture, the first syntax element flag information is picture-level luma enable flag information of the current picture, and the second syntax element flag information is block-level luma usage flag information of the current block. The picture-level luma switch flag information indicates whether all luma colour components of the at least one partition block in the current picture are to be filtered by using the preset network model, the picture-level luma enable flag information indicates whether there is a luma colour component of a partition block in the current picture that is allowed to be filtered by using the preset network model, and the block-level luma usage flag information indicates whether a luma colour component of the current block is to be filtered by using the preset network model. the second determining unit 1302 is further configured to determine, when the colour component type of the current picture is the chroma colour component, that the third syntax element flag information is picture-level chroma switch flag information of the current picture, the first syntax element flag information is picture-level chroma enable flag information of the current picture, and the second syntax element flag information is block-level chroma usage flag information of the current block. The picture-level chroma switch flag information indicates whether all chroma colour components of the at least one partition block in the current picture are to be filtered by using the preset network model, the picture-level chroma enable flag information indicates whether there is a chroma colour component of a partition block in the current picture that is allowed to be filtered by using the preset network model, and the block-level chroma usage flag information indicates whether a chroma colour component of the current block is to be filtered by using the preset network model.

In some embodiments, the decoding unit 1301 is further configured to parse the bitstream to determine fourth syntax element flag information. The decoding unit 1301 is further configured to proceed to parsing the bitstream to determine the third syntax element flag information of the to-be-filtered component of the current picture, when the fourth syntax element flag information indicates that a to-be-filtered component of a current sequence is allowed to be filtered by using the preset network model, where the current sequence includes the current picture.

In some embodiments, the decoding unit 1301 is further configured to parse the bitstream to obtain a value of the fourth syntax element flag information. The second determining unit 1302 is further configured to determine that the fourth syntax element flag information indicates that the to-be-filtered component of the current sequence is allowed to be filtered by using the preset network model, when the value of the fourth syntax element flag information is a first value. The second determining unit 1302 is further configured to determine that the fourth syntax element flag information indicates that the to-be-filtered component of the current sequence is not allowed to be filtered by using the preset network model, when the value of the fourth syntax element flag information is a second value.

In some embodiments, the preset network model is a neural network model, and the neural network model at least includes a convolutional layer, an activation layer, a concatenation layer, and a skip-connection layer.

In some embodiments, an input to the preset network model is the block quantization parameter information and the reconstructed value of the to-be-filtered component of the current block. Accordingly, the second filtering unit 1303 is further configured to determine that an output of the preset network model is the filtered reconstructed value of the to-be-filtered component of the current block.

In some embodiments, an input to the preset network model is the reconstructed value of the to-be-filtered component of the current block and the block quantization parameter information of the current block. Accordingly, the second filtering unit 1303 is further configured to determine that an output of the preset network model is a first residual value of the to-be-filtered component of the current block, and determine the filtered reconstructed value of the to-be-filtered component of the current block according to the reconstructed value of the to-be-filtered component of the current block and the first residual value of the to-be-filtered component of the current block.

In some embodiments, the decoding unit 1301 is further configured to parse the bitstream to determine a residual-scaling factor. The second determining unit 1302 is further configured to obtain a second residual value of the to-be-filtered component of the current block by scaling the first residual value of the to-be-filtered component of the current block according to the residual-scaling factor. The second determining unit 1302 is further configured to determine the filtered reconstructed value of the to-be-filtered component of the current block according to the reconstructed value of the to-be-filtered component of the current block and the second residual value of the to-be-filtered component of the current block.

In some embodiments, the second determining unit 1302 is further configured to repeat parsing the bitstream to determine the second syntax element flag information of the to-be-filtered component of the current block, by traversing the at least one partition block in the current picture and sequentially taking each of the at least one partition block as the current block, to obtain a filtered reconstructed value of each of the at least one partition block. The second determining unit 1302 is further configured to determine a reconstructed picture of the current picture according to the filtered reconstructed value of each of the at least one partition block.

It may be understood that in the embodiments, the "unit" may be part of the circuitry, part of the processor, part of the program or software, etc., and of course may also be a module, or may be non-modular. In addition, various components described in the embodiments may be integrated into one processing unit or may be present as a number of physically separated units, or two or more units may be integrated into one. The integrated units may be implemented either in the form of hardware or in the form of software function modules.

If the integrated unit is implemented as a software function module and not sold or used as a stand-alone product, the integrated unit may be stored in a computer-readable storage medium. Based on such understanding, the embodiments provide a computer-readable storage medium, which is applied to the decoder 200 and stores a computer program, the computer program implementing the method described in any of the foregoing embodiments when executed by the second processor.

Figure 14:
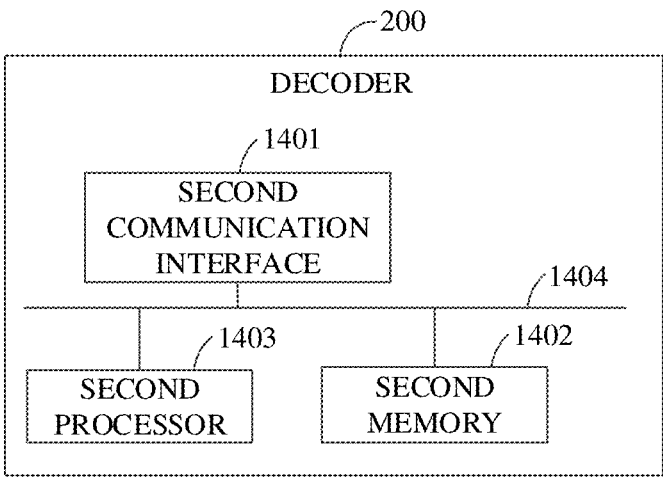
FIG. 14 is a schematic diagram of a specific hardware structure of a decoder provided in embodiments of the disclosure.

Based on the above structure of the decoder 200 and the computer-readable storage medium, reference is made to FIG. 14 which is a schematic diagram of a specific hardware structure of the decoder 200 provided in embodiments of the disclosure. As illustrated in FIG. 14, the decoder 200 may include a second communication interface 1401, a second memory 1402, and a second processor 1403. The components are coupled together via a second bus system 1404. It may be understood that the second bus system 1404 is configured to enable connection and communication between these components. The second bus system 1404 includes a power bus, a control bus, and a status signal bus in addition to a data bus. For the sake of clarity, however, the various buses are labelled as second bus system 1404 in FIG. 14.

The second communication interface 1401 is configured to receive and transmit signals during information transmission with other external network elements.

The second memory 1402 is configured to store a computer program executable by the second processor 1403.

The second processor 1403 is configured to, when executing the computer program, parse a bitstream to determine first syntax element flag information of a to-be-filtered component of a current picture; and parse the bitstream to determine second syntax element flag information of a to-be-filtered component of a current block, when the first syntax element flag information indicates that there is a to-be-filtered component of a partition block in the current picture that is allowed to be filtered by using a preset network model, where the current picture includes at least one partition block, and the current block is any one of the at least one partition block; determine block quantization parameter information of the current block, when the second syntax element flag information indicates that the to-be-filtered component of the current block is to be filtered by using the preset network model, where the block quantization parameter information at least includes a block quantization parameter value of a first colour component and a block quantization parameter value of a second colour component; and determine a reconstructed value of the to-be-filtered component of the current block, and determine a filtered reconstructed value of the to-be-filtered component of the current block by inputting the reconstructed value of the to-be-filtered component of the current block and the block quantization parameter information of the current block into the preset network model.

Optionally, as another embodiment, the second processor 1403 is further configured to perform the method described in any of the above embodiments when running the computer program.

It may be understood that, in terms of hardware function, the second memory 1402 is similar to the first memory 1202, and the second processor 1403 is similar to the first processor 1203, which will not be repeated herein.

A decoder is provided in the embodiments. The decoder can use the in-loop filtering technology based on the preset network model with multiple quantization parameters as inputs. Since an input to the preset network model includes only the reconstructed value of the to-be-filtered component and the block quantization parameter information and omits insignificant input elements such as partition information and prediction information of a colour component, the calculation amount of inference of the network model can be reduced, which is conducive to the implementation of the decoding end and reducing decoding time. In addition, since the input block quantization parameter information at least includes block quantization parameter values of two colour components, that is, multi-channel quantization parameters are used as inputs, more choices and adaptations can be provided for a luma colour component and a chroma colour component. Furthermore, by means of introducing new syntax elements, the decoding end can achieve more flexible configuration without storing multiple neural network models, which can improve the coding performance and thus improve the coding efficiency.

Figure 15:
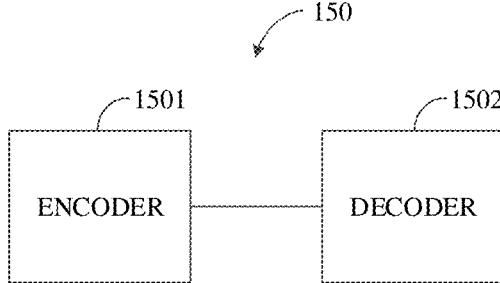
FIG. 15 is a schematic structural diagram of a coding system provided in embodiments of the disclosure.

In yet another embodiment of the disclosure, reference is made to FIG. 15 which is a schematic structural diagram of a coding system provided in embodiments of the disclosure. As illustrated in FIG. 15, the coding system 150 may include an encoder 1501 and a decoder 1502. The encoder 1501 may be an encoder described in any one of the foregoing embodiments, and the decoder 1502 may be a decoder described in any one of the foregoing embodiments.

In embodiments of the disclosure, in the coding system 150, both the encoder 1501 and the decoder 1502 can use the in-loop filtering technology based on the preset network model with multiple quantization parameters as inputs. Since an input to the preset network model includes only the reconstructed value of the to-be-filtered component and the block quantization parameter information and omits insignificant input elements such as partition information and prediction information of a colour component, the calculation amount of inference of the network model can be reduced, which is conducive to the implementation of the decoding end and reducing decoding time. In addition, since the input block quantization parameter information at least includes block quantization parameter values of two colour components, that is, multi-channel quantization parameters are used as inputs, more choices and adaptations can be provided for a luma colour component and a chroma colour component. Furthermore, by means of introducing new syntax elements, the decoding end can achieve more flexible configuration without storing multiple neural network models, which can improve the coding performance and thus improve the coding efficiency.

It may be noted that in this disclosure the terms "include", "comprise" or any other variant thereof are intended to cover non-exclusive inclusion, such that a process, method, article or apparatus comprising a range of elements includes not only those elements, but also includes other elements that are not explicitly listed or are also inherent to such a process, method, article or device. Without further limitation, an element qualified by the statement "including a . . . " does not preclude the existence of another identical element in the process, method, article or apparatus including that element.

The above serial numbers of the embodiments of the disclosure are for descriptive purposes only and do not represent the merits of the embodiments.

The methods disclosed in the several method embodiments provided in this disclosure may be combined in any way to obtain new method embodiments without conflict.

The features disclosed in the several product embodiments provided in this disclosure may be combined in any way to obtain new product embodiments without conflict.

The features disclosed in several method or apparatus embodiments provided in this disclosure may be combined in any way to obtain new method embodiments or apparatus embodiments without conflict.

The foregoing is only a specific implementation of the present disclosure, but the scope of protection of the present disclosure is not limited thereto, and any variation or substitution readily conceivable by any person skilled in the art within the technical scope disclosed in the present disclosure shall be covered by the scope of protection of the present disclosure. Accordingly, the scope of protection of this disclosure shall be governed by the scope of protection of the stated claims.

INDUSTRIAL APPLICABILITY

In embodiments of the disclosure, at both the encoding end and the decoding end, first syntax element flag information of a to-be-filtered component of a current picture is first determined. Then, when the first syntax element flag information indicates that there is a to-be-filtered component of a partition block in the current picture that is allowed to be filtered by using a preset network model, second syntax element flag information of a to-be-filtered component of a current block is determined, where the current picture includes at least one partition block, and the current block is any one of the at least one partition block. When the second syntax element flag information indicates that the to-be-filtered component of the current block is to be filtered by using the preset network model, block quantization parameter information of the current block is determined, where the block quantization parameter information at least includes a block quantization parameter value of a first colour component and a block quantization parameter value of a second colour component. Next, a reconstructed value of the to-be-filtered component of the current block is determined. Finally, a filtered reconstructed value of the to-be-filtered component of the current block is determined by inputting the reconstructed value of the to-be-filtered component of the current block and the block quantization parameter information of the current block into the preset network model. As such, since an input to the preset network model includes only the reconstructed value of the to-be-filtered component and the block quantization parameter information and omits insignificant input elements such as partition information and prediction information of a colour component, the calculation amount of inference of the network model can be reduced, which is conducive to the implementation of the decoding end and reducing decoding time. In addition, since the input block quantization parameter information at least includes block quantization parameter values of two colour components, that is, multi-channel quantization parameters are used as inputs, more choices and adaptations can be provided for a luma colour component and a chroma colour component. Furthermore, by means of introducing new syntax elements, the decoding end can achieve more flexible configuration without storing multiple neural network models, which can improve the coding performance and thus improve the coding efficiency.

What is claimed is:

1. A decoding method, applied to a decoder and comprising:

parsing a bitstream to determine first syntax element flag information of a to-be-filtered component of a current picture;

parsing the bitstream to determine second syntax element flag information of a to-be-filtered component of a current block, in response to the first syntax element flag information indicating that there is a to-be-filtered component of a partition block in the current picture that is allowed to be filtered by using a preset network model, wherein the current picture comprises at least one partition block, and the current block is any one of the at least one partition block;

determining block quantization parameter information of the current block, in response to the second syntax element flag information indicating that the to-be-filtered component of the current block is to be filtered by using the preset network model, wherein the block quantization parameter information at least comprises a block quantization parameter value of a first colour component and a block quantization parameter value of a second colour component; and determining a reconstructed value of the to-be-filtered component of the current block, and determining a filtered reconstructed value of the to-be-filtered component of the current block by inputting the reconstructed value of the to-be-filtered component of the current block and the block quantization parameter information of the current block into the preset network model.

2. The method of claim 1, wherein determining the block quantization parameter information of the current block comprises:

parsing the bitstream to determine a first quantization parameter index and a second quantization parameter index of the current block;

determining, according to the first quantization parameter index, the block quantization parameter value of the first colour component of the current block from a first quantization parameter candidate set; and determining, according to the second quantization parameter index, the block quantization parameter value of the second colour component of the current block from a second quantization parameter candidate set, wherein the first quantization parameter candidate set comprises at least two candidate quantization parameter values of the first colour component, and the second quantization parameter candidate set comprises at least two candidate quantization parameter values of the second colour component.

3. The method of claim 1, wherein determining the block quantization parameter information of the current block comprises:

parsing the bitstream to determine the block quantization parameter value of the first colour component and the block quantization parameter value of the second colour component of the current block.

4. The method of claim 1, wherein determining the reconstructed value of the to-be-filtered component of the current block comprises:

parsing the bitstream to determine a reconstructed residual value of the to-be-filtered component of the current block;

determining a prediction value of the to-be-filtered component of the current block by performing intra or inter prediction on the to-be-filtered component of the current block; and determining the reconstructed value of the to-be-filtered component of the current block according to the reconstructed residual value of the to-be-filtered component of the current block and the prediction value of the to-be-filtered component of the current block.

5. The method of claim 4, wherein determining the reconstructed value of the to-be-filtered component of the current block according to the reconstructed residual value of the to-be-filtered component of the current block and the prediction value of the to-be-filtered component of the current block comprises:

obtaining the reconstructed value of the to-be-filtered component of the current block by adding the reconstructed residual value of the to-be-filtered component of the current block to the prediction value of the to-be-filtered component of the current block.

6. The method of claim 1, wherein parsing the bitstream to determine the second syntax element flag information of the to-be-filtered component of the current block comprises:

parsing the bitstream to obtain a value of the second syntax element flag information; and the method further comprising:

determining that the second syntax element flag information indicates that the to-be-filtered component of the current block is to be filtered by using the preset network model, in response to the value of the second syntax element flag information being a first value; and determining that the second syntax element flag information indicates that the to-be-filtered component of the current block is not to be filtered by using the preset network model, in response to the value of the second syntax element flag information being a second value.

7. The method of claim 6, wherein after parsing the bitstream to determine the second syntax element flag information of the to-be-filtered component of the current block, the method further comprises:

determining the reconstructed value of the to-be-filtered component of the current block as the filtered reconstructed value of the to-be-filtered component of the current block, in response to the second syntax element flag information indicating that the to-be-filtered component of the current block is not to be filtered by using the preset network model.

8. The method of claim 1, wherein parsing the bitstream to determine the first syntax element flag information of the to-be-filtered component of the current picture comprises:

parsing the bitstream to obtain a value of the first syntax element flag information; and the method further comprising:

determining that the first syntax element flag information indicates that there is a to-be-filtered component of a partition block in the current picture that is allowed to be filtered by using the preset network model, in response to the value of the first syntax element flag information being a first value; and determining that the first syntax element flag information indicates that any to-be-filtered component of the at least one partition block in the current picture is not allowed to be filtered by using the preset network model, in response to the value of the first syntax element flag information being a second value.

9. The method of claim 8, wherein after parsing the bitstream to determine the first syntax element flag information of the to-be-filtered component of the current picture, the method further comprises:

in response to the first syntax element flag information indicating that any to-be-filtered component of the at least one partition block in the current picture is not allowed to be filtered by using the preset network model, setting a value of second syntax element flag information of a to-be-filtered component of each of the at least one partition block to a second value; and determining a reconstructed value of the to-be-filtered component of each of the at least one partition block as a filtered reconstructed value of the to-be-filtered component of each of the at least one partition block, after the reconstructed value of the to-be-filtered component of each of the at least one partition block is determined.

10. The method of claim 1, wherein parsing the bitstream to determine the first syntax element flag information of the to-be-filtered component of the current picture comprises:

parsing the bitstream to determine third syntax element flag information of the to-be-filtered component of the current picture; and parsing the bitstream to determine the first syntax element flag information of the to-be-filtered component of the current picture, in response to the third syntax element flag information indicating that not all to-be-filtered components of the at least one partition block in the current picture are to be filtered by using the preset network model.

11. The method of claim 10, wherein parsing the bitstream to determine the third syntax element flag information of the to-be-filtered component of the current picture comprises:

parsing the bitstream to obtain a value of the third syntax element flag information; and the method further comprising:

determining that the third syntax element flag information indicates that all to-be-filtered components of the at least one partition block in the current picture are to be filtered by using the preset network model, in response to the value of the third syntax element flag information being a first value; and determining that the third syntax element flag information indicates that not all to-be-filtered components of the at least one partition block in the current picture are to be filtered by using the preset network model, in response to the value of the third syntax element flag information being a second value.

12. The method of claim 10, wherein after parsing the bitstream to determine the third syntax element flag information of the to-be-filtered component of the current picture, the method further comprises:

in response to the third syntax element flag information indicating that all to-be-filtered components of the at least one partition block in the current picture are to be filtered by using the preset network model, parsing the bitstream to determine picture quantization parameter information of the current picture, wherein the picture quantization parameter information at least comprises a picture quantization parameter value of the first colour component and a picture quantization parameter value of the second colour component;

setting a value of the first syntax element flag information of the to-be-filtered component of the current picture to a first value, setting a value of second syntax element flag information of a to-be-filtered component of each of the at least one partition block in the current picture to the first value, and determining block quantization parameter information of each of the at least one partition block according to the picture quantization parameter information of the current picture; and determining a filtered reconstructed value of the to-be-filtered component of each of the at least one partition block by inputting a reconstructed value of the to-be-filtered component of each of the at least one partition block and the block quantization parameter information of each of the at least one partition block into the preset network model, after the reconstructed value of the to-be-filtered component of each of the at least one partition block is determined.

13. The method of claim 12, wherein parsing the bitstream to determine the picture quantization parameter information of the current picture comprises:

parsing the bitstream to determine a third quantization parameter index and a fourth quantization parameter index of the current picture;

determining, according to the third quantization parameter index, the picture quantization parameter value of the first colour component of the current picture from a first quantization parameter candidate set; and determining, according to the fourth quantization parameter index, the picture quantization parameter value of the second colour component of the current picture from a second quantization parameter candidate set, wherein the first quantization parameter candidate set comprises at least two candidate quantization parameter values of the first colour component, and the second quantization parameter candidate set comprises at least two candidate quantization parameter values of the second colour component.

14. The method of claim 10, wherein the to-be-filtered component at least comprises a luma colour component and a chroma colour component, and the method further comprises:

in response to a colour component type of the current picture being the luma colour component, determining that the third syntax element flag information is picture-level luma switch flag information of the current picture, the first syntax element flag information is picture-level luma enable flag information of the current picture, and the second syntax element flag information is block-level luma usage flag information of the current block, wherein the picture-level luma switch flag information indicates whether all luma colour components of the at least one partition block in the current picture are to be filtered by using the preset network model, the picture-level luma enable flag information indicates whether there is a luma colour component of a partition block in the current picture that is allowed to be filtered by using the preset network model, and the block-level luma usage flag information indicates whether a luma colour component of the current block is to be filtered by using the preset network model; and in response to the colour component type of the current picture being the chroma colour component, determining that the third syntax element flag information is picture-level chroma switch flag information of the current picture, the first syntax element flag information is picture-level chroma enable flag information of the current picture, and the second syntax element flag information is block-level chroma usage flag information of the current block, wherein the picture-level chroma switch flag information indicates whether all chroma colour components of the at least one partition block in the current picture are to be filtered by using the preset network model, the picture-level chroma enable flag information indicates whether there is a chroma colour component of a partition block in the current picture that is allowed to be filtered by using the preset network model, and the block-level chroma usage flag information indicates whether a chroma colour component of the current block is to be filtered by using the preset network model.

15. The method of claim 10, further comprising:

parsing the bitstream to determine fourth syntax element flag information;

proceeding to parsing the bitstream to determine the third syntax element flag information of the to-be-filtered component of the current picture, in response to the fourth syntax element flag information indicating that a to-be-filtered component of a current sequence is allowed to be filtered by using the preset network model, wherein the current sequence comprises the current picture.

16. The method of claim 15, wherein parsing the bitstream to determine the fourth syntax element flag information comprises:

parsing the bitstream to obtain a value of the fourth syntax element flag information; and the method further comprising:

determining that the fourth syntax element flag information indicates that the to-be-filtered component of the current sequence is allowed to be filtered by using the preset network model, in response to the value of the fourth syntax element flag information being a first value; and determining that the fourth syntax element flag information indicates that the to-be-filtered component of the current sequence is not allowed to be filtered by using the preset network model, in response to the value of the fourth syntax element flag information being a second value.

17. The method of claim 1, wherein the preset network model is a neural network model, and the neural network model at least comprises a convolutional layer, an activation layer, a concatenation layer, and a skip-connection layer.

18. The method of claim 1, wherein an input to the preset network model is the reconstructed value of the to-be-filtered component of the current block and the block quantization parameter information of the current block, and the method further comprises:

determining that an output of the preset network model is the filtered reconstructed value of the to-be-filtered component of the current block.

19. An encoding method, applied to an encoder and comprising:

determining first syntax element flag information of a to-be-filtered component of a current picture;

determining second syntax element flag information of a to-be-filtered component of a current block, in response to the first syntax element flag information indicating that there is a to-be-filtered component of a partition block in the current picture that is allowed to be filtered by using a preset network model, wherein the current picture comprises at least one partition block, and the current block is any one of the at least one partition block;

determining block quantization parameter information of the current block, in response to the second syntax element flag information indicating that the to-be-filtered component of the current block is to be filtered by using the preset network model, wherein the block quantization parameter information at least comprises a block quantization parameter value of a first colour component and a block quantization parameter value of a second colour component; and determining a reconstructed value of the to-be-filtered component of the current block, and determining a filtered reconstructed value of the to-be-filtered component of the current block by inputting the reconstructed value of the to-be-filtered component of the current block and the block quantization parameter information of the current block into the preset network model.

20. A decoder, comprising:

at least one processor; and a memory coupled to the at least one processor and storing at least one computer executable instruction thereon which, when executed by the at least one processor, causes the at least one processor to:

parse a bitstream to determine first syntax element flag information of a to-be-filtered component of a current picture; and parse the bitstream to determine second syntax element flag information of a to-befiltered component of a current block, in response to the first syntax element flag information indicating that there is a to-be-filtered component of a partition block in the current picture that is allowed to be filtered by using a preset network model, wherein the current picture comprises at least one partition block, and the current block is any one of the at least one partition block;

determine block quantization parameter information of the current block, in response to the second syntax element flag information indicating that the to-be-filtered component of the current block is to be filtered by using the preset network model, wherein the block quantization parameter information at least comprises a block quantization parameter value of a first colour component and a block quantization parameter value of a second colour component;

determine a reconstructed value of the to-be-filtered component of the current block; and determine a filtered reconstructed value of the to-be-filtered component of the current block by inputting the reconstructed value of the to-be-filtered component of the current block and the block quantization parameter information of the current block into the preset network model.

* * * * *